US009206326B2

(12) United States Patent
Omori et al.

(10) Patent No.: US 9,206,326 B2
(45) Date of Patent: Dec. 8, 2015

(54) INK COMPOSITION, INKJET RECORDING INK, AND INKJET RECORDING METHOD

(71) Applicant: FUJIFILM Corporation, Tokyo (JP)

(72) Inventors: Koji Omori, Kanagawa (JP); Yoshiaki Kondo, Kanagawa (JP); Atsuhiro Katsumata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/537,545

(22) Filed: Nov. 10, 2014

(65) Prior Publication Data
US 2015/0062265 A1 Mar. 5, 2015

Related U.S. Application Data

(63) Continuation of application No. PCT/JP2013/062963, filed on May 8, 2013.

(30) Foreign Application Priority Data

May 11, 2012 (JP) ................................. 2012-109942
Dec. 27, 2012 (JP) ................................. 2012-286363

(51) Int. Cl.
*B41J 2/01* (2006.01)
*C09D 11/328* (2014.01)
(Continued)

(52) U.S. Cl.
CPC .................. *C09D 11/328* (2013.01); *B41J 2/01* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ............. 347/100, 95, 96, 101, 102, 21, 20, 9; 106/31.6, 31.13, 31.27; 523/160, 161
See application file for complete search history.

(56) References Cited

U.S. PATENT DOCUMENTS

2004/0129172 A1* 7/2004 Harada et al. ................. 106/31.5
2008/0145561 A1 6/2008 Kitamura et al.
(Continued)

FOREIGN PATENT DOCUMENTS

CN 101479354 A 7/2009
JP 2008-537756 A 9/2008
(Continued)

OTHER PUBLICATIONS

Search Report dated Jul. 30, 2013, issued by the International Searching Authority in counterpart International Application No. PCT/JP2013/062963.
(Continued)

*Primary Examiner* — Manish S Shah
(74) *Attorney, Agent, or Firm* — Sughrue Mion, PLLC

(57) ABSTRACT

There is provided an ink composition which at least contains a first color material and a second color material, in which the first color material is a compound represented by Formula (A-I) described in the specification, and the second color material is at least one compound selected from a compound represented by Formula (B-I) described in the specification and a compound represented by Formula (B-V) described in the specification.

11 Claims, 6 Drawing Sheets

(51) Int. Cl.
| | |
|---|---|
| *B41J 2/21* | (2006.01) |
| *C09B 35/03* | (2006.01) |
| *C09B 35/34* | (2006.01) |
| *C09D 11/00* | (2014.01) |
| *C08K 5/053* | (2006.01) |
| *C08K 5/17* | (2006.01) |
| *C08K 5/3432* | (2006.01) |
| *C08K 5/3437* | (2006.01) |
| *C08K 5/45* | (2006.01) |
| *C09B 35/12* | (2006.01) |
| *C09B 35/18* | (2006.01) |
| *C09B 67/22* | (2006.01) |

(52) U.S. Cl.
CPC ............... *B41J 2/2107* (2013.01); *C08K 5/053* (2013.01); *C08K 5/17* (2013.01); *C08K 5/175* (2013.01); *C08K 5/3432* (2013.01); *C08K 5/3437* (2013.01); *C08K 5/45* (2013.01); *C09B 35/03* (2013.01); *C09B 35/12* (2013.01); *C09B 35/18* (2013.01); *C09B 35/34* (2013.01); *C09B 67/0046* (2013.01); *C09D 11/00* (2013.01)

(56) References Cited

U.S. PATENT DOCUMENTS

2008/0274285 A1* 11/2008 Okamura et al. ............. 347/100
2009/0068414 A1    3/2009 Wright
2012/0048143 A1*  3/2012 Katsumata ................. 106/31.48

FOREIGN PATENT DOCUMENTS

| JP | 4402917 B2 | 1/2010 |
| JP | 2012-001603 A | 1/2012 |
| JP | 2012-067231 A | 4/2012 |
| JP | 2012-077190 A | 4/2012 |
| WO | 2006/103414 A2 | 10/2006 |

OTHER PUBLICATIONS

Written Opinion dated Jul. 30, 2013, issued by the International Searching Authority in counterpart International Application No. PCT/JP2013/062963.

International Preliminary Report on Patentability dated May 29, 2014, issued by the International Searching Authority in counterpart International Application No. PCT/JP2013/062963.

Office Action issued on May 7, 2015 by the Japanese Patent Office in counterpart Japanese Application No. 2012-286363.

Office Action dated Aug. 4, 2015, issued by the State Intellectual Property Office of P.R. China in counterpart Chinese Application No. 201380024725.8.

* cited by examiner

INK COMPOSITION, INKJET RECORDING INK, AND INKJET RECORDING METHOD

CROSS REFERENCE TO RELATED APPLICATION

This is a continuation of International Application No. PCT/JP2013/062963 filed on May 8, 2013, and claims priority from Japanese Patent Application Nos. 2012-109942 filed on May 11, 2012 and 2012-286363 filed on Dec. 27, 2012, the entire disclosures of which are incorporated herein by reference.

TECHNICAL FIELD

The present invention relates to an ink composition, an inkjet recording ink, and an inkjet recording method.

BACKGROUND ART

An inkjet recording method is a recording method for forming an image by providing small ink droplets to a recording medium such as plain paper and a glossy medium, and has become rapidly widespread due to price reduction and improvement of a recording speed. Further, in addition to advanced high-definition of an image obtained by the inkjet recording method, along with rapid spread of digital cameras, the method has become widely common as an output method of images comparable to a silver halide photograph.

Examples of the problem of the ink jet recording method include deterioration in image fastness of the recorded material obtained. In general, the recorded matter obtained by the inkjet recording method has low image fastness as compared to a silver halide photograph. Specifically, when the recorded material is exposed to water, light, humidity, heat, environmental gases present in the air or the like for a long period of time, there is a problem in that a color material on the recorded material is apt to deteriorate to cause a change in color tone or color fading of the image.

In forming a color image, an ink set in which ink compositions with a plurality of colors are combined with each other is used. In the ink set, when image fastness of a specific ink composition, such as light resistance or ozone resistance is significantly lower than those of the other ink compositions, a color formed by the specific ink composition is faded or discolored more rapidly than the other colors, and thus the color tone balance of the entire color image deteriorates. Therefore, it is preferred that the image fastness of each ink composition constituting the ink set is excellent and a difference in image fastness between the respective ink compositions is small.

Among yellow, magenta, and cyan inks widely used as ink for inkjet, magenta, particularly, light resistance of the image of yellow ink tends to be inferior to those of images of the other ink. As a colorant used in the yellow ink, various azo compounds are known.

With respect to such problems, various yellow inks color tones of which are good and which are aimed to improve fastness to light, wet heat, and gas such as ozone have been proposed (see Patent Documents 1 and 2).

PRIOR ART DOCUMENTS

Patent Documents

Patent Document 1: Japanese Patent No. 4402917
Patent Document 2: Japanese Unexamined Patent Application Publication No. 2008-537756

SUMMARY OF INVENTION

Problems to be Solved

The yellow ink described in Patent Documents 1 and 2 have a certain level of effect in improving fastness such as light resistance and ozone resistance, but considering the diversification of use environment in recent years, there is a need for an ink composition which may exhibit a desired hue while having fastness at a higher level.

An object of the present invention is to provide an ink composition, which may form an image having excellent light resistance and ozone resistance, and also may exhibit a desired hue, an inkjet recording ink using the inkjet composition, and an inkjet recording method.

Means for Solving the Problems

The problems may be solved by the following means.

<1> An ink composition at least comprising a first color material and a second material, wherein the first color material is a compound represented by the following Formula (A-I), and the second color material is a compound represented by the following Formula (B-V):

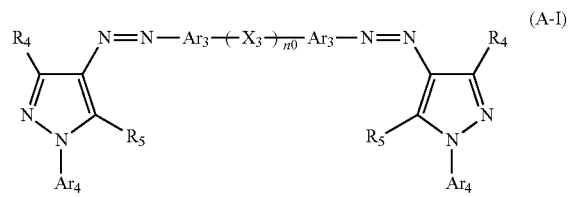

(In Formula (A-I), $R_4$'s represent a substituent, $R_5$'s represent $-OR_6$ or $-NHR_7$, $R_6$ and $R_7$ represent a hydrogen atom or a substituent, $X_3$ represents a divalent linking group, n0 is 0 or 1, $Ar_3$'s represent a divalent heterocyclic group, and $Ar_4$'s represent an alkyl group, an aryl group, or a triazine group.)

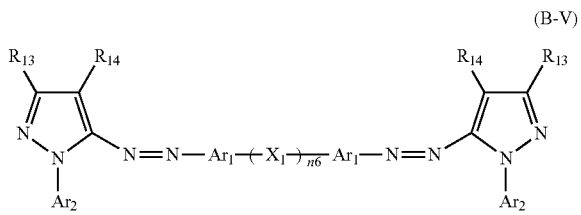

(In Formula (B-V), $R_{13}$'s each independently represent a hydrogen atom or a substituent, $R_{14}$'s each independently represent $-OR_{16}$, $-NHR_{17}$ or a cyano group, $R_{16}$ and $R_{17}$ represent a hydrogen atom or a substituent, $X_1$ represents a substituted or unsubstituted aryl group, or a substituted or unsubstituted triazine group, n6 is 0 or 1, $Ar_1$'s each independently represent a divalent heterocyclic group, and $Ar_2$'s each independently represent a substituted or unsubstituted alkyl group, a substituted or unsubstituted aryl group, or a triazine group.)

<2> The ink composition described in the above <1>, wherein the compound represented by Formula (A-I) is a compound represented by the following Formula (A-II):

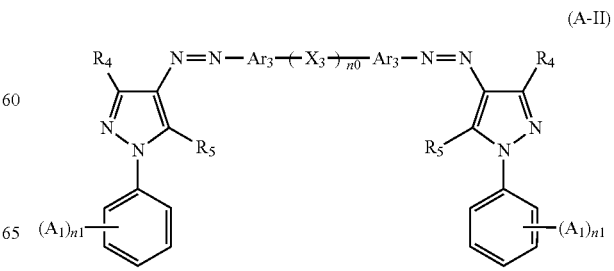

(In Formula (A-II), $R_4$'s represent a substituent, $R_5$'s represent —$OR_6$ or —$NHR_7$, $R_6$ and $R_7$ represent a hydrogen atom or a substituent, $X_3$ represents a divalent linking group, n0 is 0 or 1, $Ar_3$'s represent a divalent heterocyclic group, $A_1$'s represent an ionic hydrophilic group, and n1's represent 0 to 2.)

<3> The ink composition described in the above <1>, wherein the compound represented by Formula (A-I) is a compound represented by the following Formula (A-III):

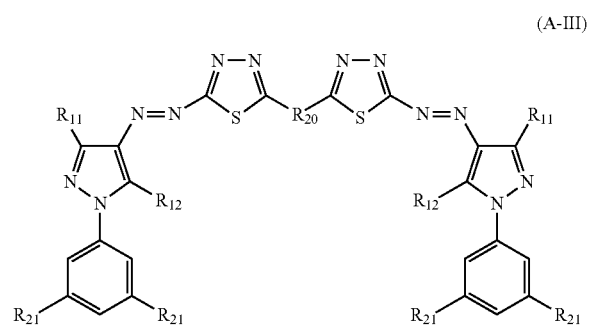

(A-III)

(In Formula (A-III), $R_{20}$ represents an alkylene group, —S—, or linking group formed by or a combination thereof, $R_{21}$'s represent an ionic hydrophilic group, $R_{11}$'s represent an alkyl group, and $R_{12}$'s represent an amino group.)

<4> The ink composition described in any one of the above <1> to <3>, wherein the compound represented by Formula (B-V) is a compound represented by the following Formula (B-VI):

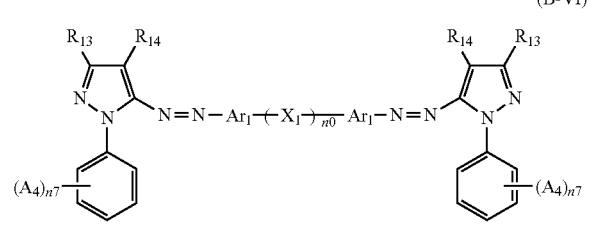

(B-VI)

(In Formula (B-VI), $R_{13}$'s each independently represent a hydrogen atom or a substituent, $R_{14}$'s each independently represent —$OR_{16}$, —$NHR_{17}$ or a cyano group, $R_{16}$ and $R_{17}$ represent a hydrogen atom or a substituent, $X_1$ represents a substituted or unsubstituted aryl group, or a substituted or unsubstituted triazine group, n0 is 0 or 1, $Ar_1$'s each independently represent a divalent heterocyclic group, $A_4$'s each independently represent an ionic hydrophilic group, and n7's represent 0 to 2.)

<5> The ink composition described in any one of the above <1> to <3>, wherein the compound represented by Formula (B-V) is a compound represented by the following Formula (B-VII):

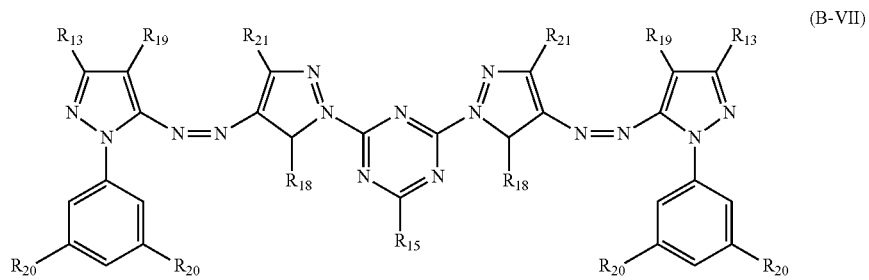

(B-VII)

(In Formula (B-VII), $R_{15}$ represents —OM, $R_{20}$'s represent —$CO_2M$, and M represents a hydrogen atom or a monovalent counter cation. $R_{21}$'s represent a substituted or unsubstituted alkyl group, $R_{13}$'s each independently represent a hydrogen atom or a substituent, $R_{18}$'s represent a substituted or unsubstituted amino group, and $R_{19}$'s represent a cyano group.)

<6> The ink composition described in any one of the above <1> to <5>, wherein a content of the first color material in the ink composition is 0.1 to 10.0 by mass ratio (mass of the first color material/mass of the second color material) relative to a content of the second color material.

<7> The ink composition described in the above of the above <1> to <6>, wherein the content of the first color material is 0.1% by mass to 8% by mass based on a total mass of the ink composition.

<8> The ink composition described in any one of described in the above <1> to <7>, wherein the content of the second color material is 0.1% by mass to 8% by mass based on a total mass of the ink composition.

<9> The ink composition described in any one of the above <1> to <8>, further comprising:
at least one of a water-soluble organic solvent, a urea-based compound, a preservative, a nonionic surfactant and a metal chelator.

<10> A cartridge ink for an inkjet printer, which fills a chamber in a cartridge for a printer, wherein the ink contains the ink composition described in any one of the above <1> to <9>.

<11> An inkjet recording method using the cartridge ink for an inkjet printer described in the above <10>.

<12> An inkjet printer using the cartridge ink for a printer described in the above <10>.

The present invention relates to the above [1] to [12], but other aspects such as the following [1] to [14] are also described for reference.

[1] An ink composition at least comprising a first color material and a second material, wherein the first color material is a compound represented by the following Formula (A-I), and the second color material is at least one compound selected from a compound represented by the following Formula (B-I) and a compound represented by the following Formula (B-V):

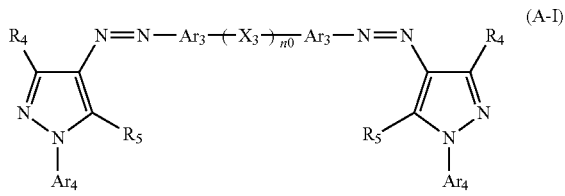

(A-I)

(In Formula (A-I), $R_4$'s represent a substituent, $R_5$'s represent —$OR_6$ or —$NHR_7$, $R_6$ and $R_7$ represent a hydrogen atom or a substituent, $X_3$ represents a divalent linking group, n0 is 0 or 1, $Ar_3$'s represent a divalent heterocyclic group, and $Ar_4$'s represent an alkyl group, an aryl group, or a triazine group.)

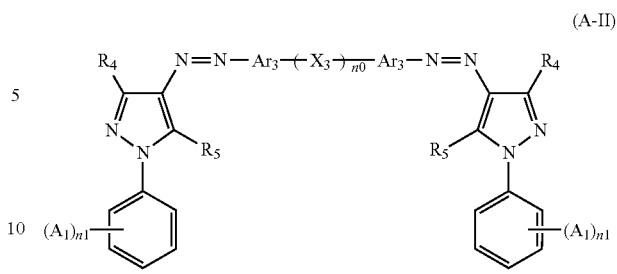

(A-II)

(In Formula (A-II), $R_4$'s represent a substituent, $R_5$'s represent —$OR_6$ or —$NHR_7$, $R_6$ and $R_7$ represent a hydrogen atom or a substituent, $X_3$ represents a divalent linking group, n0 is 0 or 1, $Ar_3$'s represent a divalent heterocyclic group, $A_1$'s represent an ionic hydrophilic group, and n1's represent 0 to 2.)

[3] The ink composition described in the above [1], wherein the compound represented by Formula (A-I) is a compound represented by the following Formula (A-III):

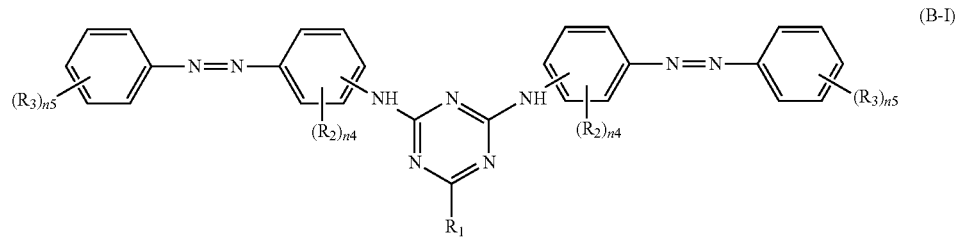

(B-I)

(In Formula (B-I), $R_1$ represents a hydrogen atom or a substituent, $R_2$'s represents a substituent, $R_3$'s represents an ionic hydrophilic group or an alkyl group which optionally forms a ring, n4's are 0 to 4, and n5's are 2 to 5.)

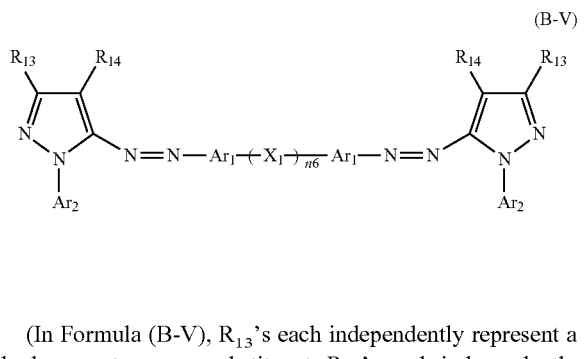

(B-V)

(In Formula (B-V), $R_{13}$'s each independently represent a hydrogen atom or a substituent, $R_{14}$'s each independently represent —$OR_{16}$, —$NHR_{17}$ or a cyano group, $R_{16}$ and $R_{17}$ represent a hydrogen atom or a substituent, $X_1$ represents a substituted or unsubstituted aryl group, or a substituted or unsubstituted triazine group, n6 is 0 or 1, $Ar_1$'s each independently represent a divalent heterocyclic group, and $Ar_2$'s each independently represent a substituted or unsubstituted alkyl group, a substituted or unsubstituted aryl group, or a triazine group.)

[2] The ink composition described in the above [1], wherein the compound represented by Formula (A-I) is a compound represented by the following Formula (A-II):

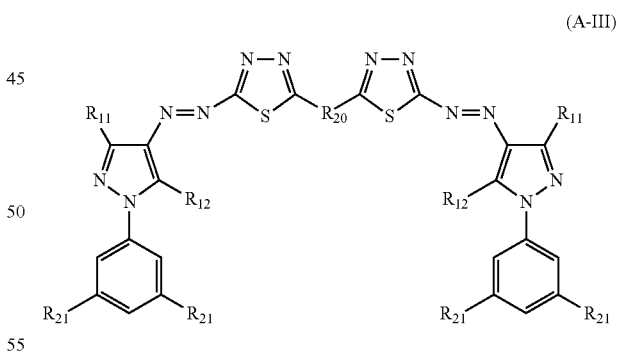

(A-III)

(In Formula (A-III), $R_{20}$ represents an alkylene group, —S—, or linking group formed by or a combination thereof, $R_{21}$'s represent an ionic hydrophilic group, $R_{11}$'s represent an alkyl group, and $R_{12}$'s represent an amino group.)

[4] The ink composition described in of any one of the above [1] to [3], wherein the compound represented by Formula (B-I) is at least one compound selected from a compound represented by the following Formula (B-II) and a compound represented by the following Formula (B-III):

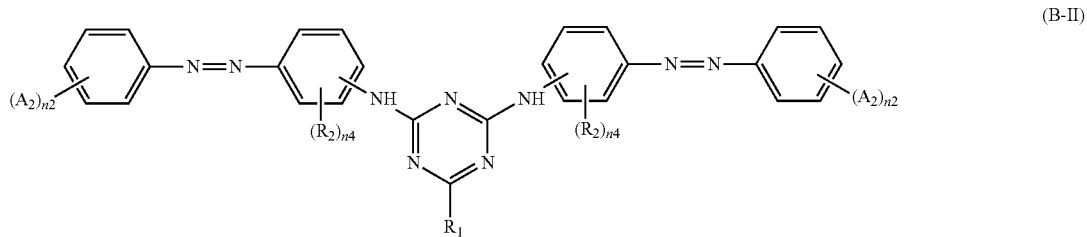

(B-II)

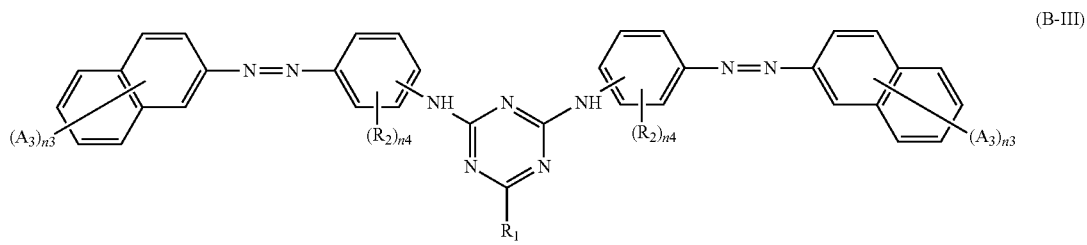

(B-III)

(In Formulae (B-II) and (B-III), each of $R_1$'s and each of $R_2$'s independently represent a hydrogen atom or a monovalent substituent, $A_2$'s and $A_3$'s represent an ionic hydrophilic group, n4's are 0 to 4, and n2's and n3's represent 0 to 2.)

[5] The ink composition described in any one of the above [1] to [3], wherein the compound represented by Formula (B-I) is a compound represented by the following Formula (B-IV):

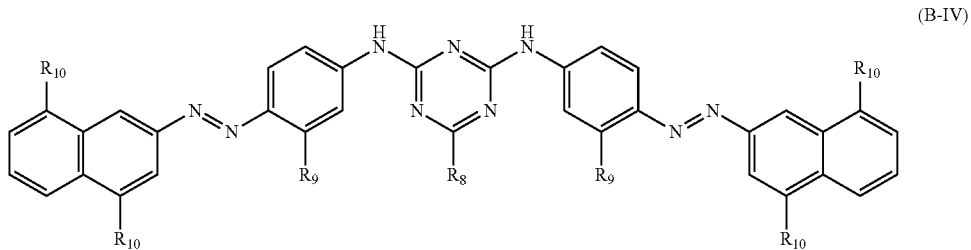

(B-IV)

(In Formula (B-IV), $R_8$ represents a hydroxyl group, a morpholino group or an amino group, $R_9$'s each independently represent a hydrogen atom, a hydroxyl group, a carboxyl group, an alkyl group, an alkoxy group, a sulfo group or an aminocarbonyl amino group, and $R_{10}$'s each independently represent a carboxyl group or a sulfo group.)

[6] The ink composition described in any one of the above [1] to [5], wherein the compound represented by Formula (B-V) is a compound represented by the following Formula (B-VI):

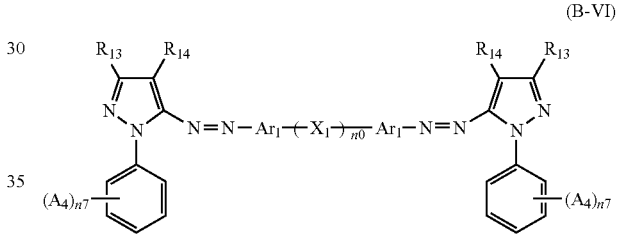

(B-VI)

(In Formula (B-VI), $R_{13}$'s each independently represent a hydrogen atom or a substituent, $R_{14}$'s each independently represent —$OR_{16}$, —$NHR_{17}$ or a cyano group, $R_{16}$ and $R_{17}$ represent a hydrogen atom or a substituent, $X_1$ represents a substituted or unsubstituted aryl group, or a substituted or unsubstituted triazine group, n0 is 0 or 1, $Ar_1$'s each independently represent a divalent heterocyclic group, $A_4$'s each independently represent an ionic hydrophilic group, and n7's represent 0 to 2.)

[7] The ink composition described in any one of the above [1] to [5], wherein the compound represented by Formula (B-V) is a compound represented by the following Formula (B-VII):

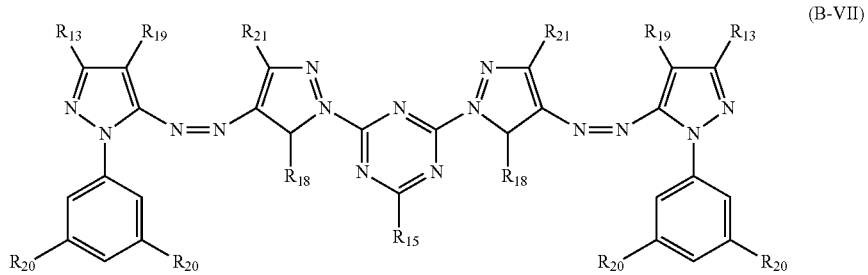

(B-VII)

(In Formula (B-VII), $R_{15}$ represents —OM, $R_{20}$'s represent —$CO_2M$, and M represents a hydrogen atom or a monovalent counter cation. $R_{21}$'s represent a substituted or unsubstituted alkyl group, $R_{13}$'s each independently represent a hydrogen atom or a substituent, $R_{18}$'s represent a substituted or unsubstituted amino group, and $R_{19}$'s represent a cyano group.)

[8] The ink composition described in any one of the above [1] to [7], wherein a content of the first color material in the ink composition is 0.1 to 10.0 by mass ratio (mass of the first color material/mass of the second color material) relative to a content of the second color material.

[9] The ink composition described in the above of the above [1] to [8], wherein the content of the first color material is 0.1% by mass to 8% by mass based on a total mass of the ink composition.

[10] The ink composition described in any one of described in the above [1] to [9], wherein the content of the second color material is 0.1% by mass to 8% by mass based on a total mass of the ink composition.

[11] The ink composition described in any one of the above [1] to [10], further comprising:

at least one of a water-soluble organic solvent, a urea-based compound, a preservative, a nonionic surfactant and a metal chelator.

[12] A cartridge ink for an inkjet printer, which fills a chamber in a cartridge for a printer, wherein the ink contains the ink composition described in any one of the above [1] to [11].

[13] An inkjet recording method using the cartridge ink for an inkjet printer described in the above [12].

[14] An inkjet printer using the cartridge ink for a printer described in the above [12].

Advantageous Effects of Invention

According to the present invention, it is possible to provide an ink composition, which may form an image which is fast to light and ozone and also exhibit a rigid hue, an inkjet recording ink using the ink composition, and an inkjet recording method.

DESCRIPTION OF EMBODIMENTS

Figure 1:
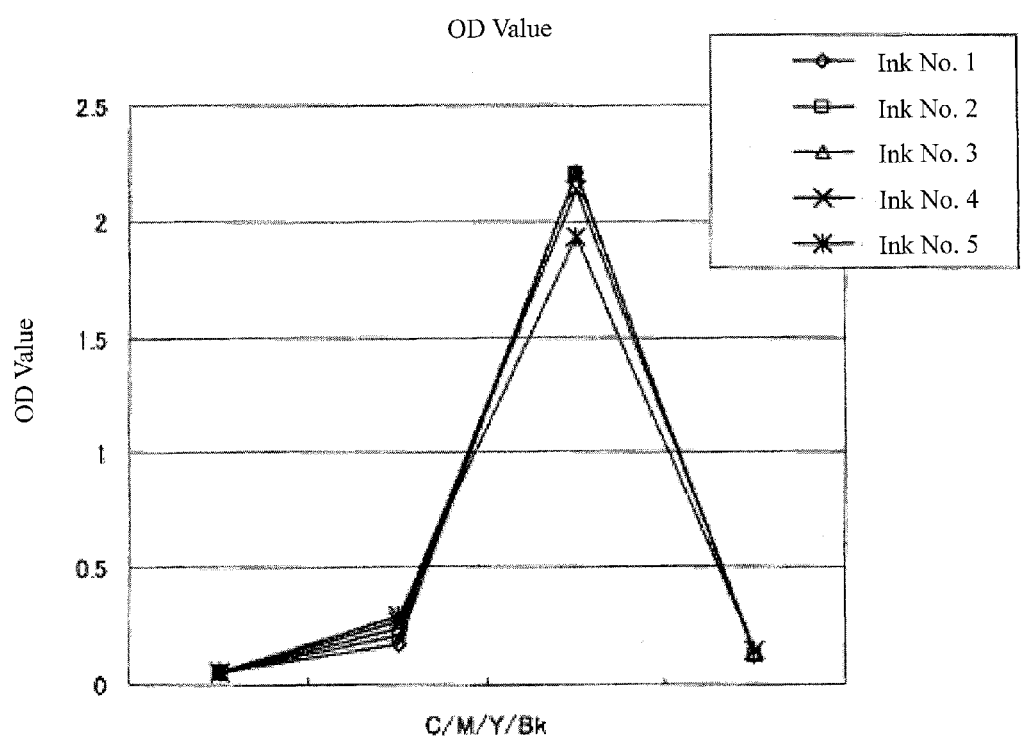
FIG. 1 is a diagram illustrating a value (OD value) of λmax (reflection spectrum) on a CRISPIA paper which records an image with respect to Ink Nos. 1 to 5 in Examples.

Hereinafter, the present invention will be described in detail with reference to preferred embodiments.

First, in the present invention, Group A of Substituents and an ionic hydrophilic group will be defined.

(Group A of Substituents)

Examples thereof include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a silyl group, and an ionic hydrophilic group. The substituents may be further substituted, and examples of the further substituted group include groups selected from Group A of Substituents as described above.

To be more specific, examples of the halogen atom include a fluorine atom, a chlorine atom, a bromine atom, or an iodine atom.

Examples of the alkyl group include straight, branched or cyclic, substituted or unsubstituted alkyl groups, and also include a cycloalkyl group, a bicycloalkyl group, a tricyclo structure having more cyclic structures, and the like. The alkyl group (for example, an alkyl group in an alkoxy group or an alkylthio group) in the substituents to be described below also represents an alkyl group of such a concept. Specifically, preferred examples of the alkyl group include an alkyl group having 1 to 30 carbon atoms, for example, a methyl group, an ethyl group, an n-propyl group, an i-propyl group, a t-butyl group, an n-octyl group, an eicosyl group, a 2-chloroethyl group, a 2-cyanoethyl group, a 2-ethylhexyl group, and the like, preferred examples of the cycloalkyl group include a substituted or unsubstituted cycloalkyl group having 3 to 30 carbon atoms, for example, a cyclohexyl group, a cyclopentyl group, a 4-n-dodecylcyclohexyl group, and the like, and preferred examples of the bicycloalkyl group include a substituted or unsubstituted bicycloalkyl group having 5 to 30 carbon atoms, that is, a monovalent group in which one hydrogen atom is removed from bicycloalkane having 5 to 30 carbon atoms, for example, a bicyclo[1,2,2]heptan-2-yl group, a bicyclo[2,2,2]octan-3-yl group, and the like.

Examples of the aralkyl group include a substituted or unsubstituted aralkyl group, and preferred examples of the substituted or unsubstituted aralkyl group include an aralkyl group having 7 to 30 carbon atoms. Examples thereof include a benzyl group and a 2-phenethyl group.

Examples of the alkenyl group include a straight, branched or cyclic, substituted or unsubstituted alkenyl group, and include a cycloalkenyl group and a bicycloalkenyl group. Specifically, preferred examples of the alkenyl group include a substituted or unsubstituted alkenyl group having 2 to 30 carbon atoms, for example, a vinyl group, an allyl group, a prenyl group, a geranyl group, an oleyl group, and the like, preferred examples of the cycloalkenyl group include a substituted or unsubstituted cycloalkenyl group having 3 to 30 carbon atoms, that is, a monovalent group in which one hydrogen atom is removed from a cycloalkene having from 3 to 30 carbon atoms, for example, a 2-cyclopentene-1-yl group, a 2-cyclohexene-1-yl group, and the like, and examples of the bicycloalkenyl group include a substituted or unsubstituted bicycloalkenyl group, preferably, a substituted or unsubstituted bicycloalkenyl group having 5 to 30 carbon atoms, that is, a monovalent group in which one hydrogen atom is removed from a bicycloalkene having one double bond, for example, a bicyclo[2,2,1]hept-2-en-1-yl group, a bicyclo[2,2,2]oct-2-en-4-yl group, and the like.

Preferred examples of the alkynyl group include a substituted or unsubstituted alkynyl group having 2 to 30 carbon atoms, for example, an ethynyl group, a propargyl group, a trimethylsilylethynyl group and the like.

Preferred examples of the aryl group include a substituted or unsubstituted aryl group having 6 to 30 carbon atoms, for example, a phenyl group, a p-tolyl group, a naphthyl group, a m-chlorophenyl group, an o-hexadecanoylaminophenyl group and the like.

Preferred examples of the heterocyclic group include a monovalent group in which one hydrogen atom is removed from a 5- or 6-membered substituted or unsubstituted aromatic or non-aromatic heterocyclic compound, and more preferred examples thereof include a 5- or 6-membered aromatic heterocyclic group having 3 to 30 carbon atoms, for example, a 2-furyl group, a 2-thienyl group, a 2-pyrimidinyl group, a 2-benzothiazolyl group and the like.

Preferred examples of the alkoxy group include a substituted or unsubstituted alkoxy group having 1 to 30 carbon atoms, for example, a methoxy group, an ethoxy group, an isopropoxy group, a t-butoxy group, an n-octyloxy group, a 2-methoxyethoxy group and the like.

Preferred example of the aryloxy group include a substituted or unsubstituted aryloxy group having 6 to 30 carbon atoms, for example, a phenoxy group, a 2-methylphenoxy group, a 4-t-butylphenoxy group, a 3-nitrophenoxy group, a 2-tetradecanoylaminophenoxy group and the like.

Preferred examples of the silyloxy group include a substituted or unsubstituted silyloxy group having 0 to 20 carbon atoms, for example, a trimethylsilyloxy group, a diphenylmethylsilyloxy group and the like.

Preferred examples of the heterocyclic oxy group include a substituted or unsubstituted heterocyclic oxy group having 2 to 30 carbon atoms, for example, a 1-phenyltetrazol-5-oxy group, a 2-tetrahydropyranyloxy group and the like.

Preferred examples of the acyloxy group include a formyloxy group, a substituted or unsubstituted alkylcarbonyloxy group having 2 to 30 carbon atoms, a substituted or unsubstituted arylcarbonyloxy group having 6 to 30 carbon atoms, for example, an acetyloxy group, a pyvaloyloxy group, a stearoyloxy group, a benzoyloxy group, a p-methoxyphenylcarbonyloxy group and the like.

Preferred examples of the carbamoyloxy group include a substituted or unsubstituted carbamoyloxy group having 1 to 30 carbon atoms, for example, an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group and the like.

Preferred examples of the alkoxycarbonyloxy group include a substituted or unsubstituted alkoxycarbonyloxy group having 2 to 30 carbon atoms, for example, a methoxycarbonyloxy group, an ethoxycarbonyloxy group, a t-butoxycarbonyloxy group, an n-octylcarbonyloxy group and the like.

Preferred examples of the aryloxycarbonyloxy group include a substituted or unsubstituted aryloxycarbonyloxy group having 7 to 30 carbon atoms, for example, a phenoxycarbonyloxy group, a p-methoxyphenoxycarbonyloxy group, a p-n-hexadecyloxyphenoxycarbonyloxy group and the like.

Examples of the amino group include an alkylamino group, an arylamino group, a heterocyclic amino group, and preferred examples thereof include an amino group, a substituted or unsubstituted alkylamino group having 1 to 30 carbon atoms, a substituted or unsubstituted anilino group having 6 to 30 carbon atoms, for example, a methylamino group, a dimethylamino group, an anilino group, an N-methyl-anilino group, a diphenylamino group, a triazinylamino group and the like.

Preferred examples of the acylamino group include a formylamino group, a substituted or unsubstituted alkylcarbonylamino group having 1 to 30 carbon atoms, a substituted or unsubstituted arylcarbonylamino group having 6 to 30 carbon atoms, for example, an acetylamino group, a pyvaloylamino group, a lauroylamino group, a benzoylamino group, a 3,4,5-tri-n-octyloxyphenylcarbonylamino group and the like.

Preferred examples of the aminocarbonylamino group include a substituted or unsubstituted aminocarbonylamino group having 1 to 30 carbon atoms, for example, a carbamoylamino group, an N,N-dimethylaminocarbonylamino group, an N,N-diethylaminocarbonylamino group, a morpholinocarbonylamino group and the like.

Preferred examples of the alkoxycarbonylamino group include a substituted or unsubstituted alkoxycarbonylamino group having 2 to 30 carbon atoms, for example, a methoxycarbonylamino group, an ethoxycarbonylamino group, a t-butoxycarbonylamino group, an n-octadecyloxycarbonylamino group, an N-methyl-methoxycarbonylamino group and the like.

Preferred examples of the aryloxycarbonylamino group include a substituted or unsubstituted aryloxycarbonylamino group having 7 to 30 carbon atoms, for example, a phenoxycarbonylamino group, a p-chlorophenoxycarbonylamino group, a m-n-octyloxyphenoxycarbonylamino group and the like.

Preferred examples of the sulfamoylamino group include a substituted or unsubstituted sulfamoylamino group having 0 to 30 carbon atoms, for example, a sulfamoylamino group, an N,N-dimethylaminosulfonylamino group, an N-n-octylaminosulfonylamino group and the like.

Preferred examples of the alkyl- or arylsulfonylamino group include a substituted or unsubstituted alkylsulfonylamino group having 1 to 30 carbon atoms, and a substituted or unsubstituted arylsulfonylamino group having 6 to 30 carbon atoms, for example, a methylsulfonylamino group, a butylsulfonylamino group, a phenylsulfonylamino group, a 2,3,5-trichlorophenylsulfonylamino group, a p-methylphenylsulfonylamino group and the like.

Preferred examples of the alkylthio group include a substituted or unsubstituted alkylthio group having 1 to 30 carbon atoms, for example, a methylthio group, an ethylthio group, an n-hexadecylthio group and the like.

Preferred examples of the arylthio group include a substituted or unsubstituted arylthio group having 6 to 30 carbon atoms, for example, a phenylthio group, a p-chlorophenylthio group, a m-methoxyphenylthio group and the like.

Preferred examples of the heterocyclic thio group include a substituted or unsubstituted heterocyclic thio group having 2 to 30 carbon atoms, for example, a 2-benzothiazolylthio group, a 1-phenyltetrazol-5-ylthio group and the like.

Preferred examples of the sulfamoyl group include a substituted or unsubstituted sulfamoyl group having 0 to 30 carbon atoms, for example, an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl)sulfamoyl group and the like.

Preferred examples of the alkyl- or arylsulfinyl group include a substituted or unsubstituted alkylsulfinyl group having 1 to 30 carbon atoms, and a substituted or unsubstituted arylsulfinyl group having 6 to 30 carbon atoms, for example, a methylsulfinyl group, an ethylsulfinyl group, a phenylsulfinyl group, a p-methylphenylsulfinyl group and the like.

Preferred examples of the alkyl- or arylsulfonyl group include a substituted or unsubstituted alkylsulfonyl group having 1 to 30 carbon atoms, and a substituted or unsubstituted arylsulfonyl group having 6 to 30 carbon atoms, for example, a methylsulfonyl group, an ethylsulfonyl group, a phenylsulfonyl group, a p-methylphenylsulfonyl group and the like.

Preferred examples of the acyl group include a formyl group, a substituted or unsubstituted alkylcarbonyl group having 2 to 30 carbon atoms, a substituted or unsubstituted arylcarbonyl group having 7 to 30 carbon atoms, and a substituted or unsubstituted heterocyclic carbonyl group having 2 to 30 carbon atoms, which is bound via a carbon atom to a carbonyl group, for example, an acetyl group, a pyvaloyl group, a 2-chloroacetyl group, a stearoyl group, a benzoyl group, a p-n-octyloxyphenylcarbonyl group, a 2-pyridylcarbonyl group, a 2-furylcarbonyl group and the like.

Preferred examples of the aryloxycarbonyl group include a substituted or unsubstituted aryloxycarbonyl group having 7 to 30 carbon atoms, for example, a phenoxycarbonyl group, an o-chlorophenoxycarbonyl group, a m-nitrophenoxycarbonyl group, a p-t-butylphenoxycarbonyl group and the like.

Preferred examples of the alkoxycarbonyl group include a substituted or unsubstituted alkoxycarbonyl group having 2 to 30 carbon atoms, for example, a methoxycarbonyl group, an ethoxycarbonyl group, a t-butoxycarbonyl group, an n-octadecyloxycarbonyl group and the like.

Preferred examples of the carbamoyl group include a substituted or unsubstituted carbamoyl group having 1 to 30 carbon atoms, for example, a carbamoyl group, an N-methylcarbamoyl group, an N,N-dimethylcarbamoyl group, an N,N-di-n-octylcarbamoyl group, an N-(methylsulfonyl)carbamoyl group and the like.

Preferred examples of the aryl- or heterocyclic azo group include a substituted or unsubstituted arylazo group having 6 to 30 carbon atoms, and a substituted or unsubstituted heterocyclic azo group having 3 to 30 carbon atoms, for example, phenylazo, p-chlorophenylazo, 5-ethylthio-1,3,4-thiadiazol-2-ylazo and the like.

Preferred examples of the imide group include an N-succinimide group, an N-phthalimide group and the like.

Preferred examples of the phosphino group include a substituted or unsubstituted phosphino group having 0 to 30 carbon atoms, for example, a dimethylphosphino group, a diphenylphosphino group, a methylphenoxyphosphino group and the like.

Preferred examples of the phosphinyl group include a substituted or unsubstituted phosphinyl group having 0 to 30 carbon atoms, for example, a phosphinyl group, a dioctyloxyphosphinyl group, a diethoxyphosphinyl group and the like.

Preferred examples of the phosphinyloxy group include a substituted or unsubstituted phosphinyloxy group having 0 to 30 carbon atoms, for example, a diphenoxyphosphinyloxy group, a dioctyloxyphosphinyloxy group and the like.

Preferred examples of the phosphinylamino group include a substituted or unsubstituted phosphinylamino group having 0 to 30 carbon atoms, for example, a dimethoxyphosphinylamino group, a dimethylaminophosphinylamino group and the like.

Preferred examples of the silyl group include a substituted or unsubstituted silyl group having 0 to 30 carbon atoms, for example, a trimethylsilyl group, a t-butyldimethylsilyl group, a phenyldimethylsilyl group and the like.

(Ionic Hydrophilic Group)

Examples of an ionic hydrophilic group include a sulfo group, a carboxyl group, a thiocarboxyl group, a sulfino group, a phosphono group, a dihydroxyphosphino group, a quaternary ammonium group and the like. The ionic hydrophilic group is particularly preferably a sulfo group or a carboxyl group. Further, the carboxyl group, the phosphono group and the sulfo group may be in a state of a salt, examples of the counter cation forming the salt include an ammonium ion, an alkali metal ion (for example, a lithium ion, a sodium ion and a potassium ion) and an organic cation (for example, a tetramethylammonium ion, a tetramethylguanidium ion and tetramethylphosphonium), a lithium salt, a sodium salt, a potassium salt and an ammonium salt are preferred, the lithium salt or a mixture salt including the lithium salt as a main component is more preferred, and the lithium salt is most preferred.

(Ink Composition)

The ink composition of the present invention is an ink composition which at least contains a first color material and a second color material, in which the first color material is a compound represented by the following Formula (A-I), and the second color material is at least one compound selected from a compound represented by the following Formula (B-I) and a compound represented by the following Formula (B-V).

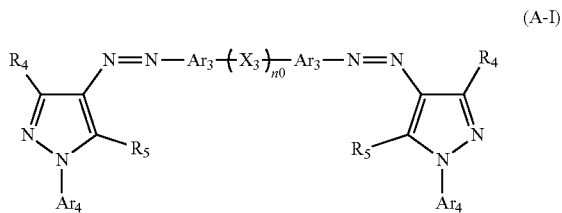

(A-I)

(In Formula (A-I), $R_4$ represents a substituent, $R_5$ represents —$OR_6$ or —$NHR_7$, $R_6$ and $R_7$ represent a hydrogen atom or a substituent, $X_3$ represents a divalent linking group, n0 is 0 or 1, $Ar_3$ represents a divalent heterocyclic group, and $Ar_4$ represents an alkyl group, an aryl group, or a triazine group.)

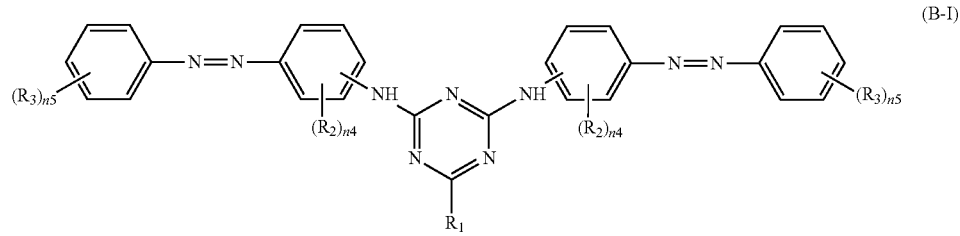

(B-I)

(In Formula (B-I), $R_1$ represents a hydrogen atom or a substituent, $R_2$ represents a substituent, $R_3$ represents an ionic hydrophilic group or an alkyl group which may form a ring, n4 is 0 to 4, and n5 is 2 to 5.)

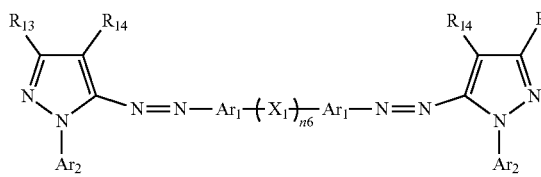

(B-V)

(In Formula (B-V), $R_{13}$ each independently represents a hydrogen atom or a substituent, $R_{14}$ each independently represents —$OR_{16}$, —$NHR_{17}$ or a cyano group, $R_{16}$ and $R_{17}$ represent a hydrogen atom or a substituent, $X_1$ represents a substituted or unsubstituted aryl group, or a substituted or unsubstituted triazine group, n6 is 0 or 1, $Ar_1$ each independently represents a divalent heterocyclic group, and $Ar_2$ each independently represents a substituted or unsubstituted alkyl group, a substituted or unsubstituted aryl group, or a triazine group.)

When an ink containing a dye in the related art alone is used, the hue of a printed matter is limited even though the concentration of the dye and an additive are changed. In the present invention, the ink contains a compound represented by Formula (A-I) as the first color material and a compound selected from a compound represented by Formula (B-I) and a compound represented by Formula (B-V), as the second color material, and thus the range of the color which the printed matter may express is very wide. In addition, a high printing density (OD value) may be obtained by using the ink containing the first color material and the second color material.

[Color Material]

(First Color Material)

An azo dye used as the first color material in the ink composition of the present invention is represented by Formula (A-I). Hereinafter, the azo dye (yellow dye) represented by Formula (A-I) will be described.

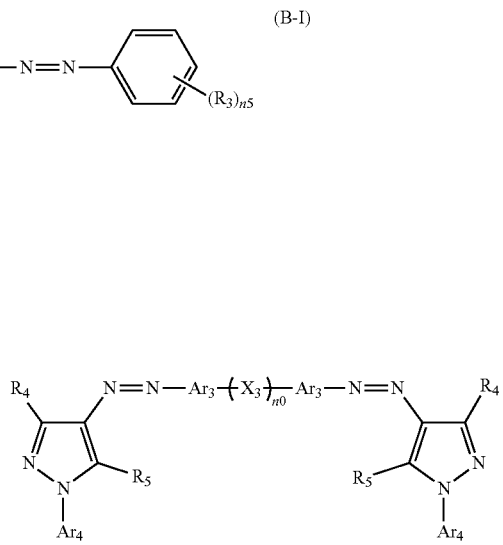

(A-I)

(In Formula (A-I), $R_4$ represents a substituent, $R_5$ represents —$OR_6$ or —$NHR_7$, $R_6$ and $R_7$ represent a hydrogen atom or a substituent, $X_3$ represents a divalent linking group, n0 is 0 or 1, $Ar_3$ represents a divalent heterocyclic group, and $Ar_4$ represents an alkyl group, an aryl group, or a triazine group.)

The divalent heterocyclic group represented by $Ar_3$ is preferably a 5-membered or 6-membered ring, and the rings may be further ring-condensed. In addition, the divalent heterocyclic group may be an aromatic heterocyclic ring or a non-aromatic heterocyclic ring. Examples of the divalent heterocyclic group represented by $Ar_3$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and the like. Among them, an aromatic heterocyclic group is preferred, and as described above, preferred examples thereof include pyridine, pyrazine, pyrimidine, pyridazine, triazine, pyrazole, imidazole, benzimidazole, triazole, thiazole, benzothiazole, isothiazole, benzisothiazole and thiadiazole. Thiadiazole is most preferred.

These groups may have a substituent, and examples of the substituent are the same as the aforementioned Group A of Substituents.

The substituent represented by $R_4$, $R_6$ and $R_7$ is selected from Group A of Substituents.

$R_4$ is preferably an alkyl group, an alkoxy group and an aryl group, and preferably an alkyl group having 1 to 4 carbon atoms, more preferably a methyl group, an ethyl group, a tertiary butyl group, a phenyl group, a methoxy group and an ethoxy group, and even more preferably a tertiary butyl group.

$R_5$ is preferably a substituted or unsubstituted amino group, and more preferably an unsubstituted amino group.

Furthermore, $Ar_4$ is preferably a substituted or unsubstituted aryl group, and more preferably a substituted or unsubstituted phenyl group.

When $R_4$, $R_5$, and $Ar_4$ further have a substituent, examples of the substituent include Group A of Substituents, and an alkyl group, an aryl group, a heterocyclic group, a cyano group, a hydroxyl group, a nitro group, or an alkoxy group is preferred, and an alkyl group, an aryl group, or a heterocyclic group is more preferred.

It is preferred that a divalent linking group represented by $X_3$ of General Formula (A-I) is an alkylene group (for example, methylene, ethylene, propylene, butylene, and pentylene), an alkenylene group (for example, ethenylene and propenylene), an alkynylene group (for example, ethynylene and propynylene), an arylene group (for example, phenylene and naphthylene), a divalent heterocyclic group (for example, a 6-chloro-1,3,5-triazin-2,4-diyl group, a pyrimidin-2,4-diyl group, and a quinoxalin-2,3-diyl group), —O—, —CO—, —NR— (in which $R_4$ is a hydrogen atom, an alkyl group, or an aryl group), —S—, —SO$_2$—, —SO—, or a combination thereof.

The alkylene group, the alkenylene group, the alkynylene group, the arylene group and the divalent heterocyclic group, which are represented by $X_3$, and the alkyl group or the aryl group represented by $R_4$ may have a substituent. Examples of the substituent are the same as the substituents. The alkyl group and the aryl group represented by $R_4$ include an alkyl group or an aryl group, substituted or unsubstituted. The substituted or unsubstituted alkyl group is preferably an alkyl group having 1 to 30 carbon atoms, and the substituted or unsubstituted aryl group is preferably an aryl group having 6 to 30 carbon atoms.

The divalent linking group represented by $X_3$ of Formula (A-I) is more preferably an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —O—, —S—, or a combination thereof, and an alkylene group, or —S—, or a combination thereof is more preferred.

The total number of carbon atoms in the divalent linking group is preferably 0 to 50, more preferably 0 to 30, and most preferably 0 to 10.

The aryl group or the arylene group represented by $Ar_4$ has the same meaning as the aforementioned aryl group or arylene group represented $R_4$, and preferred examples thereof are also the same. Further, the triazine group represented by $Ar_4$ may have a monovalent substituent (the monovalent substituent has the same meaning as the aforementioned Group A of Substituents, and preferred examples thereof are also the same.).

The compound represented by Formula (A-I) is preferably a compound represented by the following Formula (A-II), and more preferably a compound represented by the following Formula (A-III).

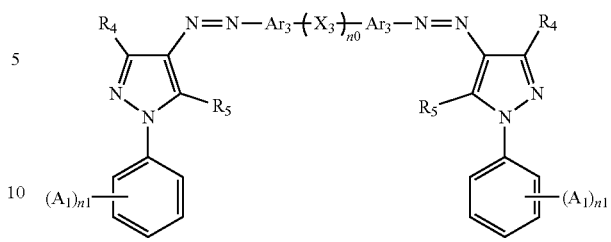

(In Formula (A-II), $R_4$ represents a substituent, $R_5$ represents —OR$_6$ or —NHR$_7$, $R_6$ and $R_7$ represent a hydrogen atom or a substituent, $X_3$ represents a divalent linking group, n0 is 0 or 1, $Ar_3$ represents a divalent heterocyclic group, $A_1$ represents an ionic hydrophilic group, and n1 represents 0 to 2.)

$R_4$, $R_5$, $Ar_3$, n0 and $X_3$ in Formula (A-II) have the same meaning as $R_4$, $R_5$, $Ar_3$, n0 and $X_3$ in Formula (A-I), and preferred examples thereof are also the same.

The ionic hydrophilic group represented by $A_1$ is preferably —SO$_3$M or —CO$_2$M, more preferably —SO$_3$M, and particularly preferably —CO$_2$K. M each independently represents a hydrogen atom or a monovalent counter cation, examples of the monovalent counter cation include an ammonium ion, an alkali metal ion (for example, a lithium ion, a sodium ion and a potassium ion), and an organic cation (for example, a tetramethylammonium ion, a tetramethylguanidium ion and tetramethylphosphonium), and a lithium salt, a sodium salt, a potassium salt, or an ammonium salt is preferred, a potassium salt or a mixture salt including the potassium salt as a main component is more preferred, and a potassium salt is most preferred.

Formula (A-III):

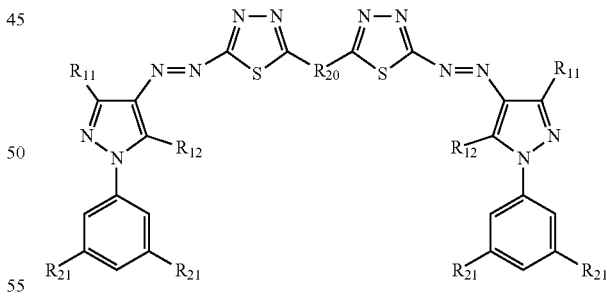

(In Formula (A-III), $R_{20}$ represents a linking group consisting of an alkylene group, —S— or a combination thereof, $R_{21}$ represents an ionic hydrophilic group, $R_{11}$ represents an alkyl group, and $R_{12}$ represents an amino group.)

$R_{20}$ has the same meaning as the alkylene group in the divalent linking group represented by $X_3$ of Formula (A-I), and preferred examples thereof are also the same.

$R_{21}$ represents a carboxyl group (—CO$_2$M), M each independently represents a hydrogen atom or a monovalent counter cation, examples of the monovalent counter cation include an ammonium ion, an alkali metal ion (for example, a lithium ion, a sodium ion and a potassium ion) and an organic cation (for example, a tetramethylammonium ion, a tetramethylguanidium ion and tetramethylphosphonium), a lithium salt, a sodium salt, a potassium salt and an ammonium salt are preferred, a potassium salt or a mixture salt including the potassium salt as a main component is more preferred, and a potassium salt is most preferred.

The alkyl group represented by $R_{11}$ and the amino group represented by $R_{12}$ have the same meaning as the alkyl group and the amino group in $R_4$ and $R_5$ of Formula (A-I), respectively, and preferred examples thereof are also the same.

Specific examples of the compound represented by Formula (A-I), (A-II) or (A-III) will be described below, but the compound used in the present invention is not limited to the following examples. Meanwhile, in the specific examples, Et and Ph mean ethyl and phenyl, respectively.

| Colorant | R |
|---|---|
| 1 | —SCH$_2$S— |
| 2 | —SCH$_2$CH$_2$S— |
| 3 | —SCH$_2$CH$_2$CH$_2$S— |
| 4 | —SCH$_2$CH$_2$CH$_2$CH$_2$CH$_2$S— |
| 5 | —SCH$_2$CH(CH$_3$)S— |
| 6 | —SCH$_2$CH$_2$CH(CH$_3$)S— |
| 7 | —SC$_2$H$_4$OC$_2$H$_4$S— |
| 8 | —SC$_2$H$_4$OC$_2$H$_4$OC$_2$H$_4$S— |
| 9 | —SCH$_2$CH(OH)CH$_2$S— |
| 10 | —SCH$_2$CH(CH$_2$OH)— |
| 11 | —SCH(COONa)CH$_2$S— |
| 12 | —SCH(COONa)CH$_2$CH$_2$CH(COONa)S— |
| 13 | —SCH(COONa)—CH(COONa)S— |
| 14 | —(1,4-phenylene)— |
| 15 | —(1,3-phenylene)— |

-continued
| | |
|---|---|
| 16 |  |
| 17 |  |
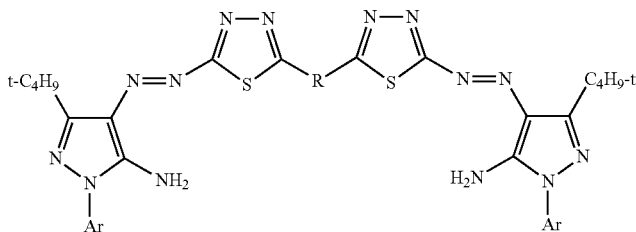
| Colorant | Ar | R |
|---|---|---|
| 18 | 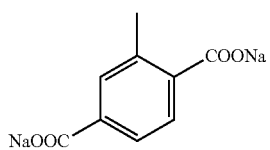 | —SC$_3$H$_6$S— |
| 19 | 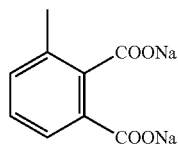 | —SC$_3$H$_6$S— |
| 20 | 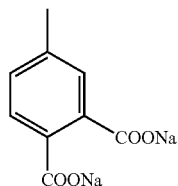 | —SC$_3$H$_6$S— |
| 21 | 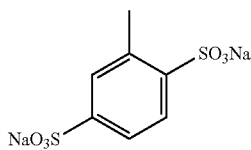 | —SC$_3$H$_6$S— |
| 22 | 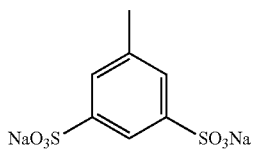 | —SC$_3$H$_6$S— |
| 23 | 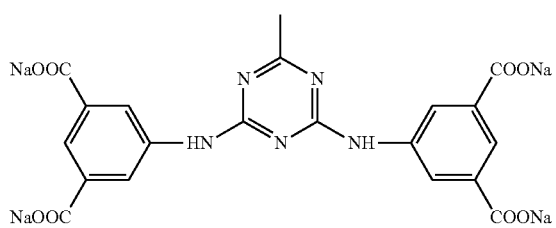 | —SC$_3$H$_6$S— |

-continued
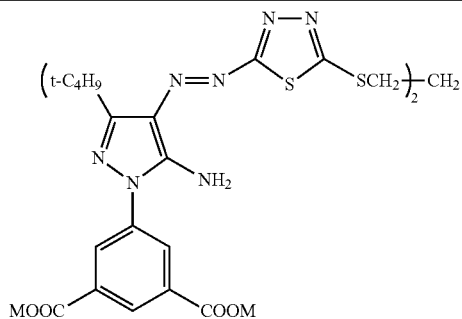
| Colorant | M |
|---|---|
| 24 | K |
| 25 | Li |
| 26 | NH$_4$ |
| 27 | NH(Et)$_3$ |
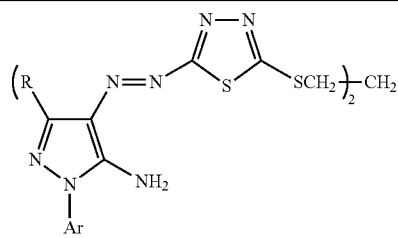
| Colorant | R | Ar |
|---|---|---|
| 28 | OEt | ![3,5-di(COONa)phenyl with methyl] |
| 29 | Ph | ![3,5-di(COONa)phenyl with methyl] |
| 30 | t-C$_4$H$_9$ | C$_3$H$_6$SO$_3$Na |
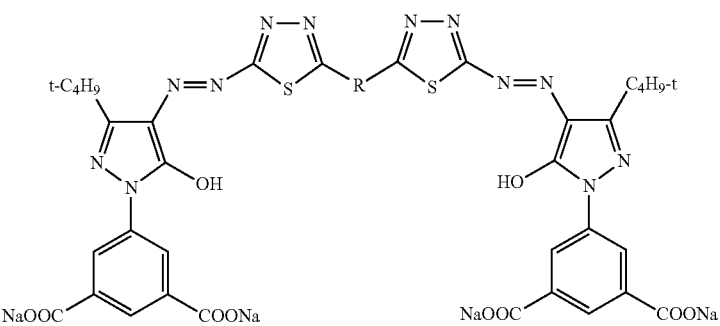
| Colorant | R |
|---|---|
| 31 | —SCH$_2$CH$_2$S— |
| 32 | —SCH$_2$CH$_2$CH$_2$S— |

-continued

| | |
|---|---|
| 33 | —SCH$_2$CH$_2$CH$_2$CH$_2$CH$_2$S— |
| 34 |  |

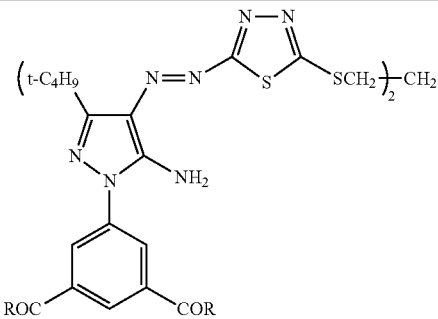

| Colorant | R |
|---|---|
| 35 | 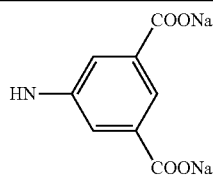 |
| 36 | NHC$_2$H$_4$COONa |
| 37 | 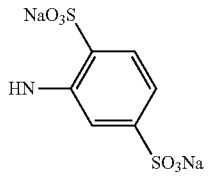 |

The compounds represented by Formulae (A-I) to (A-III) may be synthesized by general synthesis methods, and may be synthesized by changing or variously combining the diazo component and the coupling component described in, for example, Japanese Patent Application Laid-Open No. 2004-0083903.

(Second Color Material)

The ink composition of the present invention needs to contain the compound represented by Formula (A-I) as the first color material, and simultaneously, contain at least one selected from the compound represented by Formula (B-I) and the compound represented by Formula (B-V), as the second color material.

As described above, a synergistic effect may be exhibited by using the first color material represented by Formula (A-I) in combination with the second color material selected from Formula (B-I) and Formula (B-V), thereby obtaining the following effect. That is, by containing these color materials, it is possible to not only use a yellow ink composition having a high tinctorial strength, but also to impart an image having further excellent light resistance, and furthermore, exhibit a desired hue.

(Compound Represented by Formula (B-I))

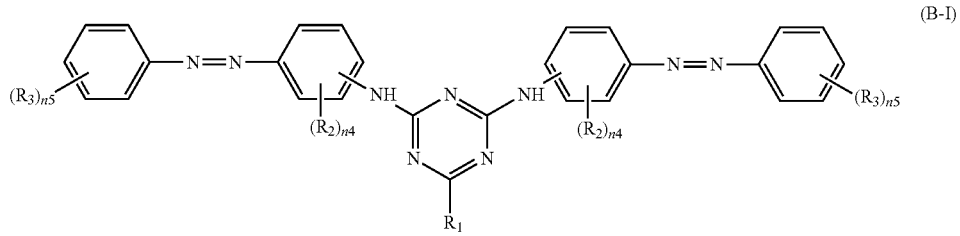

(B-I)

(In Formula (B-I), $R_1$ represents a hydrogen atom or a substituent, $R_2$ represents a substituent, $R_3$ represents an ionic hydrophilic group or an alkyl group which may form a ring, n4 is 0 to 4, and n5 is 2 to 5.)

Hereinafter, Formula (B-I) will be described in detail.

In Formula (B-I), examples of the substituent represented by $R_1$ and $R_2$ each independently include an alkyl which may be substituted, an alkoxy which may be substituted, an aryl which may be substituted, a heterocyclic group which may be substituted, —$NR^8R^9$, —$NHCOR^8$, —$NHCONR^8R^9$, —$C(O)R^8$, —$C(O)OR^8$, —$C(O)NR^8R^9$, —$PO_3H_2$, —$SR^8$, —$SO_2R^8$, —$SO_2NR^8R^9$, —$SOR^8$, —$SO_3H$, —$CF_3$, —CN, —$NO_2$, hydroxyl, or halogen. Here, $R^8$ and $R^9$ are each independently H, an alkyl group having 1 to 8 carbon atoms, which may be substituted, an aryl group (for example, a phenyl group) which may be substituted, and a heterocyclic group which may be substituted, or $R^8$ and $R^9$ may form a five-membered ring or a six-membered ring (for example, piperidine, pyrrolidone, pyridine, piperizine, or morpholine), which may be substituted, together with a nitrogen atom to which the groups are bound.

The ionic hydrophilic group represented by $R_3$ is preferably —$SO_3M$ or —$CO_2M$, and more preferably —$SO_3M$. M each independently represents a hydrogen atom or a monovalent counter cation, and examples of the monovalent counter cation include an ammonium ion, an alkali metal ion (for example, a lithium ion, a sodium ion and a potassium ion) and an organic cation (for example, a tetramethylammonium ion, a tetramethylguanidium ion and tetramethylphosphonium), and a lithium salt, a sodium salt, a potassium salt and an ammonium salt are preferred. The ionic hydrophilic group represented by $R_3$ is preferably a sulfo group, and more preferably a potassium salt of a sulfo group.

The alkyl group represented by $R_3$ may have a substituent and is preferably an alkyl group having 1 to 4 carbon atoms, and examples thereof include methyl, ethyl, propyl, isopropyl, butyl and sec-butyl, which may be substituted with a hydroxyl group, a halogen group, a carboxyl group, a sulfo group and the like. The examples include, but are not limited to, trifuloromethyl, hydroxyethyl, sulfopropyl and carboxyethyl.

When an alkyl group represented by $R_3$ may combine with each other to form a ring, examples of the ring include an aryl group which may be substituted or a heterocyclic group which may be substituted, examples of the aryl group and the heterocyclic group include an aryl group and a heterocyclic group in the aforementioned Group A of Substituents, examples of the ring formed by combining with each other include a benzene ring and a naphthalene ring, and a benzene ring is preferred.

In addition, it is preferred that the ring formed by combining an alkyl group represented by $R_3$ with each other is substituted with a sulfonate group.

In Formula (B-I), when $R_1$ and $R_2$ are an alkoxy which may be substituted, $R_1$ and $R_2$ are preferably an alkoxy having 1 to 8 carbon atoms, which may be substituted, and more preferably an alkoxy having 1 to 4 carbon atoms, for example, a methoxy, an ethoxy, a propoxy, an isopropoxy and a butoxy, which may be substituted with a hydroxyl group, a halogen group or a carboxyl group. The examples include, but are not limited to, carboxypropyloxy, carboxyethoxy, hydroxyethoxy or chloroethoxy.

In Formula (B-I), when $R_1$ and $R_2$ are an aryl group which may be substituted, $R_1$ and $R_2$ are preferably a phenyl which may be substituted. Examples of a substituent as desired on an aryl ring include an alkyl having 1 to 8 carbon atoms, an alkoxy having 1 to 8 carbon atoms, —$NR^8R^9$, —$NHCOR^8$, —$NHCONR^8R^9$, —$C(O)R^8$, —$C(O)OR^8$, —$C(O)NR^8R^9$, —$PO_3H_2$, —$SR^8$, —$SO_2R^8$, —$SO_2NR^8R^9$, —$SOR^8$, —$SO_3H$, —$CF_3$, —CN, —$NO_2$, a hydroxyl or a halogen, and here, $R^8$ and $R^9$ are the same as described above. The examples include, but are not limited to, carboxyphenyl, sulfophenyl, nitrophenyl and chlorophenyl.

In Formula (B-I), when $R_1$ and $R_2$ are a heterocyclic group which may be substituted, $R_1$ and $R_2$ are preferably any one of an aliphatic heterocyclic group which may be substituted and an aromatic heterocyclic group which may be substituted, for example, a thiophene, a pyrazole, a triazole, a thiadiazole, a thiazole, an imidazole, a pyridine, a pyrrolidone, a piperizine, a morpholine or a pyrimidine, which may be substituted. Examples of a substituent as desired on a heterocyclic ring include an alkyl having 1 to 8 carbon atoms, —$NR^8R^9$, —$NHCOR^8$, —$NHCONR^8R^9$, —$C(O)OR^8$, —$C(O)NR^8R^9$, —$SR^8$, —$SO_2R^8$, —$SO_2NR^8R^9$, —$SOR^8$, —$SO_3H$, —$CF_3$, —CN, —$NO_2$, a hydroxyl or a halogen, and here, $R^8$ and $R^9$ are the same as described above. The examples include, but are not limited to, carboxytriazole, chloropyridyl and cyanothiophene.

In Formula (B-I), $R_1$ and $R_2$ are each independently a hydrogen atom, a hydroxyl group, an alkyl group having 1 to 4 carbon atoms (preferably, a methyl group or an ethyl group), which may be substituted, an alkoxy group having 1 to 4 carbon atoms (preferably, a methoxy group or an ethoxy group), which may be substituted, —$NR^8R^9$—$SO_2NR^8R^9$ or —$NHCONR^8R^9$, and here, $R^8$ and $R^9$ may be as described above, but more preferably, $R^8$ is H and $R^9$ is H, an alkyl group having 1 to 4 carbon atoms (preferably, a methyl group or an ethyl group), which may be substituted, or an aryl group (preferably, a phenyl group).

It is preferred that $R_1$ and $R_2$ are each independently a hydrogen atom, a hydroxyl group, an alkyl group having 1 to 4 carbon atoms, an alkoxy group having 1 to 4 carbon atoms, a carboxyl acid group, —$NR^8R^9$ or $NHCONH_2$.

$R_1$ is more preferably a hydroxyl group or —$NR^8R^9$. Preferably, $R^8$ is H and $R^9$ is H, and an alkyl group having 1 to 4 carbon atoms (preferably, a methyl group or an ethyl group), which may be substituted, and more preferably, $R^8$ is H and $R^9$ is an alkyl group having 1 to 4 carbon atoms (preferably, a methyl group or an ethyl group), which is substituted with a hydroxyl group.

$R_2$ is more preferably a hydrogen atom, an alkyl having 1 to 4 carbon atoms or carboxyl acid, and even more preferably, carboxyl acid because carboxyl acid has particularly good solubility, fastness to light and fastness to ozone.

n4 is 0 to 4, preferably 1 to 4, and more preferably 1 and 2.

n5 is 2 to 5, preferably 2 to 4, more preferably 2 to 4, and even more preferably 2 and 3. This is because the solubility of the compound of Formula (B-I) in an aqueous liquid medium is improved.

The compound represented by Formula (B-I) is preferably a compound represented by the following Formula (B-II) or a compound represented by the following Formula (B-III).

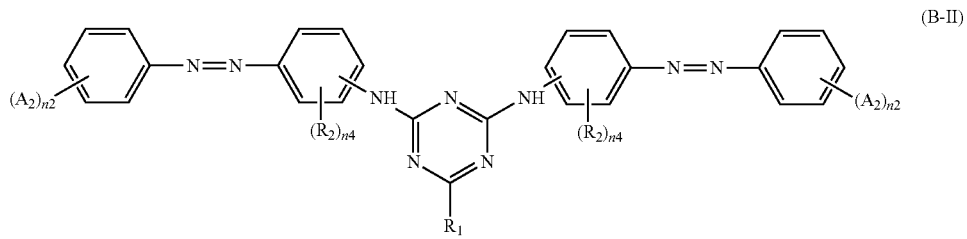

(B-II)

(In Formula (B-II), $R_1$ represents a hydrogen atom or a substituent, $R_2$ represents a substituent, $A_2$ represents an ionic hydrophilic group, n4 is 0 to 4, and n2 represents 2 to 4.)

The ionic hydrophilic group represented by $A_2$ is preferably —$SO_3M$ or —$CO_2M$, and more preferably —$SO_3M$. M each independently represents a hydrogen atom or a monovalent counter cation, and examples of the monovalent counter cation include an ammonium ion, an alkali metal ion (for example, a lithium ion, a sodium ion and a potassium ion) and an organic cation (for example, a tetramethylammonium ion, a tetramethylguanidium ion and tetramethylphosphonium), and a lithium salt, a sodium salt, a potassium salt and an ammonium salt are preferred. The ionic hydrophilic group represented by $A_2$ is preferably a sulfo group, and more preferably a potassium salt of a sulfo group.

$R_1$ and $R_2$ in Formula (B-II) have the same meaning as $R_1$ and $R_2$ in Formula (B-I), and preferred examples thereof are also the same.

n4 is 0 to 4, preferably 1 to 4, and more preferably 1 and 2.

n2 is preferably 2 to 4, more preferably 2 to 4, and even more preferably 2 and 3. This is because the solubility of the compound of Formula (B-II) in an aqueous liquid medium is improved.

The ionic hydrophilic group represented by $A_3$ is preferably —$SO_3M$ or —$CO_2M$, and more preferably —$SO_3M$. M each independently represents a hydrogen atom or a monovalent counter cation, and examples of the monovalent counter cation include an ammonium ion, an alkali metal ion (for example, a lithium ion, a sodium ion and a potassium ion) and an organic cation (for example, a tetramethylammonium ion, a tetramethylguanidium ion and tetramethylphosphonium), and a lithium salt, a sodium salt, a potassium salt and an ammonium salt are preferred. The ionic hydrophilic group represented by $A_3$ is preferably a sulfo group, and more preferably a potassium salt of a sulfo group.

$R_1$ and $R_2$ in Formula (B-III) have the same meaning as $R_1$ and $R_2$ in Formula (B-I), and preferred examples thereof are also the same.

n4 is 0 to 4, preferably 1 to 4, and more preferably 1 and 2.

n3 is preferably 2 to 4, more preferably 2 to 4, and even more preferably 2 and 3. This is because the solubility of the compound of Formula (B-III) in an aqueous liquid medium is improved.

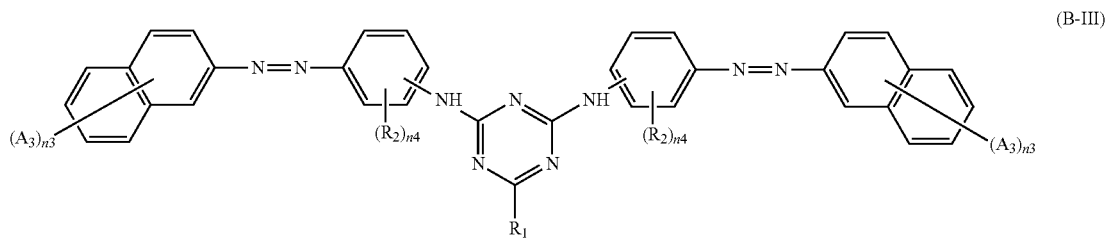

(B-III)

(In Formula (B-III), $R_1$ represents a hydrogen atom or a substituent, $R_2$ represents a substituent, $A_3$ represents an ionic hydrophilic group, n4 is 0 to 4, and n3 represents 2 to 4.)

The compound represented by Formula (B-III) is more preferably a compound represented by the following Formula (B-IV).

[Chem. 26]

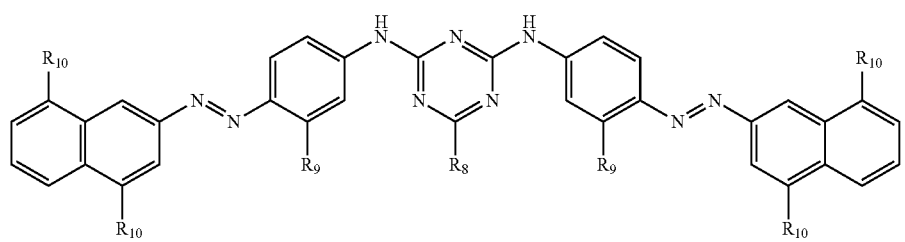

(B-IV)

(In Formula (B-IV), $R_8$ represents a hydroxyl group or —$NR^8R^9$. $R_9$ each independently represents a hydrogen atom, a hydroxyl group, an alkyl group having 1 to 4 carbon atoms, an alkoxy group having 1 to 4 carbon atoms, a carboxyl acid group, —$NR^8R^9$ or $NHCONH_2$. $R^8$ and $R^9$ are each independently H, an alkyl group having 1 to 8 carbon atoms, which may be substituted, an aryl group (for example, a phenyl group) which may be substituted, and a heterocyclic group which may be substituted, or $R_8$ and $R_9$ may form a five-membered ring or a six-membered ring, which may be substituted, together with a nitrogen atom to which the groups are bound. $R_{10}$ each independently represents a carboxyl group or a sulfo group.)

Examples of the five-membered ring or the six-membered ring which $R^8$ and $R^9$ form include piperidine, pyrrolidone, pyridine, piperizine, or morpholine. These groups may have a substituent, and examples of the substituent include Group A of Substituents. An amino group represented by $R_8$, an alkyl group, an alkoxy group, a sulfo group and an aminocarbonylamino group represented by $R_9$, and a sulfo group represented by $R_{10}$ have the same meaning as the amino group, the alkyl group, the alkoxy group, the sulfo group, the aminocarbonylamino group and the sulfo group in the aforementioned Group A of Substituents, and preferred examples thereof are also the same.

$R^{10}$ is preferably a sulfo group, and more preferably a potassium salt of a sulfo group.

The compounds represented by Formulae (B-I) to (B-IV) may be symmetric or asymmetric.

Subsequently, specific examples of the compounds represented by Formulae (B-I) to (B-IV) of the present invention will be shown in the following Tables.

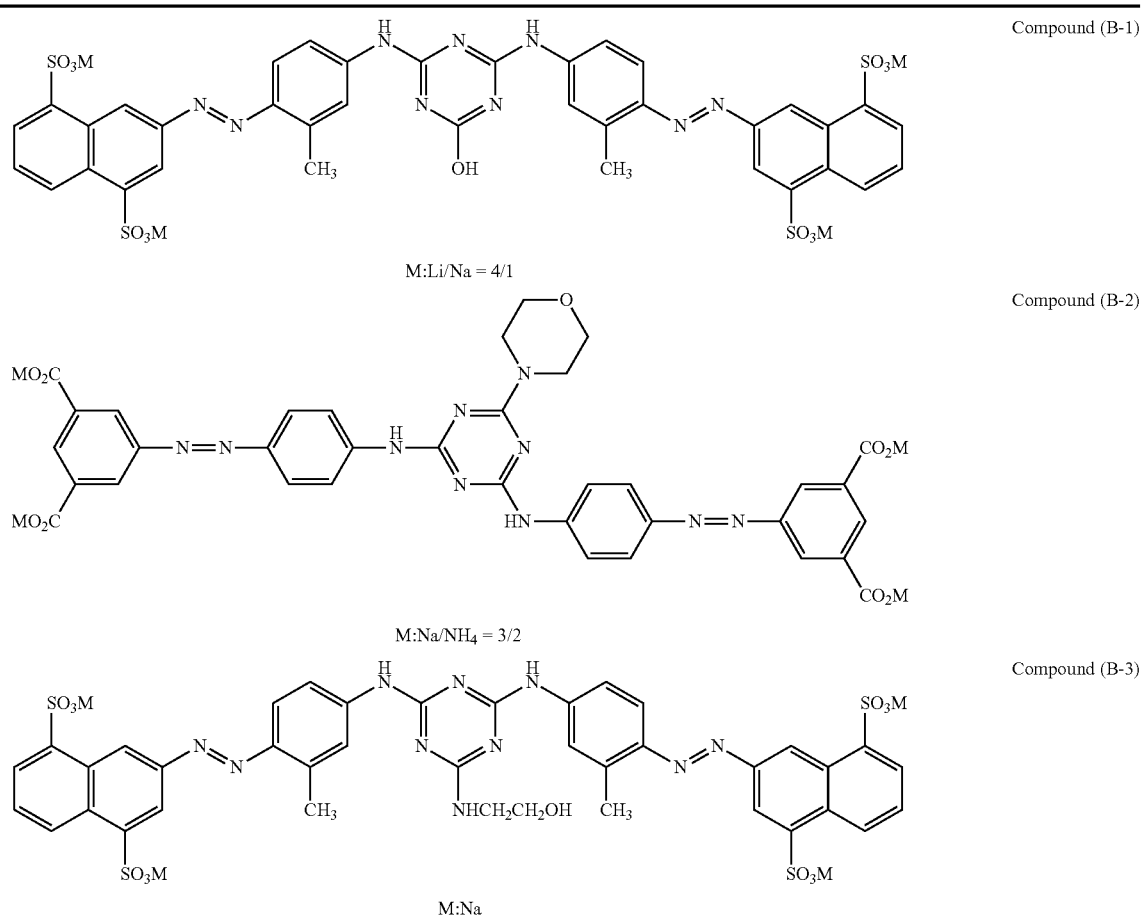

-continued
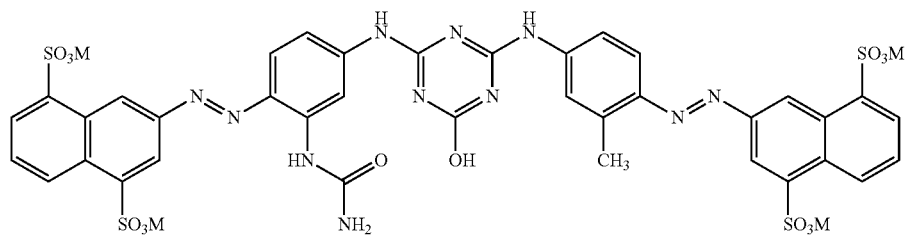
Compound (B-4)
M:Li/Na = 4/1
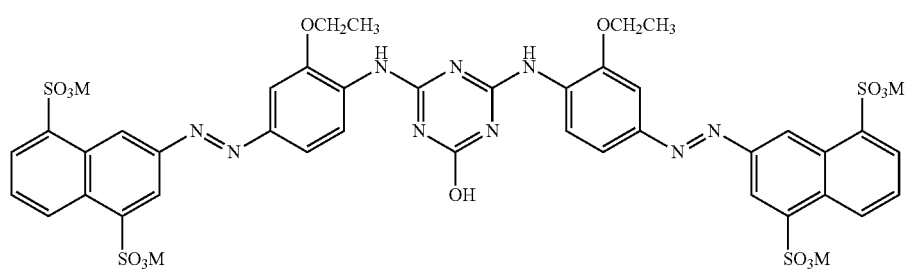
Compound (B-5)
M:Li/Na = 4/1
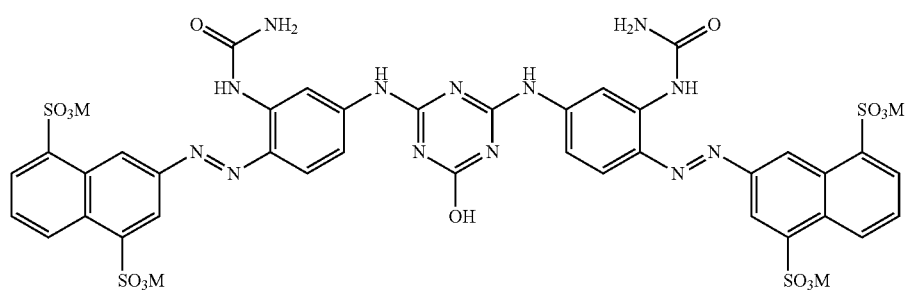
Compound (B-6)
M:Li/Na = 4/1
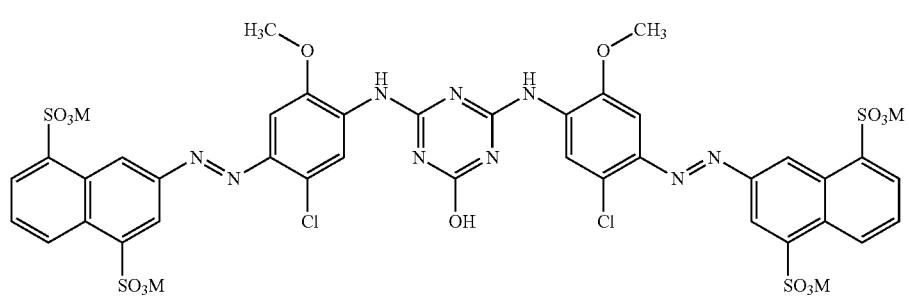
Compound (B-7)
M:Li/Na = 4/1
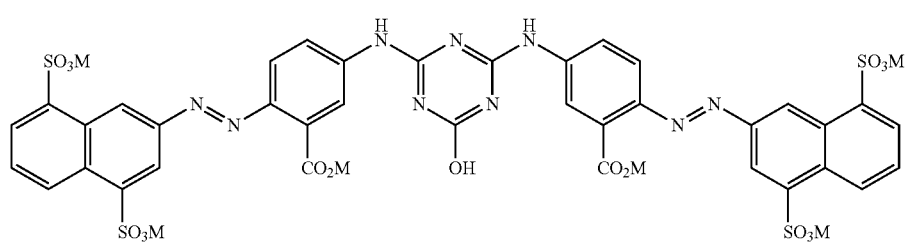
Compound (B-8)
M:Li/Na = 4/1

-continued
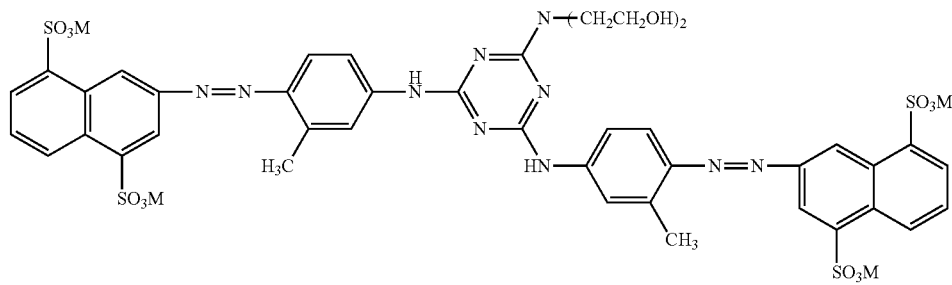
Compound (B-9)
M:Na
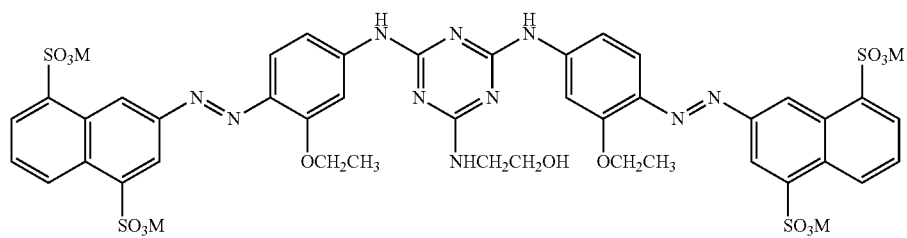
Compound (B-10)
M:Na
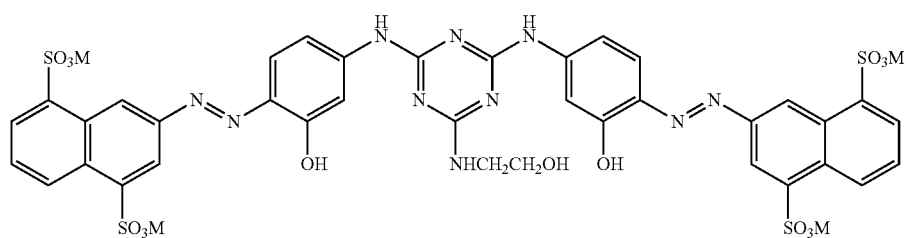
Compound (B-11)
M:Na
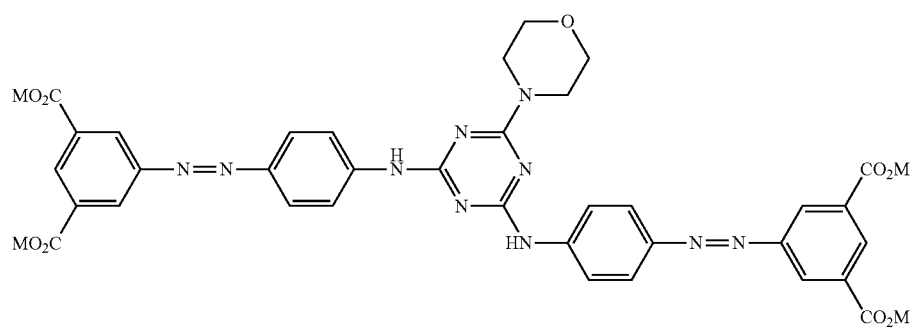
M:Na/NH$_4$ = 4/1
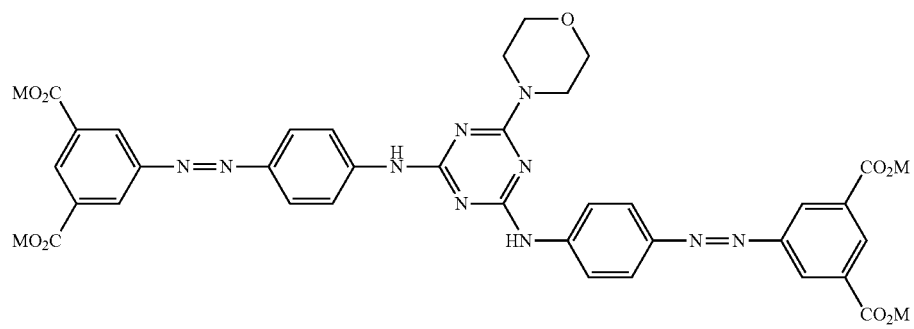
M:Na/NH$_4$ = 1/4

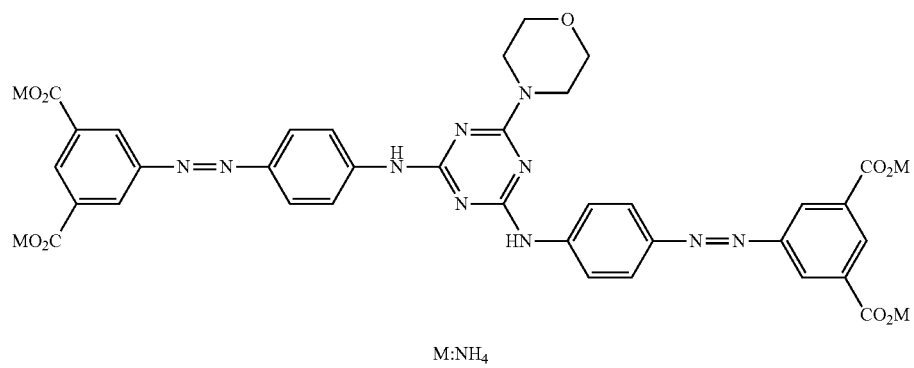
M:NH₄
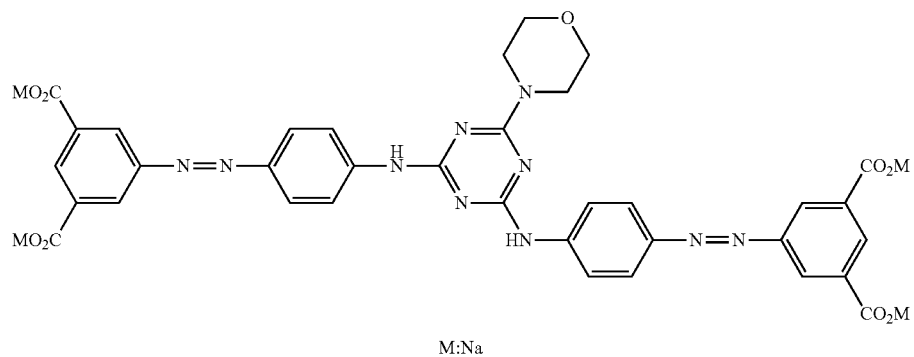
M:Na
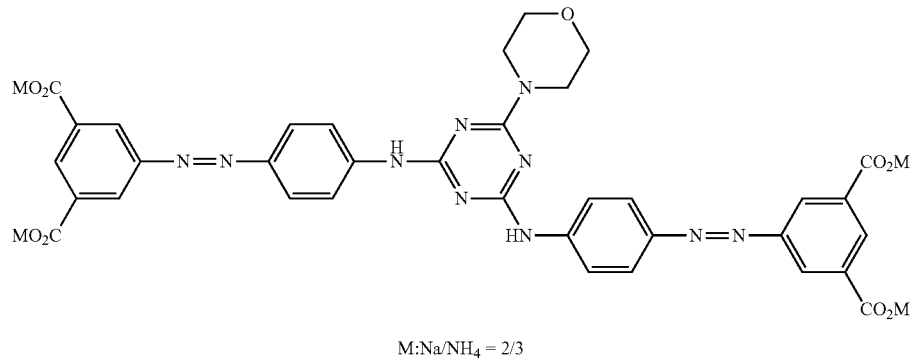
M:Na/NH₄ = 2/3
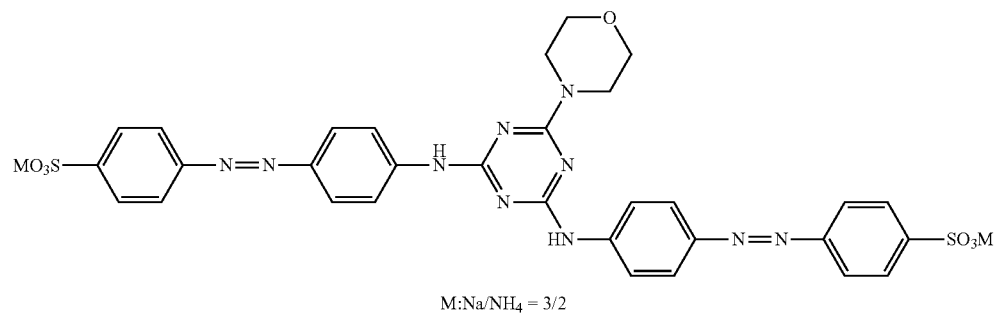
M:Na/NH₄ = 3/2

-continued
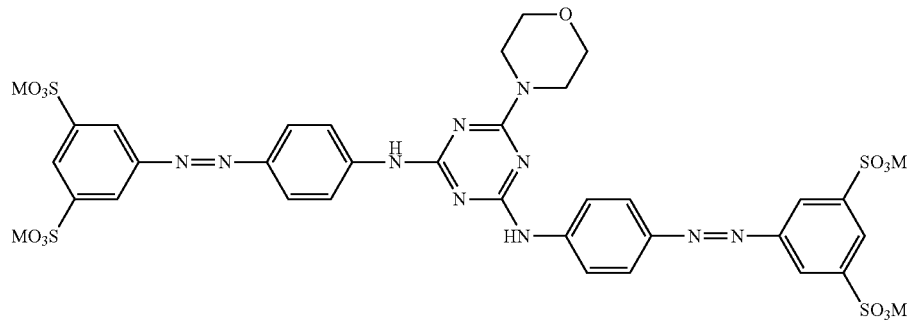
M:Na/NH$_4$ = 3/2
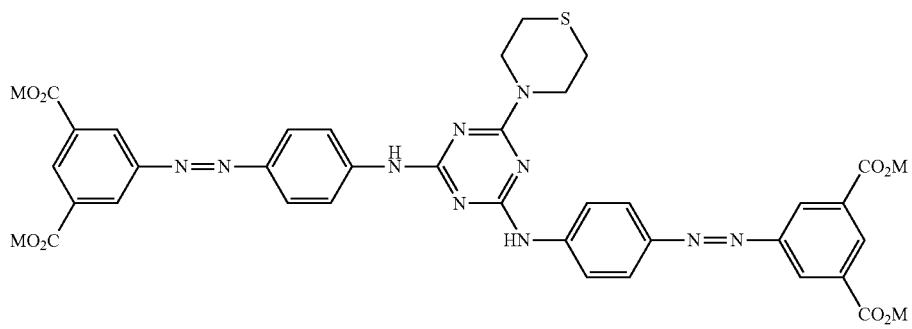
M:Na/NH$_4$ = 3/2
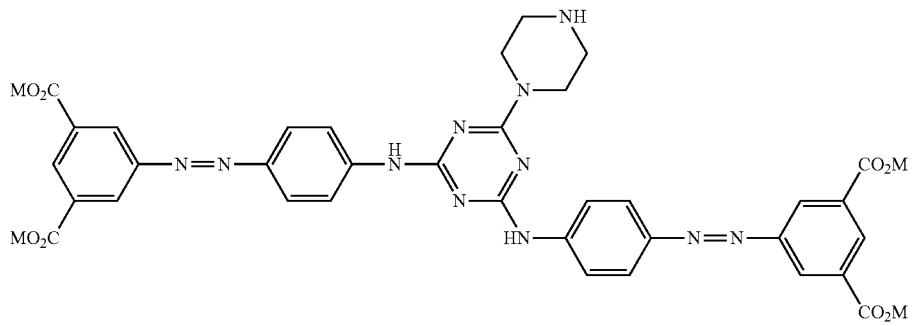
M:Na/NH$_4$ = 3/2
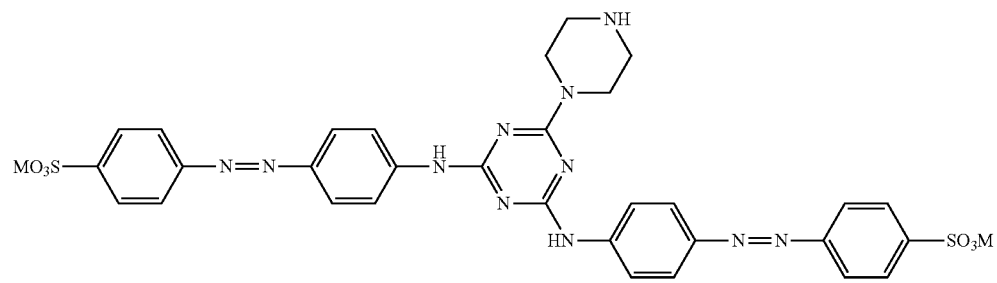
M:Na/NH$_4$ = 3/2

-continued
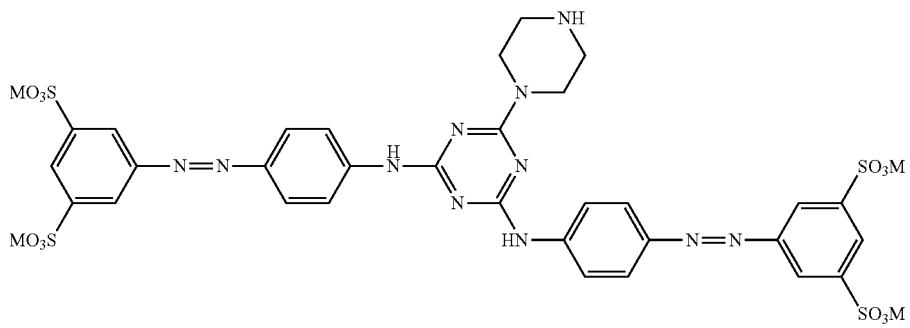
M:Na/NH₄ = 3/2
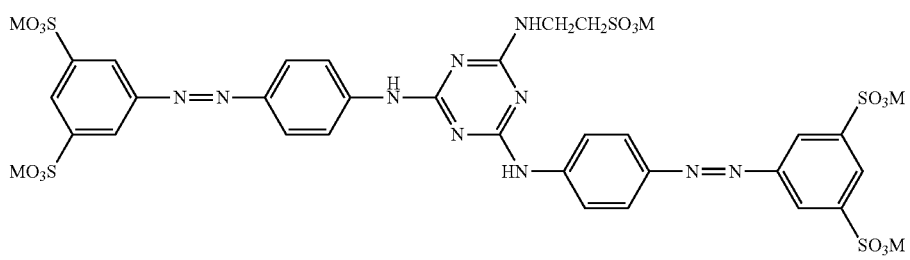
M:Na/NH₄ = 3/2
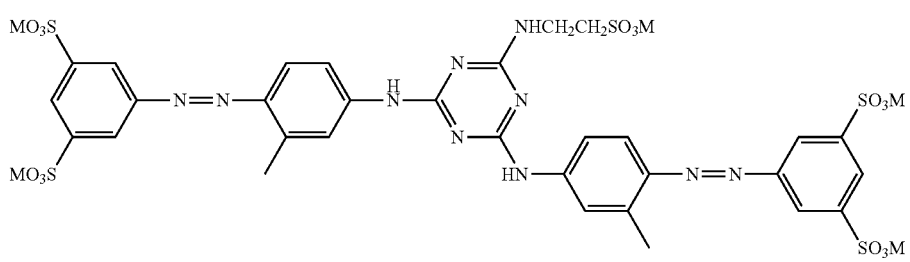
M:Na/NH₄ = 3/2
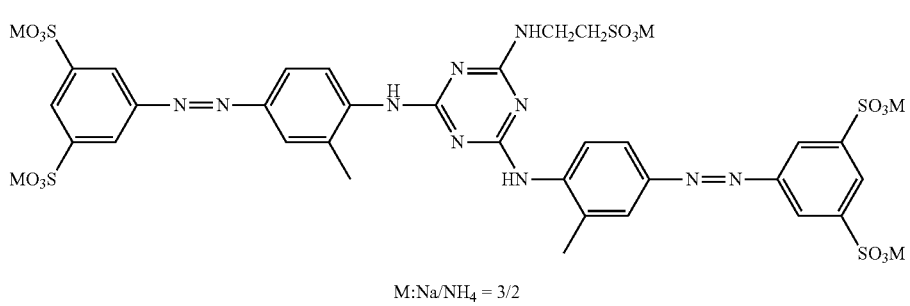
M:Na/NH₄ = 3/2
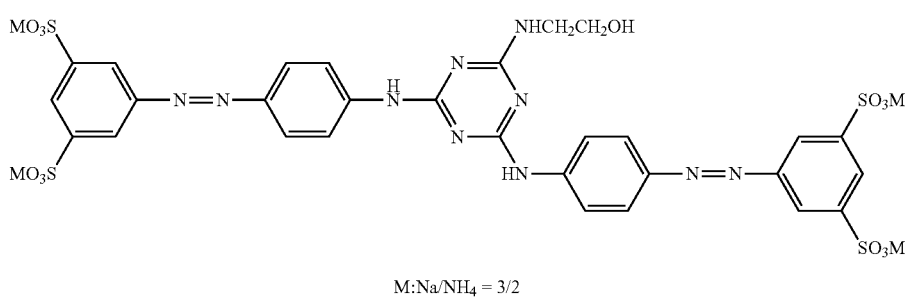
M:Na/NH₄ = 3/2

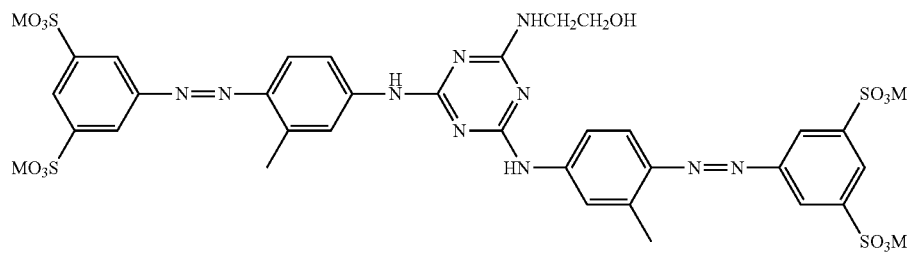
M:Na/NH₄ = 3/2
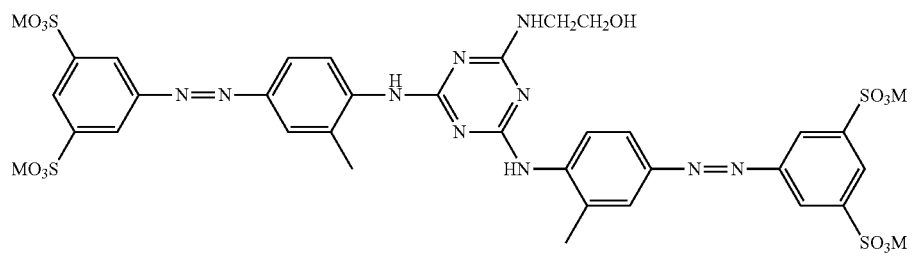
M:Na/NH₄ = 3/2
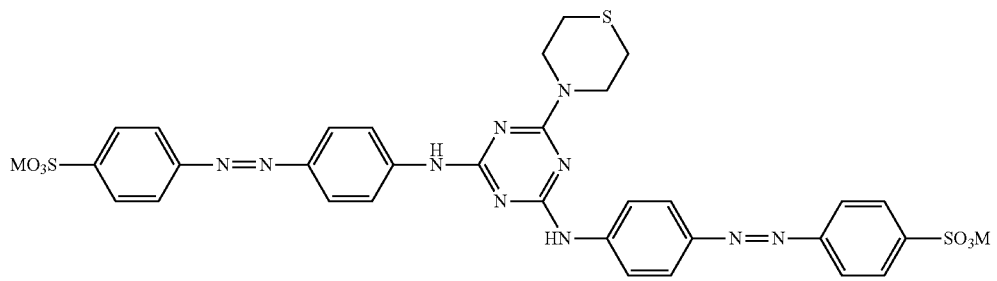
M:Na/NH₄ = 3/2
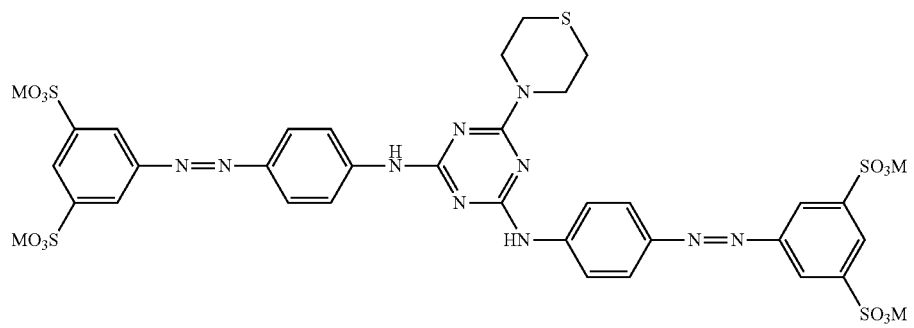
M:Na/NH₄ = 3/2
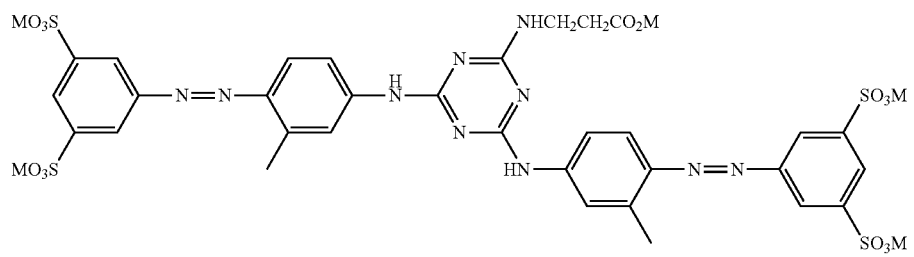
M:Na/NH₄ = 3/2

-continued
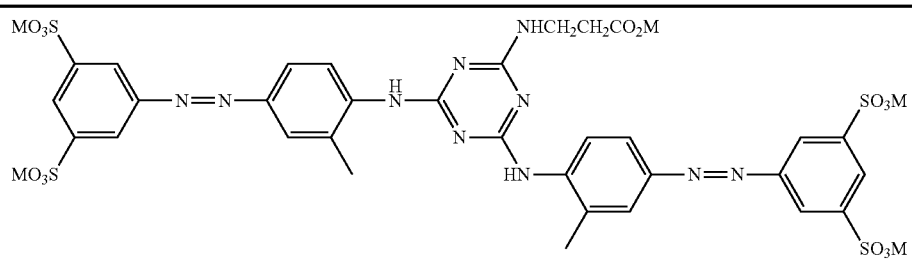
M:Na/NH₄ = 3/2
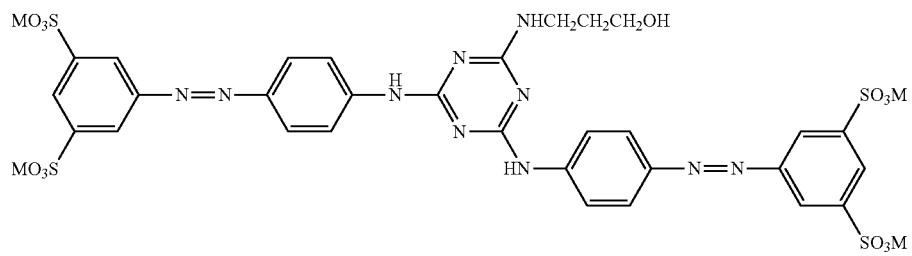
M:Na/NH₄ = 3/2
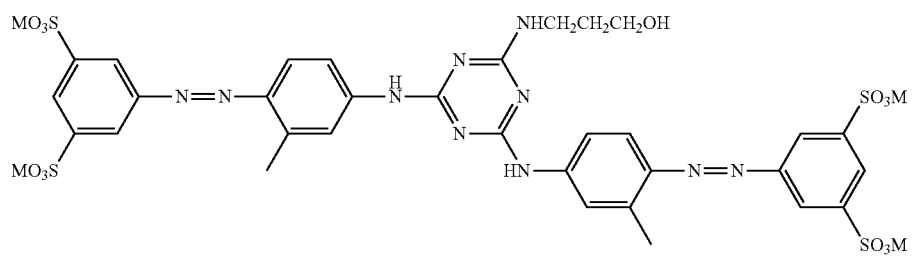
M:Na/NH₄ = 3/2
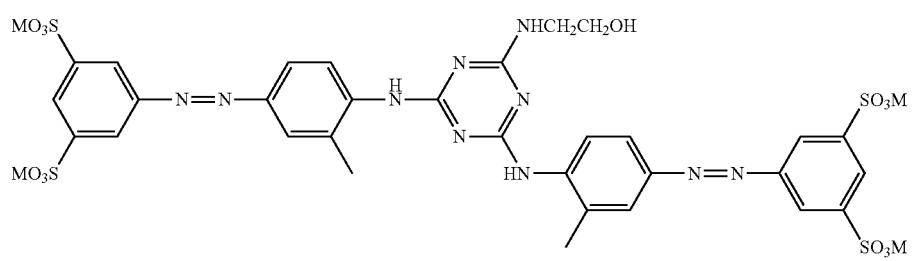
M:Na/NH₄ = 3/2
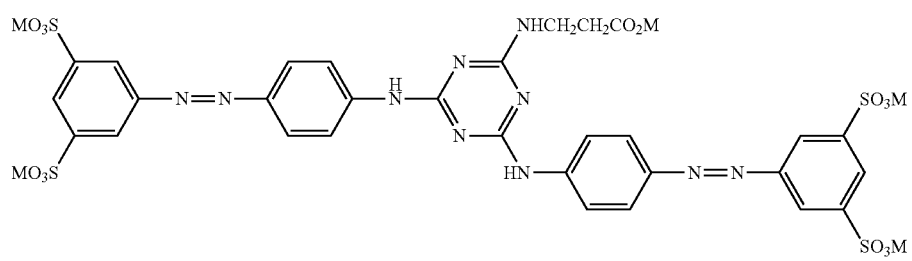
M:Na/NH₄ = 3/2

TABLE 1

Table A

Dye Structure

3

4

6

7

8

TABLE 1-continued
Table A
Dye Structure
9
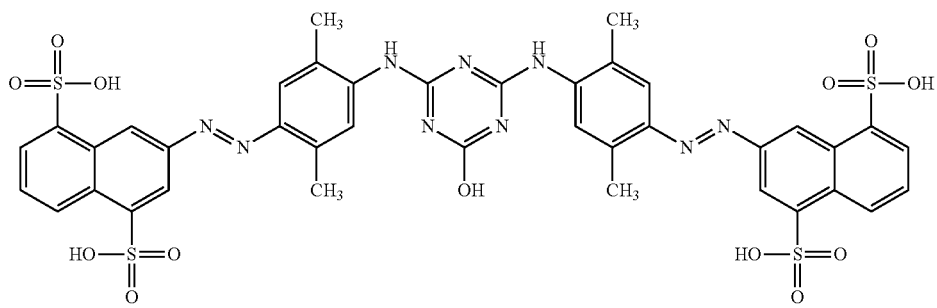 [SMILES: Cc1cc(Nc2nc(O)nc(Nc3cc(C)c(/N=N/c4cc(S(=O)(=O)O)c5cccc(S(=O)(=O)O)c5c4)cc3C)n2)c(C)cc1/N=N/c1cc(S(=O)(=O)O)c2cccc(S(=O)(=O)O)c2c1]
TABLE 2
Continued from Table A
Dye Structure
11
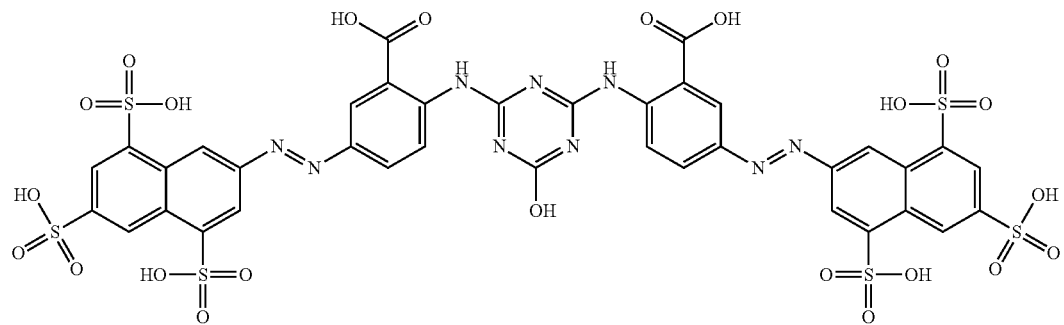 [SMILES: O=C(O)c1cc(/N=N/c2cc(S(=O)(=O)O)c3cc(S(=O)(=O)O)cc(S(=O)(=O)O)c3c2)ccc1Nc1nc(O)nc(Nc2ccc(/N=N/c3cc(S(=O)(=O)O)c4cc(S(=O)(=O)O)cc(S(=O)(=O)O)c4c3)cc2C(=O)O)n1]
13
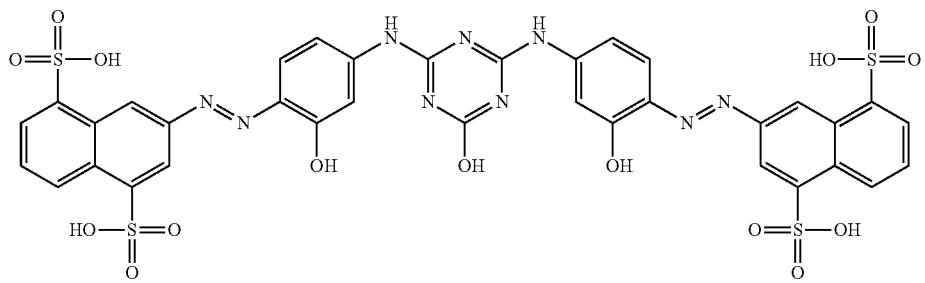 [SMILES: O=S(=O)(O)c1cc(/N=N/c2ccc(Nc3nc(O)nc(Nc4ccc(/N=N/c5cc(S(=O)(=O)O)c6cccc(S(=O)(=O)O)c6c5)c(O)c4)n3)cc2O)cc2c(S(=O)(=O)O)cccc12]
14
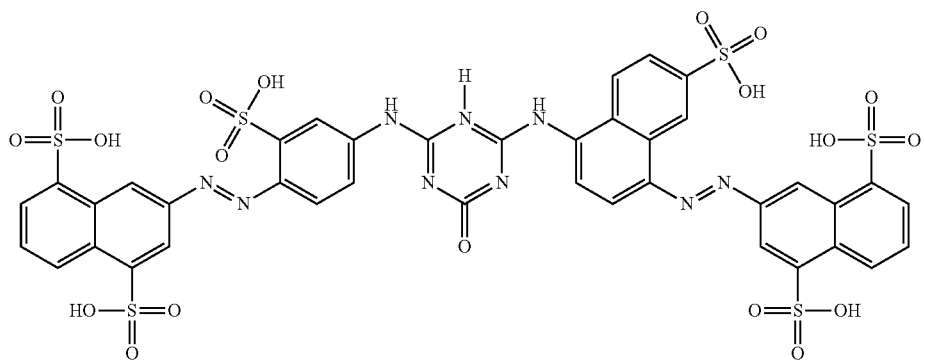

TABLE 2-continued
Continued from Table A
Dye Structure
15 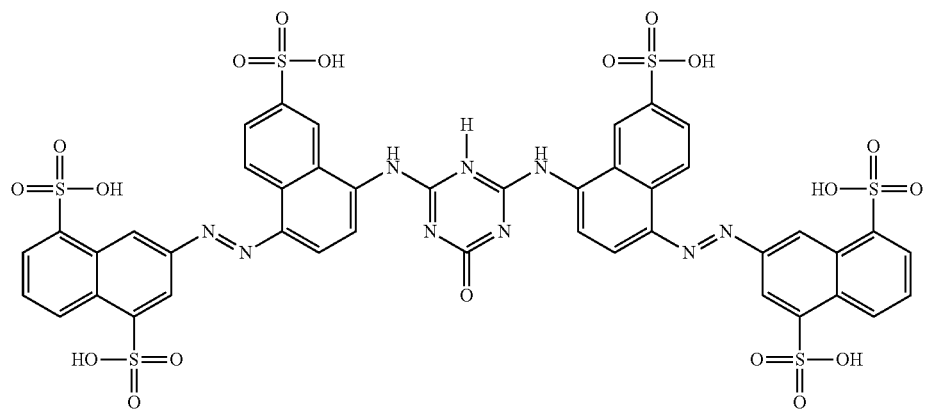
16 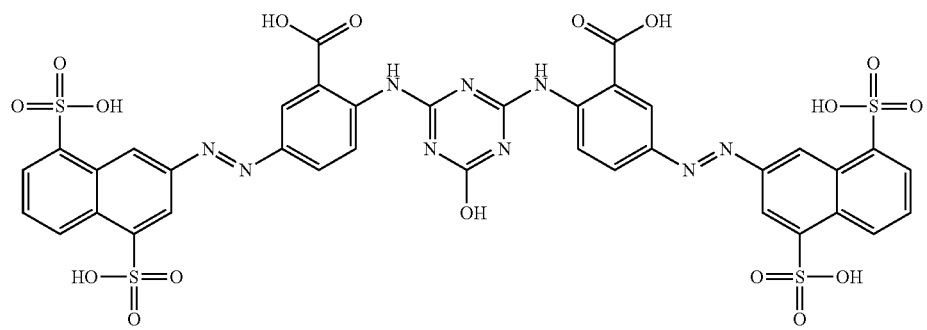 [SMILES: O=C(O)c1cc(/N=N/c2cc(S(=O)(=O)O)c3cccc(S(=O)(=O)O)c3c2)ccc1Nc1nc(O)nc(Nc2ccc(/N=N/c3cc(S(=O)(=O)O)c4cccc(S(=O)(=O)O)c4c3)cc2C(=O)O)n1]
TABLE 3
Continued from Table A
Dye Structure
17 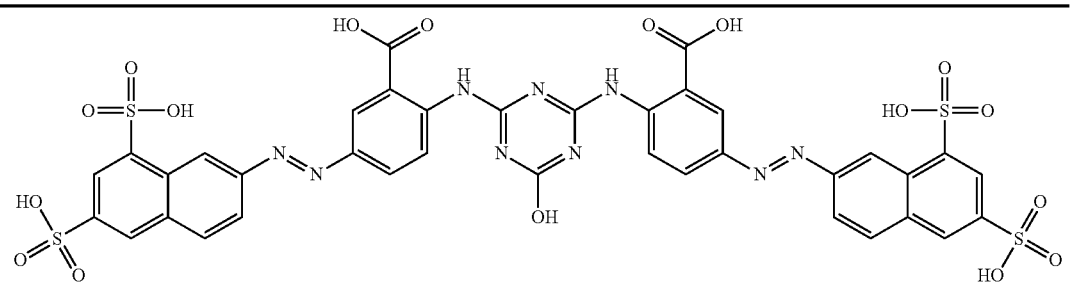
18 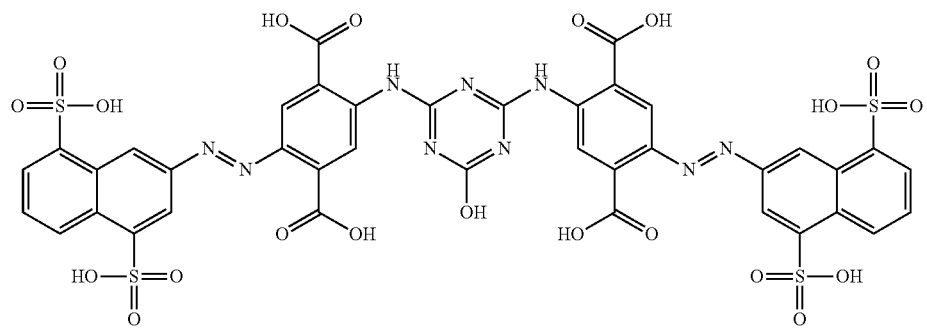 [SMILES: O=C(O)c1cc(Nc2nc(O)nc(Nc3cc(C(=O)O)c(/N=N/c4cc(S(=O)(=O)O)c5cccc(S(=O)(=O)O)c5c4)cc3C(=O)O)n2)c(C(=O)O)cc1/N=N/c1cc(S(=O)(=O)O)c2cccc(S(=O)(=O)O)c2c1]

TABLE 3-continued

Continued from Table A

Dye Structure

20 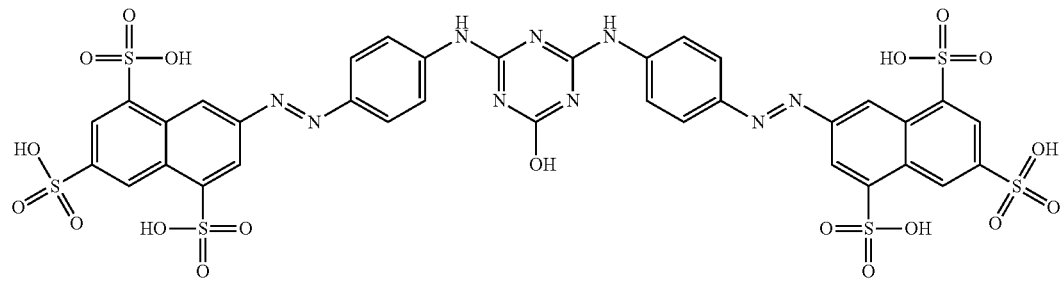

21 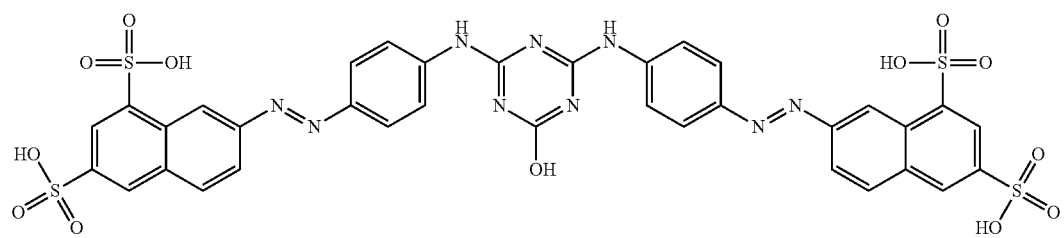 [SMILES: O=S(=O)(O)c1cc(S(=O)(=O)O)c2cc(/N=N/c3ccc(Nc4nc(O)nc(Nc5ccc(/N=N/c6ccc7cc(S(=O)(=O)O)cc(S(=O)(=O)O)c7c6)cc5)n4)cc3)ccc2c1]

22 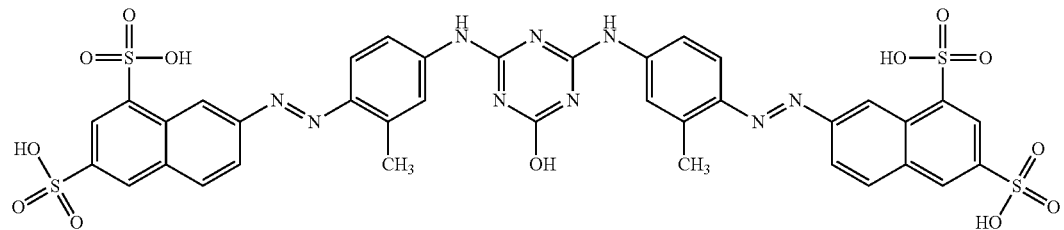 [SMILES: Cc1cc(Nc2nc(O)nc(Nc3ccc(/N=N/c4ccc5cc(S(=O)(=O)O)cc(S(=O)(=O)O)c5c4)c(C)c3)n2)ccc1/N=N/c1ccc2cc(S(=O)(=O)O)cc(S(=O)(=O)O)c2c1]

The compounds represented by Formulae (B-I) to (B-IV) may be synthesized by general synthesis methods, and may be synthesized by changing or variously combining the diazo component and the coupling component described in, for example, Japanese Unexamined Patent Application Publication No. 2008-537756.

(Compound Represented by Formula (B-V))

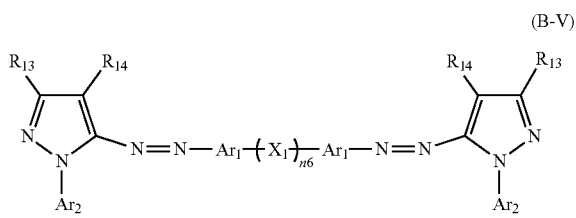
(B-V)

(In Formula (B-V), $R_{13}$ each independently represents a hydrogen atom or a substituent, $R_{14}$ each independently represents —$OR_{16}$, —$NHR_{17}$ or a cyano group, $R_{16}$ and $R_{17}$ represent a hydrogen atom or a substituent, $X_1$ represents a substituted or unsubstituted aryl group, or a substituted or unsubstituted triazine group, n6 is 0 or 1, $Ar_1$ each independently represents a divalent heterocyclic group, and $Ar_2$ each independently represents a substituted or unsubstituted alkyl group, a substituted or unsubstituted aryl group, or a triazine group.)

$R_{13}$ is each independently preferably a hydrogen atom, a substituted or unsubstituted alkyl group, a substituted or unsubstituted alkoxy group, or a substituted or unsubstituted aryl group, more preferably a hydrogen atom, a methyl group, an ethyl group, a tertiary butyl group, a phenyl group, a methoxy group, and an ethoxy group, and even more preferably a hydrogen atom or a tertiary butyl group. When $R_{13}$ further has a substituent, examples of the substituent include Group A of Substituents, and an alkyl group, an aryl group, a heterocyclic group, a cyano group, a hydroxyl group, a nitro group, or an alkoxy group is preferred, and an alkyl group, an aryl group, or a heterocyclic group is more preferred.

It is preferred that $R_{14}$ is each a cyano group.

It is preferred that the divalent heterocyclic group represented by $Ar_1$ is each independently a 5-membered or 6-membered ring, and the rings may be further ring-condensed. In addition, the divalent heterocyclic group may be an aromatic heterocyclic ring or a non-aromatic heterocyclic ring.

Examples of the divalent heterocyclic group represented by $Ar_1$ include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and the like. Among them, an aromatic heterocyclic group is preferred, and as described above, preferred examples thereof include pyridine, pyrazine, pyrimidine, pyridazine, triazine, pyrazole, imidazole, benzimidazole, triazole, thiazole, benzothiazole, isothiazole, benzisothiazole and thiadiazole. Thiadiazole is most preferred. These groups may have a substituent, examples of the substituent are the same as the aforementioned Group A of Substituents, and an alkyl group, an aryl group, a heterocyclic group, a cyano group, a hydroxyl group, a nitro group or an alkoxy group is preferred, and an alkyl group, an aryl group or a heterocyclic group is more preferred.

$Ar_2$ is each independently preferably a substituted or unsubstituted aryl group, more preferably a substituted or unsubstituted phenyl group, and particularly preferably a phenyl group substituted with an ionic hydrophilic group, and the ionic hydrophilic group is preferably —$SO_3M$ or —$CO_2M$, and more preferably —$CO_2M$. M each independently represents a hydrogen atom or a monovalent counter cation, and examples of the monovalent counter cation include an ammonium ion, an alkali metal ion (for example, a lithium ion, a sodium ion and a potassium ion) and an organic cation (for example, a tetramethylammonium ion, a tetramethylguanidium ion and tetramethylphosphonium), and a lithium salt, a sodium salt, a potassium salt and an ammonium salt are preferred. The ionic hydrophilic group is preferably a carboxyl group, and more preferably a potassium salt of a carboxyl group.

A divalent linking group represented by $X_1$ is preferably an alkylene group (for example, methylene, ethylene, propylene, butylene and pentylene), an alkenylene group (for example, ethenylene and prophenylene), an alkynylene group (for example, ethynylene and propynylene), an arylene group (for example, phenylene and naphthylene), a divalent heterocyclic group (for example, a 6-chloro-1,3,5-triazin-2,4-diyl group, a pyrimidin-2,4-diyl group and a quinoxalin-2,3-diyl group), —O—, —CO—, —$NR_A$— ($R_A$ is a hydrogen atom, an alkyl group, or an aryl group), —S—, —$SO_2$—, —SO—, or a combination thereof. These groups may also be substituted with —$OR_{20}$ ($R_{20}$ represents a hydrogen atom or a cation, and $R_{20}$ represents $Li^+$ ion, $Na^+$ ion, $K^+$ ion, or $NH_4^+$ ion when M represents a cation.). The groups are more preferably a divalent heterocyclic group, particularly preferably a -1,3,5-triazin-2,4-diyl group, and more preferably a divalent heterocyclic group which is substituted with —$OR_{20}$.

n6 is preferably 1.

The compound represented by Formula (B-V) is preferably a compound represented by the following Formula (B-VI), and more preferably the compound is a compound represented by the following Formula (B-VII).

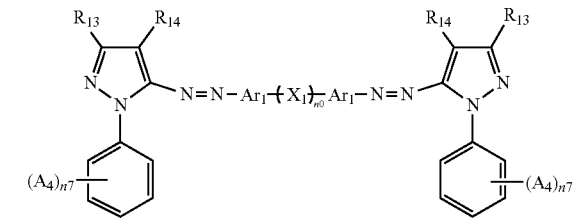

(B-VI)

(In Formula (B-VI), $R_{13}$ each independently represents a hydrogen atom or a substituent, $R_{14}$ each independently represents —$OR_{16}$, —$NHR_{17}$ or a cyano group, $R_{16}$ and $R_{17}$ represent a hydrogen atom or a substituent, $X_1$ represents a substituted or unsubstituted aryl group, or a substituted or unsubstituted triazine group, n0 is 0 or 1, $Ar_1$ each independently represents a divalent heterocyclic group, $Ar_4$ each independently represents an ionic hydrophilic group, and n7 represents 0 to 2.)

$Ar_1$, $R_{13}$, $R_{14}$, n6 and $X_1$ in Formula (B-VI) have the same meaning as $Ar_1$, $R_{13}$, $R_{14}$, n6 and $X_1$ in Formula (B-V), and preferred examples thereof are also the same.

The ionic hydrophilic group represented by $A_4$ is preferably —$SO_3M$ or —$CO_2M$, more preferably —$SO_3M$, and particularly preferably —$CO_2K$. M each independently represents a hydrogen atom or a monovalent counter cation, examples of the monovalent counter cation include an ammonium ion, an alkali metal ion (for example, a lithium ion, a sodium ion and a potassium ion) and an organic cation (for example, a tetramethylammonium ion, a tetramethylguanidium ion and tetramethylphosphonium), and a lithium salt, a sodium salt, a potassium salt and an ammonium salt are preferred, a potassium salt or a mixture salt including the potassium salt as a main component is more preferred, and a potassium salt is most preferred.

n7 is preferably 1 or 2, and more preferably 2.

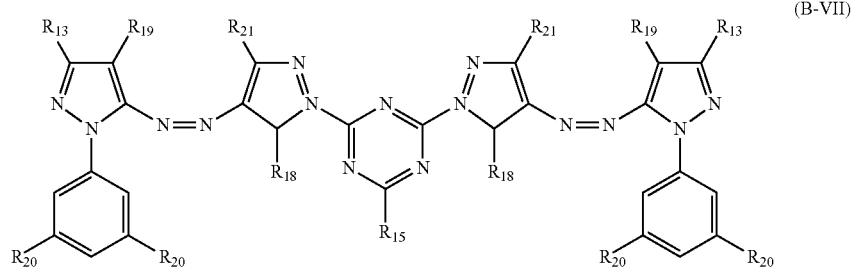

(B-VII)

(In Formula (B-VII), $R_{15}$ represents —OM, $R_{20}$ represents —$CO_2M$, and M represents a hydrogen atom or a monovalent counter cation. $R_{21}$ represents a substituted or unsubstituted alkyl group, $R_{13}$ each independently represents a hydrogen atom or a substituent, $R_{18}$ represents a substituted or unsubstituted amino group, and $R_{19}$ represents a cyano group.)

$R_{13}$ and M in Formula (B-VII) have the same meaning as $R_{13}$ and M in Formula (B-V), and preferred examples thereof are also the same.

$R_{21}$ is each independently preferably a hydrogen atom, a substituted or unsubstituted alkyl group, a substituted or unsubstituted alkoxy group, or a substituted or unsubstituted aryl group, more preferably a hydrogen atom, a methyl group, an ethyl group, a tertiary butyl group, a phenyl group, a methoxy group, and an ethoxy group, and even more preferably a hydrogen atom or a tertiary butyl group. When $R_{21}$ further has a substituent, examples of the substituent include Group A of Substituents, and an alkyl group, an aryl group, a heterocyclic group, a cyano group, a hydroxyl group, a nitro group, or an alkoxy group is preferred, and an alkyl group, an aryl group, or a heterocyclic group is more preferred.

It is preferred that $R_{18}$ in Formula (B-VII) is an unsubstituted amino group.

Subsequently, specific examples of the compounds represented by Formulae (B-V) to (B-VII) will be shown in the following Tables.

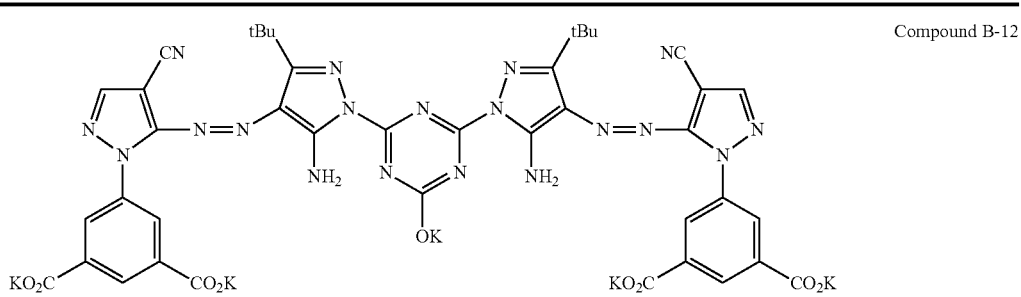

Compound B-12

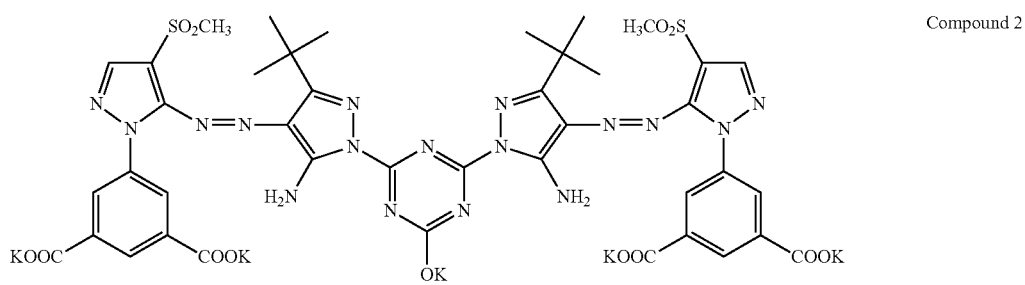

Compound 2

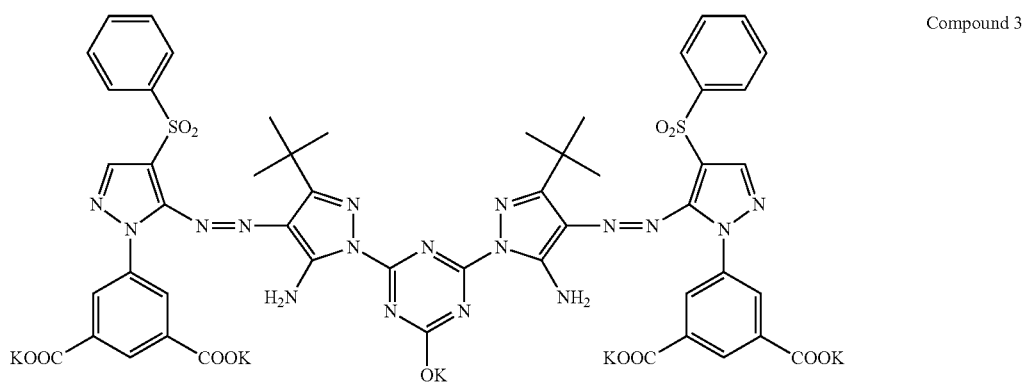

Compound 3

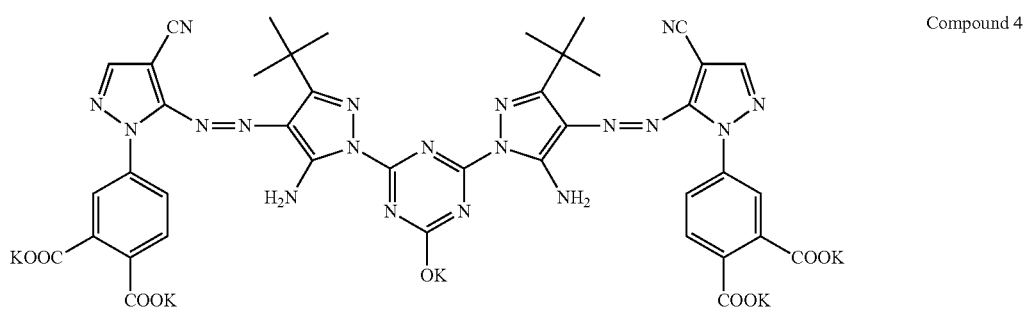

Compound 4

-continued
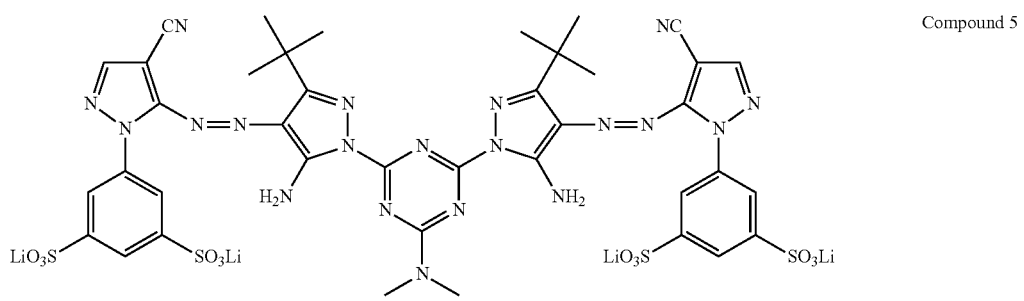
Compound 5
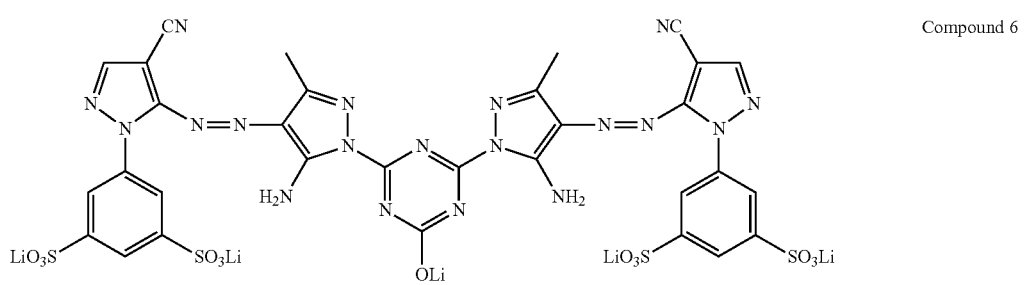
Compound 6
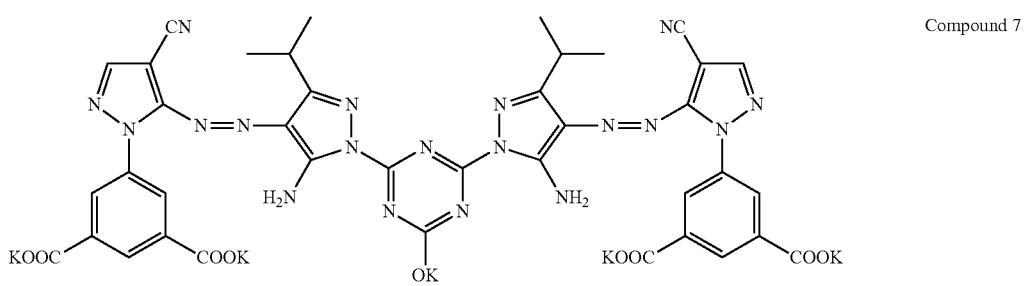
Compound 7
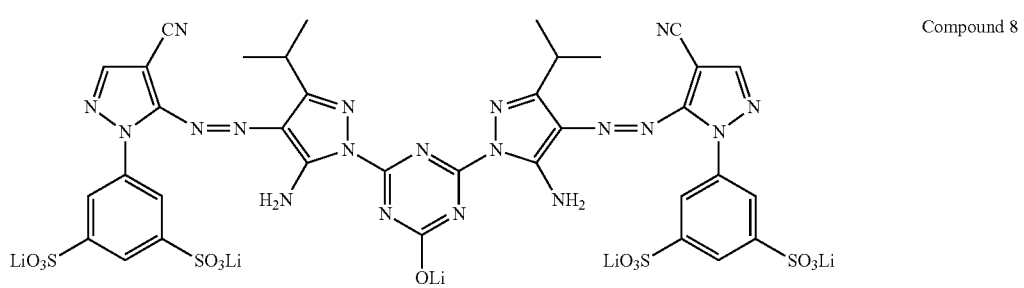
Compound 8
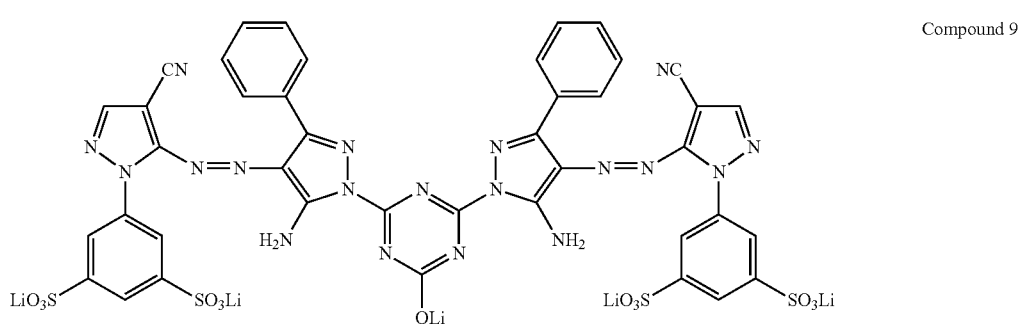
Compound 9

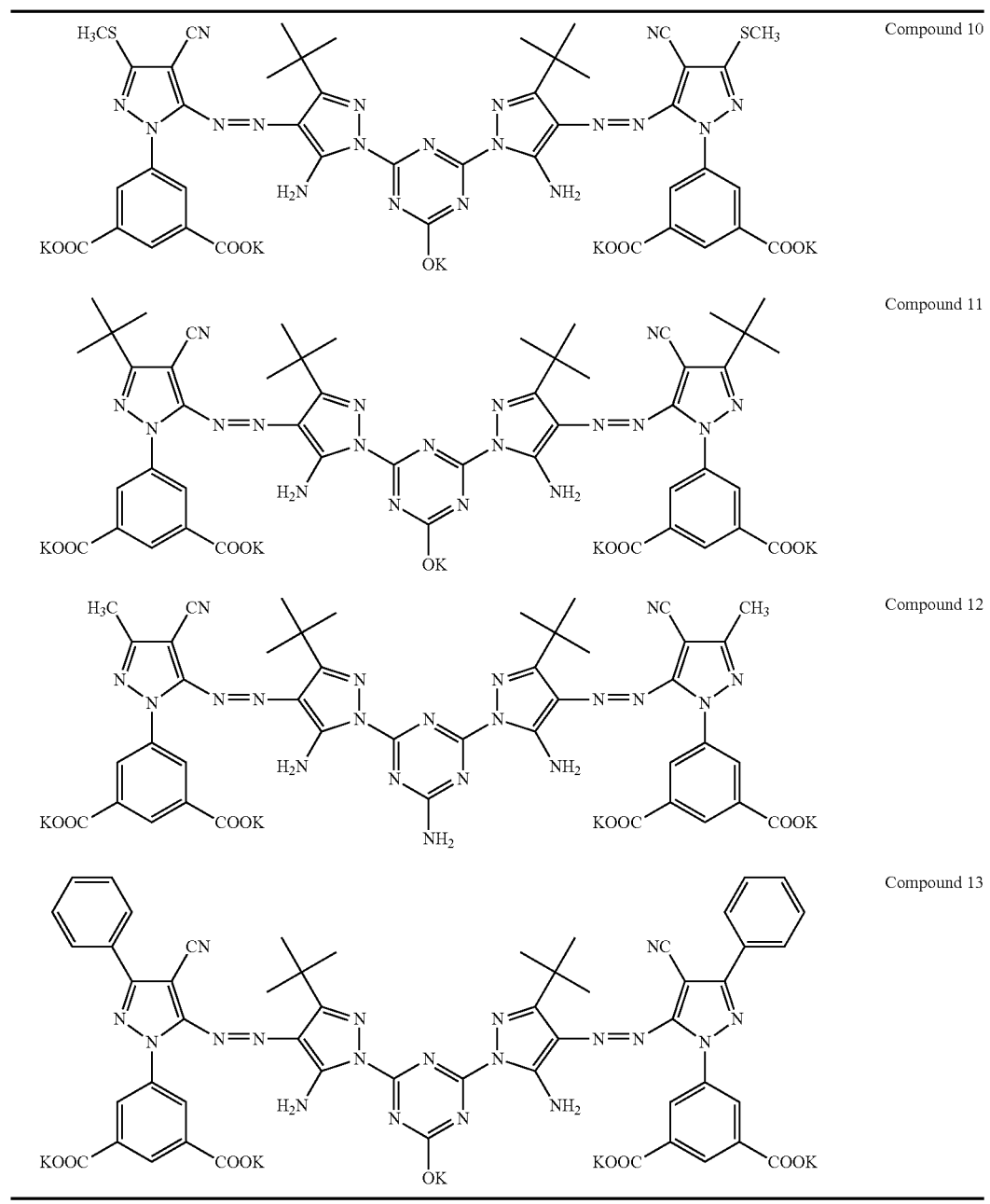

The compounds are synthesized by the synthesis methods described in Japanese Patent Application Laid-Open Nos. 2006-57076 and 2007-217681.

[Content of Color Material]

The ink composition of the present invention contains the first color material (dye) and the second color material (dye), and for example, it is preferred that the ink composition of the present invention consists of the first color material and the second color material dissolved in an aqueous medium.

The content of a dye (first color material) represented by Formula (A-I) is preferably 0.1 to 8% by mass, more preferably 0.5 to 7.5% by mass, and even more preferably 1.0 to 7% by weight, based on the total amount of the ink composition. By using the dye, bleeding or color migration of the obtained image may be suppressed, and quality with good color or color concentration may be obtained. Furthermore, the dye has excellent fastness to light, heat, air, water, chemicals, and the like compared to general azo dyes, thereby contributing to storage stability of the ink and the recorded image.

The content of a dye (second color material) represented by Formula (B-I) or Formula (B-V) is preferably 0.1 to 8% by mass, more preferably 0.5 to 7.5% by mass, and even more preferably 1 to 7% by weight, based on the total amount of the ink composition. A desired hue may be obtained by using the second color material in combination with the first color material.

Meanwhile, in this case, the following content of the second color material is more preferred. It is preferred that the content of the second color material when the compound represented by Formula (B-I) is used alone, and the combined content of the second color materials when two or more of the compound represented by Formula (B-I) and the compound represented by Formula (B-V) are used in combination, satisfy the aforementioned ranges, respectively. By setting the content of the first color material and the second color material to the aforementioned ranges, it is possible to exhibit a hue in a region where a hue may not be exhibited when each color material is used alone. Furthermore, light resistance and color tone of the image may be satisfied, and performance of the ink, such as color concentration or color reproducibility may also be satisfied.

Further, it is preferred that the ink composition of the present invention is used as an inkjet recording ink. That is, the present invention also relates to an inkjet recording ink containing the ink composition of the present invention. The content of the first color material represented by Formula (A-I) and the second color material selected from Formula (B-I) and Formula (B-V) in the inkjet recording ink are the same as the contents thereof in the ink composition.

The inkjet recording ink of the present invention may be prepared by diluting undiluted solution of the inkjet recording ink with water or the like. In addition, the inkjet recording ink of the present invention may similarly include components to be described below, in which the ink composition of the present invention may be contained.

For the content of the first color material represented by Formula (A-I) in the ink composition, the mass ratio (the mass of the first color material/the mass of the second color material) is preferably 0.1 to 10.0 with respect to the content of the second color material. By configuring the mass ratio of the content of the color materials to be the above range, a desired hue at a level much higher than the performance expected may be exhibited.

In addition, in the present invention, for the content of the first color material, the mass ratio (the mass of the first color material/the mass of the second color material) is more preferably 0.1 to 8.0, and even more preferably 0.2 to 6.0 with respect to the content of the second color material. A better effect may be obtained in terms of fastness, printing density and the like by setting the mass ratio to the range, and furthermore, reliability as an ink may also be sufficiently satisfied.

When the mass ratio is 0.1 or more, storage stability of the ink solution is enhanced, and when the mass ratio is 10.0 or less, aqueous solution stability of the ink composition is excellent. By configuring the mass ratio of the content of the color materials to be the above range, it is possible to control the hue•color concentration at a level much higher than the performance expected from the combination of the hue•color concentration which the first color material has and the hue•color concentration which the second color material has. Further, an image with a preferred hue may be obtained, and thus reliability as an ink may also be satisfied.

The present inventors assume the reason why the synergistic effect is expected by using the first color material and the second color material in combination, thereby controlling the hue•color concentration at a level much higher than expected, as follows. Since the first color material originally tends to have a low solubility in an aqueous medium, association or aggregation of the color material rapidly occurs immediately after an ink using an ink composition containing these compounds is imparted to a recording medium. Association or aggregation tends to enhance fastness of the color material on the recording medium forming the image. However, meanwhile, excessive association or aggregation reduces solubility in an aqueous solution and an ink solution, and thus reduces the hue•color concentration in some cases. With respect to this, by allowing the first color material to coexist with the second color material, appropriate association•aggregation is generated by the first color material and the second color material, and thus the first color material and the second color material form an optimal association•aggregation state with respect to hue color concentration on a recording medium, and accordingly, it is considered that hue•color concentration of the image has been enhanced. This mechanism is also suitable for enhancing fastness (light resistance and ozone resistance).

In addition, the present inventors assume the reason why the synergistic effect is exhibited by using the first color material and the second color material at a specific mass ratio, thereby achieving the reliability of an ink using the ink composition, as follows. As described above, impurities, which are considered to be eluted from a member constituting an ink cartridge or an ink supply path, are incorporated into the ink and thus become responsible for clogging the ink supply path or lowering ink supply characteristics and lowering preservation stability of the ink in some cases. The present inventors have studied on the problem, and as a result, considered that the crystallization of the first color material may be suppressed without lowering tinctorial strength of the ink by allowing the first color material to coexist with the second color material having a structure similar to the structure of the first color material in the ink, and thus preservation stability of the ink may be significantly enhanced. That is, with respect to the reliability of the ink, which would be difficult to be achieved when only the first color material is used as a color material, it is possible to obtain an effect much higher than expected by using the second color material in combination, thereby achieving sufficient reliability.

Furthermore, the sum (% by mass) of the contents of the first color material and the second color material in the ink composition is preferably 0.1% by mass to 20.0% by mass, and particularly preferably 2.0% by mass to 15.0% by mass, based on the total mass of the ink composition. When the sum of the contents is 2.0% by mass or more, light resistance and chromogenic properties are sufficiently obtained, and when the sum of the contents is 15.0% by mass or less, inkjet discharge characteristics are excellent because the insoluble material is not precipitated in the ink.

The ink composition of the present invention may be used as a concentrated aqueous solution including a coloring agent at high concentration as an ink material. It is preferred that the concentration of the coloring agent in the concentrated aqueous solution is 15% by mass or less and preferably 12% by mass or less in terms of temporal stability of the dye and ease of handling (viscosity), and it is preferred that the concentration is 8% by mass or more from the viewpoint of improving temporal stability of the dye or suppressing transport costs.

In addition, the ink composition of the present invention may also be used as an inkjet ink. The concentration of the coloring agent in the inkjet ink is preferably 1% by mass to 12% by mass, more preferably 2% by mass to 8% by mass, and particularly preferably 3% by mass to 6% by mass in terms of the ink viscosity or the concentration of the printed material. Clear printing may be achieved on paper by setting the concentration to 3% by mass or more, and it is possible to prevent precipitation of ink due to high concentration, or printing defects from a printer resulting from the precipitation by setting the concentration to 6% by mass or less. Further, there occurs a problem in that at high concentration, metal gloss is produced when the ink is printed on paper, or the viscosity is increased, so that the ink is not uniformly printed.

It is unclear why the synergistic effect is exhibited by using the aforementioned first color material and a third color material at a specific mass ratio, thereby improving water resistance, light resistance, ozone resistance, color tone, concentration, and paper dependence at a level much higher than expected, but the present inventors assume the reason as follows.

For the compound represented by Formula (A-I), the intermolecular interaction easily functions, and solubility thereof in water is originally low. For that reason, when ink containing these compounds is applied to a recording medium, association or aggregation of the water-soluble dye or interaction with an image-receiving layer constituting material easily occurs immediately from that moment. Association or aggregation tends to improve fastness of the water-soluble dye on the recording medium which forms an image, which is preferred, but excessive association or aggregation may reduce the original light resistance ability of the compound in some cases. In this regard, it is considered that since the compound selected from Formulae (B-I) and (B-V) forms an optimal state of association or aggregation with regard to fastness or permeability and appropriately inhibits interaction with an image-receiving layer constituting material, even printing density has been accordingly enhanced.

Meanwhile, the inkjet ink of the present invention is a yellow ink, and the preferred color tone as a yellow ink means the following two cases. That is, it is meant that an image, which is formed using only the yellow ink, is not tinged with red or blue. Further, in addition to this, when an image with a secondary color, which is formed using the yellow ink, that is, an image with a red region or a green region is formed, it is meant that the image has a color tone without greatly losing the color regions of both the red region and the green region. More specifically, it is preferred that a hue angle of the image formed using only the yellow ink is 85° to 920, or furthermore 88° to 90°.

In the ink composition of the present invention (preferably the inkjet recording ink), the first color material represented by Formula (A-I) and the second color material represented by Formula (B-I) may be used in combination with another dye in order to adjust the color tone or maintain the balance of performance. In addition, for the purpose of obtaining a full color image, the ink composition of the present invention may be used in combination with an ink including another dye or colorant. Examples of the dye or colorant which may be used in combination therewith include those described as follows.

Examples of the yellow dye include: aryl or heteryl azo dyes having, for example, phenols, naphthols, anilines, pyrazolones, pyridones, and open-chain type active methylene compounds as a coupling component; azomethine dyes having, for example, open-chain type active methylene compounds as a coupling component; methine dyes such as, for example, benzylidene dyes, and monomethine oxonol dyes; and quinone-based dyes such as, for example, naphthoquinone dyes and anthraquinone dyes, and examples of the other dye species include quinophthalone dyes, nitro•nitroso dyes, acridine dyes, acridinone dyes and the like. These dyes may be dyes that is tinged with yellow only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these dyes in the partial structure thereof.

Examples of the magenta dyes include: aryl or heteryl azo dyes having, for example, phenols, naphthols, and anilines as a coupling component; azomethine dyes having, for example, pyrazolones and pyrazolotriazoles as a coupling component; methine dyes such as, for example, arylidene dyes, styryl dyes, merocyanine dyes, and oxonol dyes; carbonium dyes such as diphenylmethane dyes, triphenylmethane dyes, and xanthene dyes; quinone-based dyes such as, for example, naphthoquinone, anthraquinone, and anthrapyridone; condensed polycyclic dyes such as, for example, dioxazine dyes, and the like. These dyes may be dyes that is tinged with magenta only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these dyes in the partial structure thereof.

These dyes may be dyes that is tinged with cyan only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these dyes in the partial structure thereof. These dyes may be dyes that exhibit cyan only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these dyes in the partial structure thereof.

Further, a black dye such as polyazo dyes may also be used.

Examples of the water-soluble dyes include direct dyes, acid dyes, edible dyes, basic dyes, reactive dyes and the like. Examples of the preferred water-soluble dyes include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247

C.I. Direct Violet 7, 9, 47, 48, 51, 66, 90, 93, 94, 95, 98, 100, and 101

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397

C.I. Acid Violet 5, 34, 43, 47, 48, 90, 103, and 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326

C.I. Acid Black 7, 24, 29, 48, 52:1, and 172

C.I. Reactive Red 3, 13, 17, 19, 21, 22, 23, 24, 29, 35, 37, 40, 41, 43, 45, 49, and 55

C.I. Reactive Violet 1, 3, 4, 5, 6, 7, 8, 9, 16, 17, 22, 23, 24, 26, 27, 33, and 34

C.I. Reactive Yellow 2, 3, 13, 14, 15, 17, 18, 23, 24, 25, 26, 27, 29, 35, 37, 41, and 42

C.I. Reactive Blue 2, 3, 5, 8, 10, 13, 14, 15, 17, 18, 19, 21, 25, 26, 27, 28, 29, and 38

C.I. Reactive Black 4, 5, 8, 14, 21, 23, 26, 31, 32, and 34

C.I. Basic Red 12, 13, 14, 15, 18, 22, 23, 24, 25, 27, 29, 35, 36, 38, 39, 45, and 46

C.I. Basic Violet 1, 2, 3, 7, 10, 15, 16, 20, 21, 25, 27, 28, 35, 37, 39, 40, and 48

C.I. Basic Yellow 1, 2, 4, 11, 13, 14, 15, 19, 21, 23, 24, 25, 28, 29, 32, 36, 39, and 40

C.I. Basic Blue 1, 3, 5, 7, 9, 22, 26, 41, 45, 46, 47, 54, 57, 60, 62, 65, 66, 69, and 71, and C.I. Basic Black 8 and the like.

Furthermore, in the ink of the present invention, pigment may also be used in combination.

As the pigment used in the present technology, it is possible to use pigments publicly known described in various documents in addition to commercially available pigments. Examples of the documents include Colour Index (edited by The Society of Dyers and Colourists), "New Edition Pigment Handbook," edited by Japanese Pigment Technology Society (published in 1989), "Latest Pigment Application Technology," CMC Publishing Co., Ltd. (published in 1986), "Printing Ink Technology," CMC Publishing Co., Ltd. (published in 1984), "Industrial Organic Pigments" co-written by W. Herbst & K. Hunger (VCH Verlagsgesellschaft, published in 1993), and the like. Specifically, examples of organic pigments include azo pigments (azo lake pigments, insoluble azo pigments, condensed azo pigments, and chelate azo pigments), polycyclic pigments (phthalocyanine-based pigments, anthraquinone-based pigments, perylene and perynone-based pigments, indigo-based pigments, quinacridone-based pigments, dioxazine-based pigments, isoindolinone-based pigments, quinophthalone-based pigments, diketopyrrolopyrrole-based pigments, and the like), dye lake pigments (lake pigments of acid or basic dyes), azine pigments, and the like, and examples of inorganic pigments include the yellow pigments of C.I. Pigment Yellow 34, 37, 42, 53 and the like, the red-based pigments of C.I. Pigment Red 101, 108 and the like, the blue-based pigments of C.I. Pigment Blue 27, 29, 17:1 and the like, the black-based pigments of C.I. Pigment Black 7, magnetite and the like, and the white-based pigments of C.I. Pigment White 4, 6, 18, 21 and the like.

As pigments having color tones preferred for image formation, blue to cyan pigments are preferably phthalocyanine pigments, anthraquinone-based indanthrone pigments (for example, C.I. Pigment Blue 60 and the like), and dye lake pigment-based triarylcarbonium pigments, and particularly, and particularly, most preferably phthalocyanine pigments (preferred examples thereof include copper phthalocyanines such as C.I. Pigment Blue 15:1, 15:2, 15:3, 15:4, and 15:6, monochloro to low-chlorinated copper phthalocyanines, pigments described in European Patent No. 860475 as aluminum phthalocyanines, the metal-free phthalocyanine that is C.I. Pigment Blue 16, phthalocyanines containing Zn, Ni, and Ti as the central metals, respectively, and the like, and among them, C.I. Pigment Blue 15:3 and 15:4 and the aluminum phthalocyanines are preferred).

In red to violet pigments, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146, and 184 and the like, and among them, preferred examples thereof include C.I. Pigment Red 57:1, 146, and 184), quinacridone-based pigments (preferred examples thereof include C.I. Pigment Red 122, 192, 202, 207, and 209 and C.I. Pigment Violet 19 and 42, and among them, C.I. Pigment Red 122 is preferred), dye lake pigment-based triarylcarbonium pigments (preferred examples include the xanthene-based pigments of C.I. Pigment Red 81:1 and C.I. Pigment Violet 1, 2, 3, 27, and 39), dioxazine-based pigments (for example, C.I. Pigment Violet 23 and 37), diketopyrrolopyrrole-based pigments (for example, C.I. Pigment Red 254), perylene pigments (for example, C.I. Pigment Violet 29), anthraquinone-based pigments (examples thereof include C.I. Pigment Violet 5:1, 31, and 33), and thioindigo-based pigments (examples thereof include C.I. Pigment Red 38 and 88) are preferably used.

As yellow pigments, azo pigments (preferred examples thereof include the monoazo-based pigments of C.I. Pigment Yellow 1, 3, 74 and 98, the disazo-based pigments of C.I. Pigment Yellow 12, 13, 14, 16, 17 and 83, general azo-based pigments of C.I. Pigment Yellow 93, 94, 95, 128 and 155, the benzimidazolone-based pigments of C.I. Pigment Yellow 120, 151, 154, 156 and 180, and the like, and among them, it is preferred that benzidine-based compounds are not used as a raw material), isoindoline•isoindolinone-based pigments (preferred examples thereof include C.I. Pigment Yellow 109, 110, 137 and 139, and the like), quinophthalone pigments (preferred examples thereof include C.I. Pigment Yellow 138 and the like), and flavanthrone pigments (for example, C.I. Pigment Yellow 24 and the like) are preferably used.

Preferred examples of black pigments include inorganic pigments (preferred examples thereof include carbon black and magnetite) or aniline black.

In addition, orange pigments (C.I. Pigment Orange 13 and 16, and the like) or green pigments (C.I. Pigment 7, and the like) may be used.

The pigments which may be used in the present technology may be the above-described bare pigments or surface-treated pigments. As a surface-treatment method, a method of coating a surface with resin or wax, a method of attaching a surfactant, a method of binding a reactive material (for example, a silane coupling agent, radicals produced from epoxy compounds, polyisocyanates, and diazonium salts, and the like) to a pigment surface, and the like may be contemplated, and these methods are described in the following documents or patents.

(1) Properties and Application of Metal Soap (Saiwaishobo)
(2) Printing of Printing Ink (CMC Publishing Co., Ltd. 1984)
(3) Latest Pigment Application Technology (CMC Publishing Co., Ltd. 1986)
(4) U.S. Pat. Nos. 5,554,739 and 5,571,311
(5) Japanese Patent Application Laid-Open Nos. H9-151342, 10-140065, 10-292143, and 11-166145

In particular, self-dispersible pigments prepared by reacting diazonium salts with carbon black, which are disclosed in the above U.S. Patents of (4), or the encapsulated pigments prepared by the methods disclosed in the above Japanese Patents of (5) are particularly effective because dispersion stability may be obtained without excessively using any dispersant in ink.

In the present invention, pigments may be dispersed by further using dispersants. It is possible to use various publicly known dispersants to suit the pigments used, for example, low molecular dispersants of surfactant type or polymer type dispersants as dispersants. Examples of the dispersants include dispersants described in Japanese Patent Application Laid-Open No. H3-69949, European Patent No. 549486, and the like. Furthermore, when a dispersant is used, pigment derivatives called as synergists may be added in order to promote adsorption of the dispersant to the pigment.

The particle diameter of pigments, which may be used in the present technology, preferably ranges from $0.01\mu$ to $10\mu$, and more preferably from $0.05\mu$ to $1\mu$ after the dispersion.

As a method of dispersing pigments, a publicly known dispersing technology used for preparation of ink or toner may be used. Examples of a dispersing machine include a vertical or horizontal agitator mill, an Attritor, a colloid mill, a ball mill, a three-roll mill, a pearl mill, a super mill, an impeller, a disperser, a KD mill, a dynatron, a pressure kneader, and the like. The details thereof are described in "Latest Pigment Application Technology" (CMC Publishing Co., Ltd., 1986).

[pH of Ink]

It is preferred that the ink of the present invention has a pH from 7.0 to 10.0 from the viewpoint of storage stability and discharge properties of the ink.

[Aqueous Medium]

In the ink of the present invention, it is possible to use water or an aqueous medium which is a mixed solvent of water and a water-soluble organic solvent. It is preferred that deionized water (ion-exchanged water) is used as water. It is preferred that the content (% by mass) of water in the ink is from 10.0% by mass to 90.0% by mass based on the total mass of the ink.

[Water-Soluble Organic Solvent]

The water-soluble organic solvent is not particularly limited as long as the organic solvent is water-soluble, and it is possible to use alcohols, polyhydric alcohols (including glycols, polyols and the like), polyglycols, glycol ethers, nitrogen-containing polar solvents, sulfur-containing polar solvents and the like. From the viewpoint of discharge stability of the ink and the like, it is preferred that the content (% by mass) of the water-soluble organic solvent in the ink is from 5.0% by mass to 90.0% by mass, and from 10.0% by mass to 50.0% by mass, based on the total mass of the ink.

As the water-soluble organic solvent, specifically those described below may be used. Alkyl alcohols having from 1 to 4 carbon atoms such as methyl alcohol, ethyl alcohol, n-propyl alcohol, isopropyl alcohol, n-butyl alcohol, sec-butyl alcohol and tert-butyl alcohol.

Amides such as dimethylformamide and dimethylacetamide.

Ketones or keto alcohols, such as acetone and diacetone alcohol.

Ethers such as tetrahydrofuran and dioxane.

Polyalkylene glycols such as polyethylene glycol and polypropylene glycol.

Glycols such as ethylene glycol, propylene glycol, butylene glycol, diethylene glycol, triethylene glycol, hexylene glycol and thiodiglycol.

Polyols such as glycerin, hexanetriol, thiodiglycol and trimethylolpropane.

Alkylene glycols in which the alkylene group such as 1,5-pentanediol, 1,6-hexanediol, 2-methyl-1,3-propanediol, 3-methyl-1,5-pentanediol and 1,2,6-hexanetriol has 2 to 6 carbon atoms.

Bis(2-hydroxyethyl)sulfone.

Lower alkyl ether acetates such as such as polyethylene glycol monomethyl ether acetate.

Alkyl ethers of polyhydric alcohols including glycol derivatives such as ethylene glycol monomethyl ether, ethylene glycol monoethyl ether, diethylene glycol methyl ether, diethylene glycol ethyl ether, triethylene glycol monomethyl ether, triethylene glycol monoethyl ether, ethylene glycol monobutyl ether, diethylene glycol monobutyl ether, triethylene glycol monobutyl ether, propylene glycol monomethyl ether, propylene glycol monobutyl ether, dipropylene glycol monomethyl ether, polyethylene glycol monomethyl ether, ethylene glycol monoisopropyl ether, ethylene glycol monoisobutyl ether, diethylene glycol monoisobutyl ether and propylene glycol monopropyl ether.

Amines such as ethanolamine, diethanolamine, triethanolamine, N-methyldiethaneol, N-ethyldiethanolamine, morpholine, N-ethylmorpholine, ethylenediamine, diethylenetriamine, triethylenetetramine, polyethyleneimine and tetramethylpropylenediamine.

N-methyl-2-pyrrolidone, 2-pyrrolidone, 1,3-dimethyl-2-imidazolidinone and the like.

Of course, the present invention is not limited thereto. One or two or more of these water-soluble organic solvents may be used if necessary.

[Other Additives]

The ink of the present invention may contain, if necessary, water-soluble organic compounds, which are solid at normal temperature, such as polyhydric alcohols such as trimethylol propane, and trimethylol ethane, urea derivatives such as ethylene urea, and the like, in addition to the aforementioned components. Furthermore, the ink of the present invention may contain, if necessary, various additives such as a surfactant, a pH adjusting agent, a rust inhibitor, a preservative, a fungicide, an antioxidant, an anti-reducing agent, an evaporation accelerator, a chelating agent, a water-soluble polymer and the like.

From the viewpoint of enhancing stability (particularly, suppressing clogging of the nozzle and enhancing discharge stability), it is preferred that the ink composition of the present invention contains at least one of a water-soluble organic solvent, a urea-based compound, a preservative, a nonionic surfactant, and a metal chelator.

Specific examples of the water-soluble organic solvent are the same as described above.

From the viewpoint of affinity of water, which is a solvent, with a dye or other additives, the water-soluble organic solvent preferably includes a polyhydric alcohol, and more preferably a polyhydric alcohol and a glycol derivative. Further, glycerin is particularly preferred as the polyhydric alcohol.

[Urea-Based Compounds]

Subsequently, urea-based compounds will be described.

As the urea-based compounds, examples of the urea-based compounds include urea, thiourea, or derivatives thereof, and the like. Since these compounds may suppress moisture of ink from evaporating due to water retention effect thereof and enhance dissolution stability of the dye, clogging of the nozzle is suppressed during the discharge of the ink, and solidification (crystal precipitation) at low temperature is prevented. In addition, permeability into recording paper and the like is enhanced by alleviating association of the dyes. Furthermore, since the urea-based compounds also have effects as a pH maintaining agent, storage stability of the ink is improved.

The derivatives of urea and thiourea are not particularly limited, but examples thereof include: monoalkyl urea such as methyl urea and ethyl urea; dialkyl urea such as dimethyl urea (for example, 1,1-dimethyl urea and 1,3-dimethyl urea), diethyl urea (for example, 1,1-diethyl urea and N,N'-diethyl urea), trimethyl urea, tetramethyl urea, n-propyl urea, n-butyl urea, 1,1-dibutyl urea, 1,3-dibutyl urea, allyl urea, cyclohexyl urea, 2,4-dimethylphenyl urea, (2,4,6-trimethylphenyl) urea and 1,3-bis[(2,2-dimethyl-1,3-dioxolan-4-yl)methyl]urea; alkylene urea such as ethylene urea, dimethylethylene urea and dimethylpropylene urea; monoalkyl thiourea such as methyl thiourea and ethyl thiourea; dialkyl thiourea such as dimethyl thiourea (for example, 1,1-dimethylthiourea and N,N'-dimethyl thiourea) and diethyl thiourea (for example, 1,1-diethyl thiourea and 1,3-diethyl thiourea); and alkylene thiourea such as ethylene thiourea.

Further, examples of the urea derivatives having a higher water retention effect include hydroxyethyl urea having a hydroxy group (for example, (2-hydroxyethyl)urea), dihydroxyethyl urea (for example, N,N'-dihydroxyethyl urea), and urea derivatives represented by $R_1R_2NCONHCH_2CH_2CH_2OH$ [in the formula, $R_1$ and $R_2$ represent hydrogen or $C_nH_{2n}OH$ (n=2 or 3), and both $R_1$ and $R_2$ are not hydrogen at the same time] (for example, $R_1$=H, $R_2$=CH$_2$CH$_2$OH; $R_1$=CH$_2$CH$_2$OH, $R_2$=CH$_2$CH$_2$OH; $R_1$=H, $R_2$=CH$_2$CH$_2$CH$_2$OH; $R_1$=CH$_2$CH$_2$CH$_2$OH, $R_2$=CH$_2$CH$_2$CH$_2$OH and the like).

Specifically, the urea derivatives are not particularly limited, but are 1,3-bis β-hydroxyethyl) urea, (1-γ hydroxypropyl-3-(β-hydroxyethyl) urea, 1,1-bis(β-hydroxyethyl)-3-(β-hydroxyethyl) urea, 1,1-bis-(γ-hydroxypropyl)-3-(β-hydroxyethyl) urea, 3-mono-(β-hydroxyethyl) urea, 1-mono-β-hydroxyethyl-3,3-bis-β-hydroxyethyl urea, 1-mono-β-hydroxyethyl-3,3-bis-γ-hydroxypropyl urea, and the like.

Among them, particularly, methyl urea, ethyl urea, N,N'-diethyl urea, urea, ethylene urea or N,N'-dihydroxyethyl urea is preferred, and for example, urea and N,N'-dihydroxyethyl urea are preferred from the viewpoint of moisture-retaining property of ink, and ethylene urea is preferred from the viewpoint of temporal stability and dissolution stability.

The amount of the urea-based compound added may be used in a wide range, and is preferably 0.1% by mass to 20% by mass, and more preferably 2% by mass to 10% by mass, based on the total mass of the ink composition. By setting the amount to the range, the effect of the urea-based compound may be more efficiently obtained, and a change in viscosity may also be suppressed during evaporation of moisture. The urea-based compounds may be used either alone or in combination of two or more thereof.

(Preservative)

Subsequently, preservatives will be described.

In the present invention, the preservative refers to a substance having a function of preventing occurrence and growth of microorganisms, particularly bacteria•fungi (mold). Various matters may be used as the preservative usable in the present invention.

First, examples of the preservative include an inorganic-based preservative (such as silver ion-containing compound) containing heavy metal ions or salts thereof. As an organic-based preservative, it is possible to use various matters such as a quaternary ammonium salt (tetrabutylammonium chloride, cetylpyridinium chloride, benzyltrimethylammonium chloride, and the like), a phenol derivative (phenol, cresol, butylphenol, xylenol, bisphenol, and the like), a phenoxy ether derivative (phenoxyethanol and the like), a heterocyclic compound (benzotriazole, PROXEL, 1,2-benzoisothiazolin-3-on, and the like), alkane diols (pentylene glycol (1,2-pentanediol), isopentyldiol (3-methyl-1,3-butanediol), hexane diol (1,2-hexanediol, and the like), caprylyl glycol (1,2-octane diol, and the like), acid amides, carbamic acid, carbamates, amidine guanidines, pyridines (sodiumpyridinthion-1-oxide, and the like), diazines, triazines, pyrrole imidazoles, oxazole oxazines, thiazole thiadiazines, thioureas, thiosemicarbazides, dithiocarbamates, sulfides, sulfoxides, sulfones, sulfamides, antibiotics (penicillin, tetracycline and the like), sodium dehydroacetate, sodium benzoate, ethylester p-hydroxybenzoate, and a salt thereof.

It is preferred that at least one preservative selected from the group consisting of preferably, a heterocyclic compound, a phenol derivative, a phenoxyether derivative, and alkanediols is used as the preservative. Further, matters described in Antibacterial and Antifungal Handbook (GI-HODO SHUPPAN CO., LTD.: 1986) and Antibacterial and Antifungal General Dictionary (published by The Committee of Dictionary Editors of The Society for Antibacterial and Antifungal Agents, Japan) may also be used as the preservative.

These compounds may use various matters having an oil-soluble structure and a water-soluble structure, but are preferably water-soluble compounds.

The ink composition of the present invention may contain two or more preservatives. In the present invention, when these preservatives are used in combination of two or more thereof, the effects of the present invention are further well exhibited, such as enhancement in storage stability of ink and recording image, particularly hue stability, and significant enhancement in discharge stability of ink with the passage of time for a long period of time. It is considered that this is because bacteria are in contact with two or more preservatives, and thus bacteria are suppressed from obtaining resistance to individual preservatives.

When two or more preservatives are combined, it is preferred that these preservatives have structures of other chemical structures. In addition, when two or more preservatives are contained, at least one preservative is preferably a heterocyclic compound, a phenol derivative, a phenoxyether derivative, or alkanediols, and among them, a heterocyclic compound. Preferred examples thereof include a combination of a heterocyclic compound and a phenoxyether derivative, a combination of a heterocyclic compound and a phenol derivative, a combination of a heterocyclic compound and alkanediols, and the like.

Furthermore, it is preferred that the heterocyclic compound is a thiazole-based compound or a benzotriazole-based compound.

The thiazole-based compound functions particularly as a fungicide among the preservatives. Examples of the thiazole-based compound include benzisothiazoline, isothiazoline, 1,2-benzisothiazolin-3-one, 5-chloro-2-methyl-4-isothiazolin-3-one, 2-(thiocyanomethylthio)benzthiazole, 2-mercaptobenzthiazole, 3-allyloxy-1,2-benzisothiazole-1,1-oxide and the like. Further, it is also possible to use Proxel (trademark) series, which are manufactured and sold by Arch Chemicals, (BDN, BD20, GXL, LV, XL2, Ultra10 and the like) as the thiazole-based fungicides.

The benzotriazole-based compounds, among the preservatives, function particularly as a rust inhibitor, and may prevent the occurrence of rust, one cause of which is the contact of a metal material (particularly, 42 alloy (a nickel-iron alloy containing 42% nickel)) constituting an inkjet head with ink. Examples of the benzotriazole-based compounds include 1H-benzotriazole, 4-methyl-1H-benzotriazole, 5-methyl-1H-benzotriazole, sodium salts or potassium salts thereof, and the like.

The content ratio when combining two or more kinds of preservatives is not particularly limited, but the content of each of the preservatives is preferably 1% by mass or more, more preferably 10% by mass or more, and even more preferably 20% by mass or more, based on the total content of the preservatives. Further, the content of each of the preservatives is preferably 99% by mass or less, more preferably 90% by mass or less, and even more preferably 80% by mass or less, based on the total content of the preservatives. By setting the content to the values, effects of the preservatives may be efficiently obtained, and further, the synergistic effects among the preservatives are easily obtained. In addition, it is also possible to reduce a possibility of causing skin diseases and the like to those who touch the ink, particularly, people who are sensitive to preservatives, while maintaining the effect of the preservative.

The amount of the preservative added to the ink composition (when two or more of the preservatives are added, the total content thereof) may used in a wide range, but is preferably 0.001% by mass to 10% by mass, more preferably 0.005% by mass to 2.0% by mass, and even more preferably 0.01% by mass to 0.5% by mass. By setting the amount to the values, effects of the preservative may be more efficiently obtained, and further, a risk of generation of precipitates may be suppressed.

The inkjet recording ink of the present invention may be prepared by diluting undiluted solution of the inkjet composition with water or the like, for example, to 2 to 5 times. Furthermore, during dilution with water and the like, a preservative may be additionally added thereto. The amount of the preservative added to the inkjet recording ink is also the same as the amount thereof added to the ink composition.

In the ink composition or inkjet recording ink of the present invention, the ratio (preservative/dye) of the content of the preservative to the content of the dye is preferably 0.0001 to 5 by mass ratio, more preferably 0.0002 to 0.5, and even more preferably 0.001 to 0.05.

[Nonionic Surfactant]

Subsequently, nonionic surfactants will be described.

Examples of the nonionic surfactants include anionic surfactants such as fatty acid salts, alkyl sulfate ester salts, alkyl benzene sulfonate salts, alkyl naphthalene sulfonate salts, dialkyl sulfosuccinate salts, alkyl phosphate ester salts, naphthalenesulfonic acid formalin condensates, and polyoxyethylene alkyl phosphate ester salts, cationic surfactants such as aliphatic amine salts, quaternary ammonium salts, and alkylpyridinium salts, polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, oxyethylene oxypropylene block copolymers, acetylene glycol-based surfactants, acetylene-based polyoxyethylene oxides and the like. These surfactants may be used either alone or in combination of two or more thereof.

In particular, compounds represented by the following Formula (I) or Formula (II), or acetylene glycol-based surfactants are more preferred.

First, the compounds represented by Formula (I) will be described.

Formula (I)

In Formula (I), $R^{21}$ represents an alkyl group having 5 to 40 carbon atoms, preferably 8 to 18 carbon atoms, and may be straight or branched, and may also be substituted.

Examples of a group which may be substituted with an alkyl group represented by R21 include an aryl group (for example, phenyl, o-tollyl, p-tollyl, and p-t-butylphenyl), an alkoxy group (for example, methoxy, ethoxy, n-butoxy and the like), a halogen atom (for example, a chlorine atom and a bromine atom) and the like.

Specific examples of the alkyl group represented by $R^{21}$ include n-pentyl, n-hexyl, n-octyl, n-decyl, n-dodecyl, n-pentadecyl, n-octadecyl, 2-ethylhexyl, 1-ethylpentyl, 1-n-butylpentyl, 1-n-pentylhexyl, 1-n-hexylheptyl, 1-n-heptyloctyl, 1-n-octylnonyl, 6-methoxyhexyl, 2-phenylethyl, and the like.

$m_1$ represents the average addition molar number of ethylene oxide, which is 2 to 40, preferably 3 to 30, and particularly preferably 3 to 20.

Particularly preferred among the compounds represented by Formula (I) is a compound represented by the following Formula (I-1).

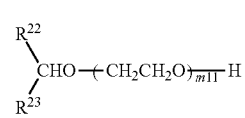

Formula (I-1)

In Formula (I-1), $R^{22}$ and $R^{23}$ each independently represent a saturated hydrocarbon having 4 to 10 carbon atoms, and the sum of the carbon atoms of $R^{22}$ and $R^{23}$ is 8 to 18. $m_{11}$ represents the average number of added moles of ethylene oxide, which is 3 to 20. Examples of the saturated hydrocarbon having 4 to 10 carbon atoms, which is represented by $R^{22}$ or $R^{23}$ include n-butyl, i-butyl, n-pentyl, n-hexyl, n-heptyl, n-octyl, 2-ethylhexyl, n-nonyl, n-decyl, and the like. The sum of the carbon atoms of $R^{22}$ and $R^{23}$ is 8 to 18, and more preferably 8 to 16. $m_{11}$ is 3 to 20, more preferably 5 to 20, and even more preferably 6 to 18.

Hereinafter, specific examples of the compound represented by Formula (I) will be described, but the compound is not limited thereto.

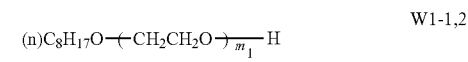

W1-1,2

W1-1: $m_1 = 5$
W1-2: $m_1 = 10$

W1-3,4

W1-3: $m_1 = 10$
W1-4: $m_1 = 15$

W1-5~7

W1-5: $m_1 = 10$
W1-6: $m_1 = 15$
W1-7: $m_1 = 20$

W1-8

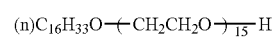

W1-9

W-1-10,11

W1-10: $m_1 = 12$
W1-11: $m_1 = 25$

W1-12

Specific examples of the compound represented by Formula (I-1) will be shown in the following Table 4, but the compound is not limited thereto.

TABLE 4

| No. | $R^{22}$ | $R^{23}$ | $m_{11}$ |
|---|---|---|---|
| W1-13 | $(n)C_4H_9$ | $(n)C_4H_9$ | 3 |
| W1-14 | $(i)C_4H_9$ | $(i)C_4H_9$ | 5 |
| W1-15 | $(i)C_4H_9$ | $(i)C_4H_9$ | 9.5 |
| W1-16 | $(i)C_4H_9$ | $(i)C_4H_9$ | 11.4 |
| W1-17 | $(n)C_5H_{11}$ | $(n)C_5H_{11}$ | 8 |
| W1-18 | $(n)C_5H_{11}$ | $(n)C_5H_{11}$ | 10 |
| W1-19 | $(n)C_5H_{11}$ | $(n)C_5H_{11}$ | 11.4 |
| W1-20 | $(n)C_5H_{11}$ | $(n)C_5H_{11}$ | 13.5 |
| W1-21 | $(n)C_5H_{11}$ | $(n)C_6H_{13}$ | 15 |

TABLE 4-continued

| No. | $R^{22}$ | $R^{23}$ | $m_{11}$ |
|---|---|---|---|
| W1-22 | (n)C$_6$H$_{13}$ | (n)C$_6$H$_{13}$ | 10 |
| W1-23 | (n)C$_6$H$_{13}$ | (n)C$_6$H$_{13}$ | 13.6 |
| W1-24 | (n)C$_6$H$_{13}$ | (n)C$_6$H$_{13}$ | 15.8 |
| W1-25 | (n)C$_6$H$_{13}$ | (n)C$_7$H$_{15}$ | 16 |
| W1-26 | (n)C$_7$H$_{15}$ | (n)C$_7$H$_{15}$ | 15 |
| W1-27 | (n)C$_7$H$_{15}$ | (n)C$_7$H$_{15}$ | 16.5 |
| W1-28 | (n)C$_8$H$_{17}$ | (n)C$_8$H$_{17}$ | 14 |
| W1-29 | (n)C$_8$H$_{17}$ | (n)C$_8$H$_{17}$ | 17.6 |
| W1-30 | (n)C$_8$H$_{17}$ | (n)C$_{10}$H$_{21}$ | 20 |

Subsequently, compounds represented by Formula (II) will be described.

Formula (II)

In Formula (II), $R^{24}$ represents an alkyl group having 5 to 40 carbon atoms, preferably 5 to 30 carbon atoms, and may be straight or branched, and may also be substituted.

Examples of a group which may be substituted with an alkyl group represented by R24 include an aryl group (for example, phenyl, o-tollyl, p-tollyl, and p-t-butylphenyl), an alkoxy group (for example, methoxy, ethoxy, n-butoxy and the like), a halogen atom (for example, a chlorine atom and a bromine atom) and the like. Specific examples of the alkyl group represented by $R^{24}$ include n-pentyl, n-hexyl, n-octyl, n-decyl, n-dodecyl, n-pentadecyl, n-octadecyl, 2-ethylhexyl, 1-ethylpentyl, 1-n-butylheptyl, 1-n-hexylnonyl, 1-n-heptyldecyl, 1-n-octyldodecyl, 1-n-decyltetradecyl, 6-methoxyhexyl, 2-phenylethyl, and the like.

$m_2$ represents the average addition number of ethylene oxide, which is 2 to 40, preferably 3 to 30, and particularly preferably 4 to 20.

Particularly preferred among the compounds represented by Formula (II) is a compound represented by the following Formula (II-1).

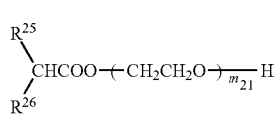

Formula (II-1)

In Formula (II-1), $R^{25}$ and $R^{26}$ are each a saturated hydrocarbon group having 2 to 20 carbon atoms, and the carbon number of 4 to 13 is preferred. Examples of the saturated hydrocarbon group having 2 to 20 carbon atoms, which is represented by $R^{25}$ or $R^{26}$ include ethyl, n-butyl, i-butyl, n-pentyl, n-hexyl, n-heptyl, n-octyl, 2-ethylhexyl, n-nonyl, n-decyl, n-dodecyl, n-hexadecyl, n-octadecyl and the like. $m_{21}$ represents an average addition molar number of ethylene oxide, which is 2 to 40, and preferably 3 to 30.

Hereinafter, specific examples of the compound represented by Formula (II) will be described, but the compound is not limited thereto.

(n)C$_7$H$_{15}$COO—(CH$_2$CH$_2$O)$_{\overline{m_2}}$—H    W2-1,2

W2-1: m$_2$ = 10
W2-2: m$_2$ = 15

(n)C$_{11}$H$_{23}$COO—(CH$_2$CH$_2$O)$_{\overline{m_2}}$—H    W2-3~5

W2-3: m$_2$ = 10
W2-4: m$_2$ = 15
W2-5: m$_2$ = 20

(n)C$_{13}$H$_{27}$COO—(CH$_2$CH$_2$O)$_{\overline{m_2}}$—H    W2-6~7

W2-6: m$_2$ = 10
W2-7: m$_2$ = 15

(n)C$_{15}$H$_{31}$COO—(CH$_2$CH$_2$O)$_{\overline{m_2}}$—H    W2-8,9

W2-8: m$_2$ = 10
W2-9: m$_2$ = 15

C$_{17}$H$_{31}$COO—(CH$_2$CH$_2$O)$_{\overline{20}}$—H    W2-10

C$_{17}$H$_{33}$COO—(CH$_2$CH$_2$O)$_{\overline{20}}$—H    W2-11

C$_{17}$H$_{35}$COO—(CH$_2$CH$_2$O)$_{\overline{15}}$—H    W2-12

Examples of the compound represented by Formula (II-1) include one terminal esters of polyethylene oxide of 2-butyl octanoic acid, polyethylene oxide adducts of undecane-6-ol, and the like. Specific examples of the compound represented by Formula (II-1) will be shown in the following Table 5, but the compound is not limited thereto.

TABLE 5

| No. | $R^{25}$ | $R^{26}$ | $m_{21}$ |
|---|---|---|---|
| W2-13 | C$_2$H$_5$ | C$_4$H$_9$ | 3 |
| W2-14 | C$_2$H$_5$ | C$_4$H$_9$ | 5 |
| W2-15 | C$_4$H$_9$ | C$_6$H$_{13}$ | 9.5 |
| W2-16 | C$_6$H$_{13}$ | C$_8$H$_{17}$ | 5 |
| W2-17 | C$_6$H$_{13}$ | C$_8$H$_{17}$ | 8 |
| W2-18 | C$_6$H$_{13}$ | C$_8$H$_{17}$ | 10 |
| W2-19 | C$_6$H$_{13}$ | C$_8$H$_{17}$ | 11.4 |
| W2-20 | C$_6$H$_{13}$ | C$_8$H$_{17}$ | 12.5 |
| W2-21 | C$_6$H$_{13}$ | C$_8$H$_{17}$ | 15 |
| W2-22 | C$_6$H$_{13}$ | C$_8$H$_{17}$ | 25 |
| W2-23 | C$_7$H$_{15}$ | C$_9$H$_{19}$ | 14 |
| W2-24 | C$_7$H$_{15}$ | C$_9$H$_{19}$ | 15 |
| W2-25 | C$_7$H$_{15}$ | C$_9$H$_{19}$ | 20 |
| W2-26 | C$_7$H$_{15}$ | C$_9$H$_{19}$ | 25 |
| W2-27 | C$_8$H$_{17}$ | C$_{10}$H$_{21}$ | 30 |
| W2-28 | C$_{10}$H$_{21}$ | C$_{12}$H$_{25}$ | 20 |
| W2-29 | C$_{10}$H$_{21}$ | C$_{12}$H$_{25}$ | 25 |
| W2-30 | C$_{10}$H$_{21}$ | C$_{13}$H$_{27}$ | 20 |
| W2-31 | C$_{10}$H$_{21}$ | C$_{13}$H$_{27}$ | 25 |
| W2-32 | C$_{10}$H$_{21}$ | C$_{13}$H$_{27}$ | 40 |

The compound represented by Formula (I) or Formula (II) may be synthesized using publicly known methods, and for example, may be obtained by the methods described in Fujimoto Takehiko, "New•Surfactant Introduction", revised version, (1992) pp. 94-107.

Subsequently, acetylene glycol-based surfactants (including acetylene-based polyoxyethyleneoxide) will be described.

The acetylene glycol-based surfactant has properties that there is little foaming property while having excellent ability to properly maintain surface tension and interfacial tension compared with other surfactants. Accordingly, the ink containing the acetylene glycol-based surfactant may properly maintain surface tension or interfacial tension with a printer member which is brought into contact with the ink, such as a head nozzle surface. In addition, liquid physical properties of the ink may also be adjusted more suitably by the acetylene glycol-based surfactant. Furthermore, warming storage stability of the ink may be further enhanced.

Examples of the acetylene glycol-based surfactant include 2,4,7,9-tetramethyl-5-decyne-4,7-diol, 3,6-dimethyl-4-octyne-3,6-diol, 3,5-dimethyl-1-hexyne-3-ol, 2,4-dimethyl-5-hexyne-3-ol and the like, but in addition, a compound represented by the following Formula (III).

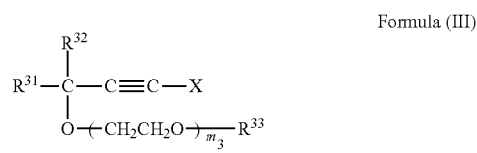

Formula (III)

In the formula, $R^{31}$ and $R^{32}$ are each independently an alkyl group having 1 to 18 carbon atoms.

When described in more detail, $R^{31}$ and $R^{32}$ each independently represent an alkyl group having 1 to 18 carbon atoms (for example, methyl, ethyl, n-propyl, butyl, hexyl, octyl, decyl, dodecyl and the like), and may be substituted. Examples of the substituent include an alkyl group (for example, methyl, ethyl, isopropyl and the like), an alkoxy group (for example, methoxy, ethoxy and the like), a halogen atom (for example, a chlorine atom and a bromaine atom), and the like. Among them, $R^{31}$ and $R^{32}$ are preferably an unsubstituted straight chain alkyl group, or an unsubstituted branched chain alkyl group having 1 to 12 carbon atoms, and particularly preferred specific examples thereof include methyl, ethyl, n-butyl, 2-methylbutyl, 2,4-dimethylpentyl and the like.

$R^{33}$ represents a hydrogen atom, an alkyl group having 1 to 6 carbon atoms or a phenyl group, and the alkyl group, and the phenyl group may be substituted.

Examples of the substituent of the alkyl group of $R^{33}$ include an alkyl group (for example, methyl, ethyl, isopropyl and the like), an alkoxy group (for example, methoxy, ethoxy and the like), and a phenyl group. Examples of a substituent of the phenyl group of $R^{33}$ include an alkyl group (for example, methyl, ethyl, isopropyl and the like), an alkoxy group (for example methoxy, ethoxy and the like), a halogen atom (for example, a fluorine atom, a chlorine atom and a bromaine atom), and the like. Among $R^{33}$, a hydrogen atom or an alkyl group having 1 to 4 carbon atoms is preferred, and a hydrogen atom is particularly preferred.

X represents a hydrogen atom or

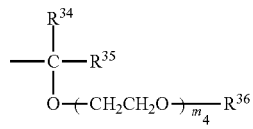

in which $R^{34}$ and $R^{35}$ each independently represent an alkyl group having 1 to 18 carbon atoms. Preferred substituents or specific examples of $R^{34}$ and $R^{35}$ are substituents or specific examples selected from the same group as the aforementioned $R^{31}$ and $R^{32}$. $R^{36}$ represents a hydrogen atom or an alkyl group having 1 to 6 carbon atoms or a phenyl group, and preferred specific examples thereof are substituents or specific examples selected from the same group as the aforementioned $R^{33}$.

$m_3$ and $m_4$ each represent an average addition molar number of ethylene oxide, and $m_3+m_4$ is 0 to 100, preferably 0 to 50, and particularly preferably 0 to 40.

Here, in the case of $m_3=0$, $R^{33}$ represents a hydrogen atom, and in the case of $m_4=0$, $R^{36}$ represents a hydrogen atom. Further, when X represents a hydrogen atom, $m_3$ represents 1 to 100, preferably 1 to 50 and particularly preferably 1 to 40.

Particularly preferred among the compounds represented by Formula (III) is a compound represented by the following Formula (III-1).

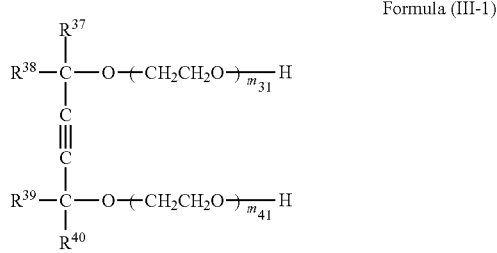

Formula (III-1)

In the formula, $R^{37}$, $R^{38}$, $R^{39}$ and $R^{40}$ each independently represent an alkyl group having 1 to 6 carbon atoms, preferably 1 to 4 carbon atoms. $m_{31}$ and $m_{41}$ each represent an addition molar number of ethylene oxide, and are a number in which the sum thereof is 0 to 40, preferably 2 to 20.

Hereinafter, specific examples of the compound represented by Formula (III) or Formula (III-1) will be described, but the compound is not limited thereto.

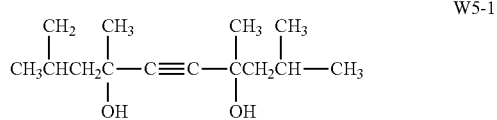

W5-1

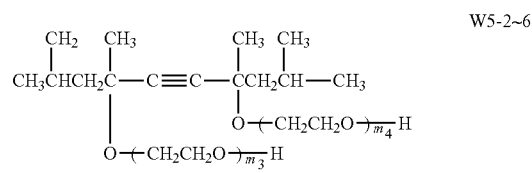

W5-2~6

W5-2: $m_3 + m_4 = 1.3$
W5-3: $m_3 + m_4 = 3.5$
W5-4: $m_3 + m_4 = 10$
W5-5: $m_3 + m_4 = 20$
W5-6: $m_3 + m_4 = 30$

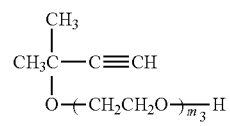

W5-7, 8

W5-7: $m_3 = 5$
W5-8: $m_3 = 10$

-continued

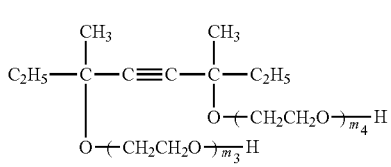

W5-9, 10

W5-9: $m_3 + m_4 = 3$
W5-10: $m_3 + m_4 = 10$

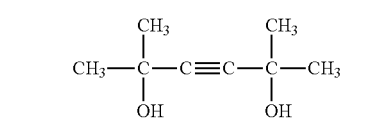

W5-11

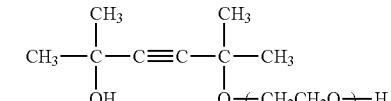

W5-12

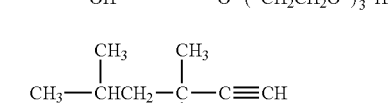

W5-13, 14

W5-13: $m_3 = 5$
W5-14: $m_3 = 10$

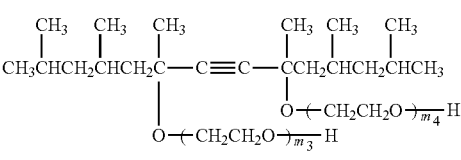

W5-15, 16

W5-15: $m_3 + m_4 = 8$
W5-16: $m_3 + m_4 = 20$

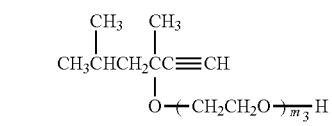

W5-17, 18

W5-17: $m_3 = 5$
W5-18: $m_3 = 10$

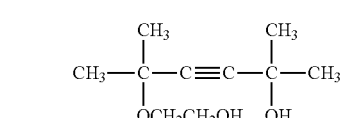

W5-19

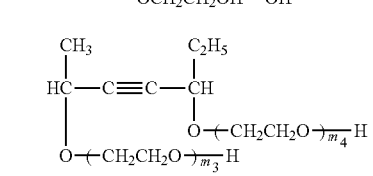

W5-20

$m_3 + m_4 = 2$

The compound represented by Formula (III) or Formula (III-1) may be synthesized using publicly known methods, and for example, may be obtained by the methods described in Fujimoto Takehiko, "New·Surfactant Introduction", revised version, (1992) pp. 94-107.

In addition, the compound represented by Formula (III) or (III-1) may be easily obtained as commercially available products, and specific trade names thereof include Surfynols 61, 82, 104, 104E, 104H, 104A, 104BC, 104DPM, 104PA, 104PG-50, 104S, 420, 440, 465, 485, 504, CT-111, CT-121, CT-131, CT-136, CT-141, CT-151, CT-171, CT-324, DF-37, DF-58, DF-75, DF-110D, DF-210, GA, OP-340, PSA-204, PSA-216, PSA-336, SE, SE-F, TG, GA, Dynol 604 (manufactured by Nisshin Chemical Industries Co., Ltd. and Air Products & Chemicals, Inc.), OLFINE A, B, AK-02, CT-151W, E1004, E1010, P, SPC, STG, Y, 32W, PD-001, PD-002W, PD-003, PD-004, EXP.4001, EXP.4036, EXP.4051, AF-103, AF-104, SK-14, AE-3 (manufactured by Nisshin Chemical Industries CO., Ltd.), Acetylenol E00, E13T, E40, E60, E81, E100, E200 (the above are all the trade names, manufactured by Kawaken Fine Chemicals Co., Ltd.), and the like. Among them, Surfynol 465, Olfine E1010, Acetylenol E100 and E200 are suitable.

The compound represented by Formula (III-1) is, for example, preferably an ethylene oxide adduct (SURFYNOL series (Air Products & Chemicals, Inc.)) of an acetylene-based diol, and the like, and among them, compounds having a molecular weight of 200 to 1,000 are preferred, compounds having a molecular weight of 300 to 900 are more preferred, and compounds having a molecular weight 400 to 900 are particularly preferred.

As the nonionic surfactant to be contained in the ink composition in the present invention, a nonionic surfactant, in which the separation or precipitation from the ink hardly occurs and less foamability is expected, is preferred, and from this viewpoint, a nonionic surfactant having a hydrophilic group in the vicinity of the center of a hydrophobic site, or a nonionic surfactant, in which a hydrophobic site is composed of two strands or a hydrophobic site is branched, is preferred. Among them, as the nonionic surfactant, in which a hydrophobic site is composed of two strands or a hydrophobic site is branched, the compound represented by Formula (I-1) or Formula (II-1) is preferred, and as the nonionic surfactant having a hydrophilic group in the vicinity of the center of a hydrophobic site, the compound represented by Formula (III-1) is preferred. In particular, a nonionic surfactant corresponding to an acetylene glycol-based surfactant is preferred.

The content of the nonionic surfactant in the ink composition of the present invention is 0.05 to 50 g/L, preferably 0.05 to 30 g/L, and more preferably 0.1 to 20 g/L. When the content of the surfactant in the ink composition is 0.05 g/L or more, there is a tendency to suppress printing quality from significantly deteriorating, such as deterioration in discharge stability, generation of bleeding when colors are mixed, or generation of beard. Further, when the content of the nonionic surfactant in the ink composition is 50 g/L or less, there is a tendency to suppress printing from becoming poor due to adhesion of the ink on a hard surface during discharging, and the like. From this viewpoint, a static surface tension of the ink of the present invention is preferably 20 mN/m or more, and more preferably 25 mN/m or more, at 25° C. Further, at 25° C., 60 mN/m or less is preferred, 50 mN/m or less is more preferred, and 40 mN/m or less is particularly preferred.

In the ink composition or inkjet recording ink of the present invention, the ratio (nonionic surfactant/dye) of the content of the nonionic surfactant to the content of the dye is preferably 0.02 to 1.5 by mass ratio, more preferably 0.05 to 1.2, and particularly preferably 0.1 to 1.0.

[Metal Chelator]

Subsequently, a metal chelator will be described. The metal chelator refers to a compound which may form a metal ion complex having two or more donor atoms in a molecule bonded to a metal ion. As the compound, various compounds are known.

Examples thereof include aliphatic or aromatic carboxylic acid, dicarboxylic acid, polycarboxylic acid such as tri or more carboxylic acids, oxycarboxylic acid, ketocarboxylic acid, thiocarboxylic acid, aromatic aldehyde, amine-based compounds, diamine compounds, polyamine compounds, aminopolycarboxylic acid, nitrilotriacetic acid derivatives, ethylenediaminepolycarboxylic acid, amino acids, heterocyclic carboxylic acid, heterocycles, pyrimidines, nucleosides, purine bases, β-diketones, oxines, and the like. Among them, ethylenediaminepolycarboxylic acids or a chelator, in which a lone pair of a nitrogen atom may act as a donor, is preferred.

Examples thereof are not particularly limited, but include pyridine-2-carboxylic acid, pyridine-2,3-dicarboxylic acid, pyridine-2,4-dicarboxylic acid, pyridine-2,6-dicarboxylic acid, iminodiacetic acid (IDA), iminodipropionic acid, N-methyliminodiacetic acid, N,N'-ethylenediaminediacetic acid (EDDA), ethylenediaminetetraacetic acid (EDTA), ethylenediamine-N,N'-diacetic acid-N,N'-dipropionic acid (EDPA), ethylenediaminetetrapropionic acid (EDTP), 1,2-propylenediaminetetraacetic acid (PDTA), trimethylenediaminetetraacetic acid (TMTA), tetramethylenediaminetetraacetic acid, pentamethylenediaminetetraacetic acid, hexamethylenediaminetetraacetic acid, octamethylenediaminetetraacetic acid, 1,2-cyclopentanediaminetetraacetic acid, trans-cyclohexane-1,2-diaminetetraacetic acid (CDTA), 1,3,5-triaminocyclohexanehexaacetic acid (CTHA), ethyletherdiaminetetraacetic acid [2,2-oxybis(ethyliminodiacetic acid)](E-EDTA), diethylenetriaminepentaacetic acid (DTPA), glycoletherdiaminetetraacetic acid (GEDTA), trimethylenetetraaminehexaacetic acid (TTHA), quinoline-2-carboxylic acid, quinoline-8-carboxylic acid, 8-hydroxyquinoline, 1,10-phenanthroline, 2-methyl-1,10-phenanthroline (70), 5-methyl-1,10-phenanthroline, EDTA-4 sodium, picolinic acid sodium, quinolinic acid sodium, 2,9-dimethyl-1,10-phenanthroline, 4,7-dimethyl-1,10-phenanthroline, 3-hydroxy-2,2'-iminodisuccinic acid 4 sodium, and the like.

As the metal chelator used in the present invention, EDTA-4 sodium, sodium picolinate, sodium quinolinate, 1,10-phenanthroline, 8-hydroxyquinoline, and tetrasodium 3-hydroxy-2,2'-iminodisuccinate are preferred. Since aggregation of the dye of the present application having a large molecular weight due to polyvalent metal ions in the ink in a polyhetero system is suppressed by using the metal chelator, permeability of the ink into the image-receiving sheet is enhanced, and bronzing of the printed matter may be suppressed. In addition, since the dye as described in the present application forms a so-called lake pigment in the image-receiving sheet and thus become insolubilized and aggregated when divalent metal ions such as calcium or magnesium are present in the image-receiving sheet medium, permeability into the image-receiving sheet is excellent, and bronzing of the printed matter may be suppressed.

Furthermore, in the ink composition of the present invention, the ratio (content (mol) of the metal chelator/content (mol) of the dye) of the content of the metal chelator to the content of the dye is preferably 0.5 to 1.

Further, in the ink composition of the present invention, the content of the metal chelator is preferably 0.01 to 5% by mass, more preferably 0.1 to 3% by mass, and even more preferably 1 to 2% by mass, based on the total weight of the ink composition.

<Other Inks>

In order to form a full-color image and the like, it is possible to use the ink of the present invention in combination with an ink having a color tone different from the ink of the present invention. It is preferred that the ink of the present invention is used along with at least one ink selected from, for example, black ink, cyan ink, magenta ink, yellow ink, red ink, green ink, blue ink and the like. In addition, it is also possible to use the ink of the present invention further in combination with a so-called light shade ink having substantially the same color tone as these inks. A publicly known dye, or a water-soluble dye newly synthesized may also be used as a water-soluble dye of these inks or light shade ink.

<Cartridge Ink for Inkjet Printer>

The ink of the present invention may be suitably used as a cartridge ink for an inkjet printer. That is, a chamber in the cartridge for a printer may be filled with the ink of the present invention to form an image by the inkjet printer.

<Recording Medium>

As a recording medium used in forming an image using the ink of the present invention, any recording medium may be used as long as the recording medium is a recording medium that performs recording by imparting ink. In the present invention, it is preferred to use an inkjet recording medium, which adsorbs a color material such as a dye, pigment or the like to particles which form a porous structure of an ink-receiving layer. In particular, it is preferred to use a recording medium having a so-called gap-absorption type ink-receiving layer, in which ink is absorbed by pores formed in the ink-receiving layer on a support. The gap-absorption type ink-receiving layer essentially consists of particles, and may further contain a binder or other additives, if necessary.

The following may be specifically used as particles. Inorganic pigments such as zinc oxide such as silica, clay, talc, calcium carbonate, kaolin, aluminum oxide such as alumina, hydrated alumina or the like, diatomaceous earth, titanium oxide, hydrotalcite, or zinc oxide. Organic pigments such as urea formalin resin, ethylene resin, and styrene resin. These particles may be used either alone or in combination of two or more thereof, if necessary.

Examples of the binder include water-soluble polymer, latex or the like, and specifically, the followings may be used as the binder. Polyvinyl alcohol, starch, gelatin, or modified products thereof. Gum arabic. Cellulose derivatives such as carboxymethyl cellulose, hydroxyethyl cellulose or hydroxypropylmethyl cellulose. Vinyl-based copolymer latex such as SBR latex, NBR latex, methyl methacrylate-butadiene copolymer latex, functional group-modified polymer latex, or an ethylene-vinyl acetate copolymer. Polyvinyl pyrrolidone. Maleic anhydride or a copolymer thereof, or an acrylic acid ester copolymer and the like. These binders may be used either alone or in combination of two or more thereof, if necessary.

In addition, additives may be used, if necessary. For example, it is possible to use a dispersant, a thickener, a pH adjusting agent, a lubricant, a fluidity modifier, a surfactant, a defoaming agent, a release agent, a fluorescent brightener, an ultraviolet absorber, an antioxidant, a dye fixing agent and the like.

When an image is formed by using the ink of the present invention, it is preferred to use a recording medium in which an ink-receiving layer is formed by essentially including particles having an average particle diameter of 1 μm or less. Specific examples of the particles include silica particles, aluminum oxide particles and the like. Preferred silica particles are silica particles typified by colloidal silica. Commercially available colloidal silica products may also be used, but it is particularly preferred to use colloidal silica described in, for example, Japanese Patent Nos. 2803134 and 2881847. Furthermore, preferred examples of the aluminum oxide particles include hydrated alumina particles (alumina-based pigments).

It is preferred that the recording medium has a support for supporting the aforementioned ink-receiving layer. Any support may be used without any particular limitation as long as the support allows the ink-receiving layer to be formed of porous particles and imparts strength enough to be conveyed by a conveying mechanism of an inkjet recording device and the like. For example, it is possible to use a paper support consisting of a pulp raw material which essentially includes natural cellulose fibers. In addition, it is possible to use a plastic support consisting of a material such as polyester (for example, polyethylene terephthalate), cellulose triacetate, polycarbonate, polyvinyl chloride, polypropylene, polyimide and the like. Furthermore, it is possible to use an already known resin-coated paper (example: RC paper) having a polyolefin resin coating layer to which a white pigment and the like are added on at least one side thereof.

[Inkjet Recording Method]

The present invention also relates to an inkjet recording method using an inkjet printer cartridge ink according to the present invention, and an inkjet printer.

The ink of the present invention has no limitation on the recording method of the inkjet, and is used in a known method, for example, a charge control method of discharging an ink using an electrostatic attraction force, a drop-on-demand method (pressure pulse method) using oscillating pressure of a piezoelectric element, an acoustic inkjet method of discharging ink using radiation pressure by converting electrical signals into acoustic beams to irradiate the acoustic beams on the ink, a thermal inkjet method of using pressure produced by heating ink to form bubbles, and the like.

Examples of the inkjet recording method include a method of injecting ink with low concentration, which is called photo ink, in a small volume several times, a method of improving image quality using a plurality of inks having substantially the same color and different concentrations, or a method of using colorless and transparent ink.

The inkjet recording ink of the present invention may also be used for use other than inkjet recording. For example, it is possible to use the inkjet recording ink in a material for a display image, a material for forming an image on interior decoration materials, a material for forming an image on exterior decoration materials, and the like.

Examples of the material for a display image include various materials such as posters, wallpaper, decorative articles (ornaments, dolls or the like), advertising fliers, wrapping paper, wrapping materials, paper bags, plastic bags, package materials, billboards, images painted on or attached to sides of transport facilities (cars, buses, trains and the like), clothes with logo types, and the like. When the dye of the present invention is used as a material for forming a display image, the term "image" includes all of patterns formed by the dye, which are recognizable by humans, from images in a narrow sense to abstract designs, characters, geometrical patterns and the like.

Examples of the interior decoration materials include various materials such as wallpaper, decorative articles (ornaments, dolls or the like), members of lighting fixtures, members of furniture, design members of a floor or a ceiling, and the like. When the dye of the present invention is used as a material for forming an image, the term "image" includes all of patterns formed by the dye, which are recognizable by humans, from images in a narrow sense to abstract designs, characters, geometrical patterns and the like.

Examples of the exterior decoration materials include various materials such as wall materials, roofing materials, signboards, gardening materials, outdoor decorative articles (ornaments, dolls or the like), members of outdoor lighting fixtures, and the like. When the dye of the present invention is used as a material for forming an image, the term "image" includes all of patterns formed by the dye, which are recognizable by human, from images in a narrow sense to abstract designs, characters, geometrical patterns and the like.

In the uses described above, examples of media on which patterns are formed include various articles such as paper, texture, cloth (including nonwoven fabric), plastics, metals, ceramics and the like. As the dyeing form, colorants may be fixed in the form of mordanting, textile printing or a reactive dye into which a reactive group is introduced. Among them, the dyeing in the form of mordanting is preferred.

EXAMPLES

Hereinafter, the present invention will be described in more detail with reference to Examples and Comparative Examples, but the present invention is not limited to the following Examples as long as the present invention does not deviate from the gist thereof.

Hereinafter, synthesis methods of dye mixtures of the present invention will be described in detail in the Examples, but the present invention is not limited to these Examples. Meanwhile, Ink Nos. 2-4, 7-9, 12-14, 17-19, 22-24, 27-29, 32-34, 37-39, 42-44, 47-49, 52-54, 61-64, 71-74, 81-84, 101-105, 111-115, 121-125, 141-143, 151-153, 161-163, 181, 182, 191, 192, 201, 202, 221-223, 231-233, 241-243 are considered Reference Examples.

Synthesis Examples

Synthesis of Compound (A-1)

A dye represented by Compound A-1 to be described below may be, for example, derived from the following synthesis route.

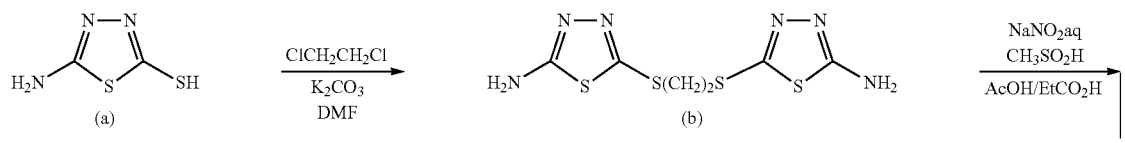

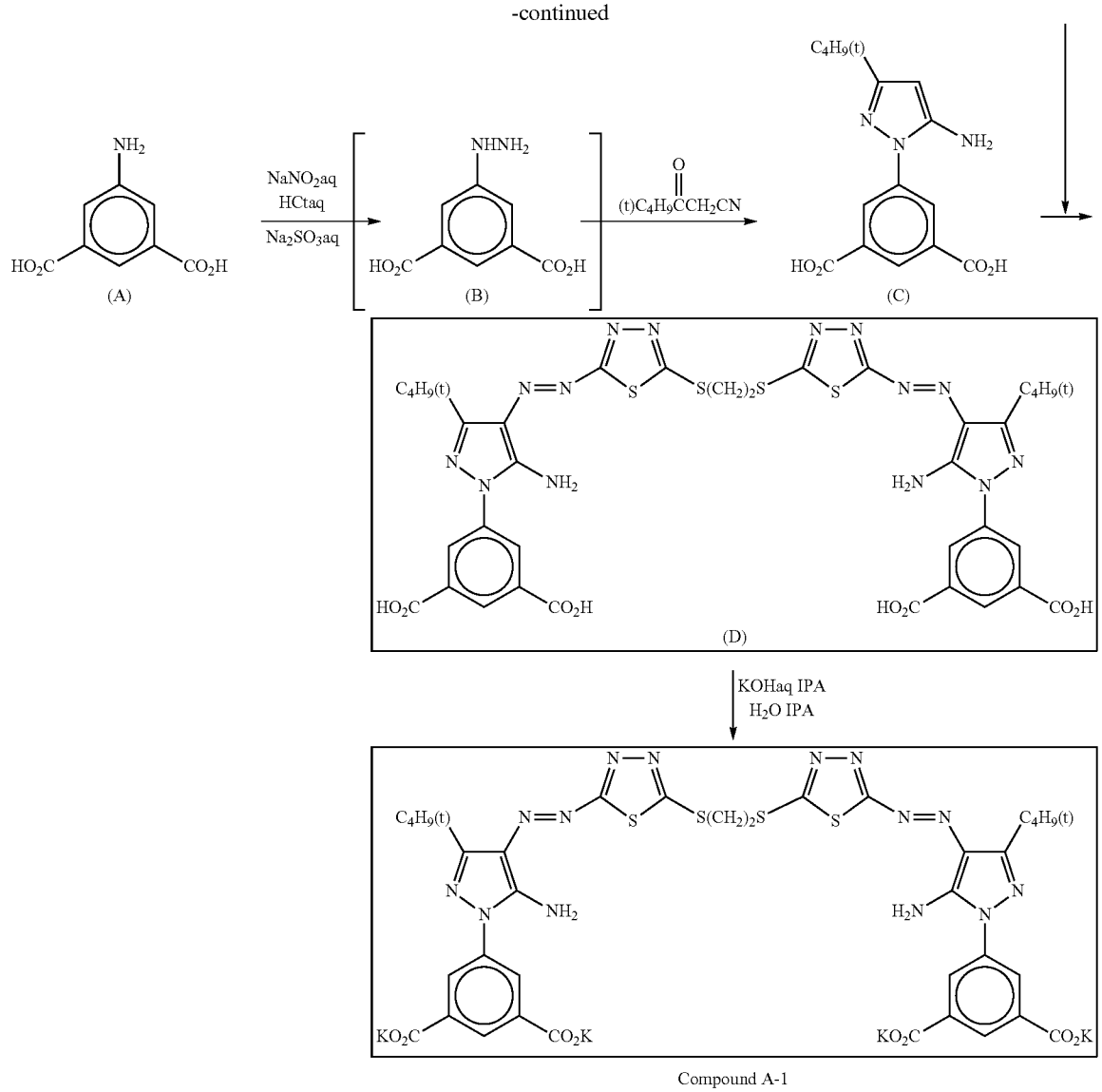

Compound A-1

Synthesis Example A-1-1

76.5 g of Compound (a) (2-amino-5-mercapto-1,3,4-thiadiazole (manufactured by Wako Pure Chemical Industries, Ltd./Catalogue No. 019-11125)) was added to 450 mL of N,N-dimethylformamide (DMF) and 24.75 g of 1,2-dichloroethane at room temperature, 79.5 g of potassium carbonate was added thereto, and then the mixture was heated to 70° C., and stirred at the same temperature for 30 minutes. Subsequently, 375 mL of warm water at 80° C. was added dropwise to the reaction solution over 10 minutes, and cooled to an internal temperature of 25° C. The precipitated crystal was filtered and separated, washed with 250 mL of ion exchange water and subsequently with 150 mL of methanol, and then dried at 70° C. overnight to obtain 65.1 g of Compound (b).

Synthesis Example A-1-2

181.2 g of amino isophthalic acid (manufactured by Wako Pure Chemical Industries, Ltd./Catalogue No. 322-26175)) (A) was suspended in 1,000 ml of ion exchange water, and then 257 mL of concentrated hydrochloric acid was added thereto, and the mixture was maintained at 5° C. in an ice bath. 116 ml of an aqueous solution of 69.7 g of sodium nitrite was added dropwise thereto (reaction solution A). 1,300 ml of an aqueous solution of 378.1 g of sodium sulfite was stirred at an internal temperature of 25° C., and reaction solution A was injected thereto. In this state, the mixture was stirred for 30 minutes, heated to an internal temperature of 30° C., and stirred for 60 minutes. 500 mL of hydrochloric acid was added to the reaction solution, and the mixture was immediately heated to an internal temperature of 50° C. (reaction solution B). After the reaction solution B was stirred in this state for 90 minutes, 125.2 g of pivaloylacetonitrile (manufactured by Tokyo Chemical Industry Co., Ltd./Catalogue No. P1112) and 100 mL of isopropanol were added to reaction solution B, and then the mixture was heated to an internal temperature of 93° C., and stirred for 240 minutes. After the mixture was cooled to room temperature, crystal (C) precipitated was suction filtered, washed with 1,500 mL of ion exchange water and subsequently with 1,000 mL of isopropanol, and then dried. Isolation yield 223.5 g. Yield 73.7%.

Synthesis Example A-1-3

29.2 g of Compound (b) was added to 100 mL of methanesulfonic acid, 120 mL of acetic acid and 180 mL of propionic acid at room temperature, the resulting mixture was heated to an internal temperature of 45° C. to prepare a uniform solution, and then the solution was cooled to an internal temperature of 0° C. Subsequently, a solution of 14.7 g of $NaNO_2$ and 27 mL of ion exchange water was added dropwise to the uniform solution while maintaining the internal temperature at 0° C. to 10° C., and the resulting solution was stirred at an internal temperature of 5° C. for 15 minutes to prepare a diazonium salt. The diazonium salt solution was added dropwise to a solution prepared in advance with 60.6 g of the coupler component (crystal) (C) prepared in Synthesis Example A-1-2, 600 mL of methanol, and 600 mL of ethylene glycol at a rate maintaining the internal temperature at 0° C. to 10° C. Subsequently, the resulting solution was stirred at an internal temperature of 25° C. for 30 minutes. The precipitated crystal was filtered and washed with 250 mL of methanol, the coarse crystal is dispersed in 650 mL of water, and then the dispersion was stirred at an internal temperature of 80° C. for 30 minutes, cooled to room temperature, filtered, washed with 300 mL of water, and then dried at 60° C. overnight to obtain 64.47 g of Colorant (D).

Subsequently, a solution of 40.0 g of potassium acetate and 200 mL of methanol was added dropwise to the aqueous colorant solution at an internal temperature of 25° C., and subsequently, the resulting solution was stirred at the same temperature for 10 minutes. Thereafter, 2,488 mL of isopropanol (IPA) was added dropwise thereto to prepare a salt, the solution was stirred at the same temperature for 30 minutes and then filtered, and the salt was washed with 500 mL of IPA and dried at 70° C. overnight to obtain 44 g of a coarse crystal of a water-soluble dye represented by Compound (A-1).

Synthesis Example A-1-5

8.7 g of a coarse crystal of a water-soluble dye represented by Compound (A-1) was dissolved in 78.3 mL of ion exchange water at room temperature, the pH value of the aqueous solution was adjusted to 8.5 using 0.1 N of hydrochloric acid, the solution was filtered with a 0.2 μm-membrane filter, and then 391.5 mL of IPA was added dropwise to the filtrate at an internal temperature of 25° C. The precipitated crystal was filtered, washed with 100 mL of IPA, and dried at 80° C. overnight to obtain 7.8 g of a fine crystal of a water-soluble dye represented by Compound (A-1). λmax: 428 nm ($H_2O$), εmax: $4.20 \times 10^4$

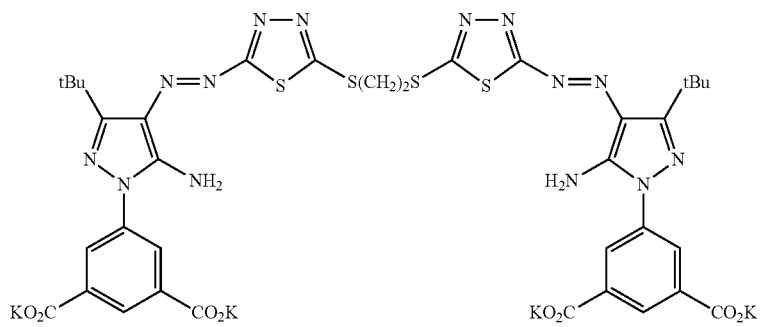

Compound (A-1)

Synthesis Example A-1-4

46.1 g of Colorant (D) prepared in Synthesis Example A-1-3 was added to a solution of 16.5 g of KOH (purified) and 414.9 mL of ion exchange water, which had been prepared in advance, at an internal temperature from 20° C. to 30° C. to dissolve the solutes.

Synthesis of Compound (A-2)

As in the synthesis of Compound A-1, a dye represented by Compound A-2 to be shown below may be synthesized by replacing 1,2-dichloroethane with 1,3-dichloropropane in Synthesis Example (A-1-1) of Compound (A-1).

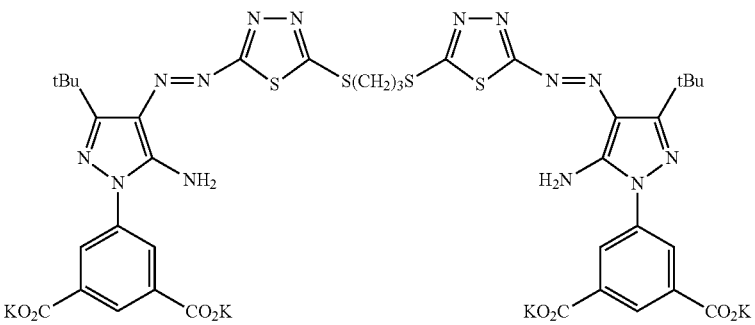

Compound (A-2)

<Preparation of Ink>

(Preparation of Stock Solution)

The following solutions were mixed and stirred at normal temperature for 1 hour, and then the solution obtained was filtered at reduced pressure using a micro filter having an aperture size of 0.25 μm, thereby obtaining Stock Solution L.

(Composition of Stock Solution)

Ultrapure water: 2.50 g

Glycerin: 12.00 g

Triethylene glycol: 18.00 g

Triethylene glycol monobutyl ether: 18.00 g

Triethanolamine: 0.20 g

PROXEL XL2 (1,2-benzisothiazolin-3-one, manufactured by Arch Chemicals, Inc.): 0.20 g AF101(1) (Vinyl acetate-based solvent resistance photosensitive emulsion, manufactured by Kurita Kagaku Kenkyujo Co., Ltd., surfactant): 0.30 g Surfynol 465 (trade name: acetylene glycol-based surfactant, manufactured by Air Products and Chemicals Inc.): 4.00 g Compound (A-1) and Compounds (B-1) to (B-12) were dissolved at concentrations shown in the following Table 6, and the resulting solutions were filtered at reduced pressure using a micro filter having an aperture size of 0.2 μm, thereby preparing ink raw materials (concentrated aqueous solutions).

TABLE 6

| Compound | Content (wt %) | PROXEL* (wt %) | Ultrapure water (wt %) |
|---|---|---|---|
| Compound (A-1) | 10.00 | 0.10 | 89.90 |
| Compound (B-1) | 8.80 | 0.10 | 91.10 |
| Compound (B-2) | 4.00 | — | 96.00 |
| Compound (B-3) | 5.40 | 0.15 | 94.45 |
| Compound (B-4) | 6.50 | 0.15 | 93.35 |
| Compound (B-5) | 6.00 | — | 94.00 |
| Compound (B-6) | 3.50 | 0.10 | 96.40 |
| Compound (B-7) | 6.40 | 0.15 | 93.45 |
| Compound (B-8) | 5.6 | 0.10 | 94.30 |
| Compound (B-9) | 5.40 | 0.10 | 94.50 |
| Compound (B-10) | 4.50 | — | 95.50 |
| Compound (B-11) | 5.00 | 0.10 | 94.90 |
| Compound (B-12) | 12.00 | 0.10 | 87.90 |

*PROXEL GXL: 1,2-benzisothiazolin-3-one, manufactured by Arch Chemicals, Inc.

Subsequently, an ink raw material adjusted by using Compound (A-1) and ink raw materials adjusted by using Compound (B-1) to (B-12) were mixed at the ratio shown in the following Tables 7 and 8, 6.9 g of Stock Solution L (mixed solution of additives) was added thereto (when the total amount exceeds 30 g, an adjustment was made such that the amount of Stock Solution L added was adjusted to obtain a total amount of 30 g), and then Inks 1 to 60 were prepared by adding water such that the combined mass became 30 g. In this case, the sum (% by mass) of the content of the color materials was adjusted to 3.2 to 5% by weight based on the total mass of the ink.

TABLE 7

| Ink No. | First color material | Second color material | First color material/Second color material | Amount of ink raw materials added — First ink raw material (g) | Amount of ink raw materials added — Second ink raw material (g) | Addition amount as a compound — First color material (g) | Addition amount as a compound — Second color material (g) | Content of Compounds — First color material (wt %) | Content of Compounds — Second color material (wt %) | Remark |
|---|---|---|---|---|---|---|---|---|---|---|
| 1 | A-1 | — | 100/0 | 15 | 0.000 | 1.5 | 0 | 5 | 0 | C. Ex. |
| 2 | A-1 | B-1 | 75/25 | 11.25 | 4.261 | 1.125 | 0.375 | 3.75 | 1.25 | Ex. |
| 3 | A-1 | B-1 | 50/50 | 7.5 | 8.523 | 0.75 | 0.75 | 2.5 | 2.5 | Ex. |
| 4 | A-1 | B-1 | 25/75 | 3.75 | 12.784 | 0.375 | 1.125 | 1.25 | 3.75 | Ex. |
| 5 | — | B-1 | 0/100 | 0 | 17.045 | 0 | 1.5 | 0 | 5 | C. Ex. |
| 6 | A-1 | — | 100/0 | 9.60 | 0.000 | 0.96 | 0 | 3.2 | 0 | C. Ex. |
| 7 | A-1 | B-2 | 75/25 | 7.20 | 6.00 | 0.72 | 0.24 | 2.40 | 0.80 | Ex. |
| 8 | A-1 | B-2 | 50/50 | 4.80 | 12.00 | 0.48 | 0.48 | 1.60 | 1.60 | Ex. |
| 9 | A-1 | B-2 | 25/75 | 2.4 | 18.00 | 0.24 | 0.72 | 0.80 | 2.40 | Ex. |
| 10 | — | B-2 | 0/100 | 0 | 24.00 | 0 | 0.96 | 0 | 3.2 | C. Ex. |
| 11 | A-1 | — | 100/0 | 15 | 0.00 | 1.5 | 0 | 5 | 0 | C. Ex. |
| 12 | A-1 | B-3 | 75/25 | 11.25 | 6.94 | 1.125 | 0.375 | 3.75 | 1.25 | Ex. |
| 13 | A-1 | B-3 | 50/50 | 7.5 | 13.89 | 0.75 | 0.75 | 2.5 | 2.5 | Ex. |
| 14 | A-1 | B-3 | 25/75 | 3.75 | 20.83 | 0.375 | 1.125 | 1.25 | 3.75 | Ex. |
| 15 | — | B-3 | 0/100 | 0 | 27.78 | 0 | 1.5 | 0 | 5 | C. Ex. |
| 16 | A-1 | — | 100/0 | 15 | 0.00 | 1.5 | 0 | 5 | 0 | C. Ex. |
| 17 | A-1 | B-4 | 75/25 | 11.25 | 5.77 | 1.125 | 0.375 | 3.75 | 1.25 | Ex. |
| 18 | A-1 | B-4 | 50/50 | 7.5 | 11.54 | 0.75 | 0.75 | 2.5 | 2.5 | Ex. |
| 19 | A-1 | B-4 | 25/75 | 3.75 | 17.31 | 0.375 | 1.125 | 1.25 | 3.75 | Ex. |
| 20 | — | B-4 | 0/100 | 0 | 23.08 | 0 | 1.5 | 0 | 5 | C. Ex. |
| 21 | A-1 | — | 100/0 | 15 | 0.00 | 1.5 | 0 | 5 | 0 | C. Ex. |
| 22 | A-1 | B-5 | 75/25 | 11.25 | 6.25 | 1.125 | 0.375 | 3.75 | 1.25 | Ex. |
| 23 | A-1 | B-5 | 50/50 | 7.5 | 12.50 | 0.75 | 0.75 | 2.5 | 2.5 | Ex. |
| 24 | A-1 | B-5 | 25/75 | 3.75 | 18.75 | 0.375 | 1.125 | 1.25 | 3.75 | Ex. |
| 25 | — | B-5 | 0/100 | 0 | 25.00 | 0 | 1.5 | 0 | 5 | C. Ex. |
| 26 | A-1 | — | 100/0 | 9.00 | 0.00 | 0.90 | 0 | 3.00 | 0 | C. Ex. |
| 27 | A-1 | B-6 | 75/25 | 6.75 | 6.429 | 0.675 | 0.225 | 0.75 | 2.25 | Ex. |
| 28 | A-1 | B-6 | 50/50 | 4.50 | 12.857 | 0.45 | 0.45 | 1.50 | 1.50 | Ex. |
| 29 | A-1 | B-6 | 25/75 | 2.25 | 19.857 | 0.225 | 0.675 | 2.25 | 0.75 | Ex. |
| 30 | — | B-6 | 0/100 | 0 | 25.714 | 0 | 0.90 | 0 | 3.00 | C. Ex. |

TABLE 8

| Ink No. | First color material | Second color material | Mass ratio First color material/Second color material | Amount of ink raw materials added First ink raw material (g) | Second ink raw material (g) | Addition amount as a compound First color material (g) | Second color material (g) | Content of Compounds First color material (wt %) | Second color material (wt %) | Remark |
|---|---|---|---|---|---|---|---|---|---|---|
| 31 | A-1 | — | — | 15 | 0.00 | 1.5 | 0 | 5 | 0 | C. Ex. |
| 32 | A-1 | B-7 | 3.0 | 11.25 | 5.86 | 1.125 | 0.375 | 3.75 | 1.25 | Ex. |
| 33 | A-1 | B-7 | 1.0 | 7.5 | 11.72 | 0.75 | 0.75 | 2.5 | 2.5 | Ex. |
| 34 | A-1 | B-7 | 0.3 | 3.75 | 17.58 | 0.375 | 1.125 | 1.25 | 3.75 | Ex. |
| 35 | — | B-7 | 0 | 0 | 23.44 | 0 | 1.5 | 0 | 5 | C. Ex. |
| 36 | A-1 | — | — | 15 | 0.00 | 1.5 | 0 | 5 | 0 | C. Ex. |
| 37 | A-1 | B-8 | 3.0 | 11.25 | 6.70 | 1.125 | 0.375 | 3.75 | 1.25 | Ex. |
| 38 | A-1 | B-8 | 1.0 | 7.5 | 13.39 | 0.75 | 0.75 | 2.5 | 2.5 | Ex. |
| 39 | A-1 | B-8 | 0.3 | 3.75 | 20.09 | 0.375 | 1.125 | 1.25 | 3.75 | Ex. |
| 40 | — | B-8 | 0 | 0 | 26.79 | 0 | 1.5 | 0 | 5 | C. Ex. |
| 41 | A-1 | — | — | 15 | 0.00 | 1.5 | 0 | 5 | 0 | C. Ex. |
| 42 | A-1 | B-9 | 3.0 | 11.25 | 6.94 | 1.125 | 0.375 | 3.75 | 1.25 | Ex. |
| 43 | A-1 | B-9 | 1.0 | 7.5 | 13.89 | 0.75 | 0.75 | 2.5 | 2.5 | Ex. |
| 44 | A-1 | B-9 | 0.3 | 3.75 | 20.83 | 0.375 | 1.125 | 1.25 | 3.75 | Ex. |
| 45 | — | B-9 | 0 | 0 | 27.78 | 0 | 1.5 | 0 | 5 | C. Ex. |
| 46 | A-1 | — | — | 12 | 0.00 | 1.2 | 0 | 4.0 | 0 | C. Ex. |
| 47 | A-1 | B-10 | 3.0 | 9.0 | 6.67 | 0.9 | 0.3 | 3.0 | 1.0 | Ex. |
| 48 | A-1 | B-10 | 1.0 | 6.0 | 13.33 | 0.6 | 0.6 | 2.0 | 2.0 | Ex. |
| 49 | A-1 | B-10 | 0.3 | 3.0 | 20.00 | 0.3 | 0.9 | 1.0 | 3.0 | Ex. |
| 50 | — | B-10 | 0 | 0 | 26.67 | 0 | 1.2 | 0 | 4.0 | C. Ex. |
| 51 | A-1 | — | — | 13.5 | 0.00 | 1.35 | 0 | 4.5 | 0 | C. Ex. |
| 52 | A-1 | B-11 | 3.0 | 10.125 | 6.75 | 1.013 | 0.338 | 1.125 | 3.375 | Ex. |
| 53 | A-1 | B-11 | 1.0 | 6.75 | 13.50 | 0.675 | 0.675 | 2.25 | 2.25 | Ex. |
| 54 | A-1 | B-11 | 0.3 | 3.375 | 20.25 | 0.338 | 1.013 | 3.375 | 1.125 | Ex. |
| 55 | — | B-11 | 0 | 00.00 | 27.00 | 0 | 1.35 | 0 | 4.5 | C. Ex. |
| 56 | A-1 | — | — | 15 | 0.00 | 1.5 | 0 | 5 | 0 | C. Ex. |
| 57 | A-1 | B-12 | 3.0 | 11.25 | 3.13 | 1.125 | 0.375 | 3.75 | 1.25 | Ex. |
| 58 | A-1 | B-12 | 1.0 | 7.5 | 6.25 | 0.75 | 0.75 | 2.5 | 2.5 | Ex. |
| 59 | A-1 | B-12 | 0.3 | 3.75 | 9.38 | 0.375 | 1.125 | 1.25 | 3.75 | Ex. |
| 60 | — | B-12 | 0 | 0 | 12.50 | 0 | 1.5 | 0 | 5 | C. Ex. |

An image was allowed to be recorded on a CRISPIA paper (trade name, manufactured by SEIKO EPSON CORPORATION) by means of an inkjet printer PM-700C (trade name, manufactured by SEIKO EPSON CORPORATION) by using the ink obtained, and hue, concentration, paper dependence, water resistance and ozone resistance were evaluated as follows.

<Evaluation>

(1) Hue

With respect to hue, evaluation was performed in three stages A (best), B (good), and C (bad) by visual inspection.

(2) Concentration

The concentration of a dye printed part of the CRISPIA paper on which the image was recorded was measured by using X-Rite310TR (trade name, a reflection densitometer manufactured by X-Rite, Inc.), and evaluated. Evaluation was performed in three stages A (best), B (good), and C (bad) in the order of high concentration. Further, with respect to Ink Nos. 1 to 10, the values (OD value) of λmax (reflection spectrum) were measured, and illustrated in FIGS. 1 and 2.

(3) Paper Dependence

The hues were compared between the image recorded on the CRISPIA paper and the images separately recorded on Kassai (trade name, inkjet printer paper manufactured by Fujifilm Corporation) and PT-101 (trade name, photographic paper manufactured by Canon Inc. Gloss•Pro), and evaluation was performed in 3 stages in which almost no difference between both the images was defined as A (best), a small difference between both the images was defined as B (good), and a large difference between both the images was defined as C (bad).

(4) Water Resistance

The CRISPIA paper on which the image was recorded was dried at room temperature for 1 hour, dipped in ultrapure water for 10 seconds, and then naturally dried at room temperature to observe bleeding. In the order of small bleeding, evaluation is performed in three stages A (best), B (good), and C (bad) by visual inspection.

(5) Light Fastness

On the CRISPIA paper on which the image was recorded, xenon light (85,000 lux) was irradiated for 7 days by using Atlas Weather-Ometer C. 165 (trade name, manufactured by O-WELL CORPORATION), and the image concentration before and after the xenon irradiation was measured by using X-Rite 310TR (trade name, reflection densitometer manufactured by X-Rite, Inc.). Meanwhile, the concentration was measured at three points of 1.0, 1.5 and 2.0 in terms of image concentration before the irradiation. Thereafter, based on the measurement results, the colorant residual ratio [(image concentration after the irradiation/image concentration before the irradiation)×100%] was calculated, and evaluation was performed in 3 stages in which a colorant residual ratio of 70% or more at three points was defined as A, a colorant residual ratio of less than 70% at one or two points was defined as B, and a colorant residual ratio of less than 70% at all the concentrations was defined as C.

(6) Ozone Resistance

The CRISPIA paper on which the image was recorded was left to stand for 3 days in a box set to an ozone gas concentration of 10±0.1 ppm (room temperature and dark place), and the image concentration before and after being left to stand in the ozone gas atmosphere was measured by using X-Rite310TR (trade name, a reflection densitometer manufactured by X-Rite, Inc.). Meanwhile, the concentration was measured at three points of 1.0, 1.5 and 2.0 in terms of image concentration before being left to stand. Thereafter, as in the light fastness test, based on the measurement results, the colorant residual ratio [(image concentration after the irradiation/image concentration before the irradiation)×100%] was calculated, and evaluation was performed in 3 stages in which a colorant residual ratio of 70% or more at three points was defined as A, a colorant residual ratio of less than 70% at one or two points was defined as B, and a colorant residual ratio of less than 70% at all the concentrations was defined as C. The ozone gas concentration in the box was set using an ozone gas monitor (manufactured by APPLICS Co., Ltd.: OZG-EM-01).

Figure 3:
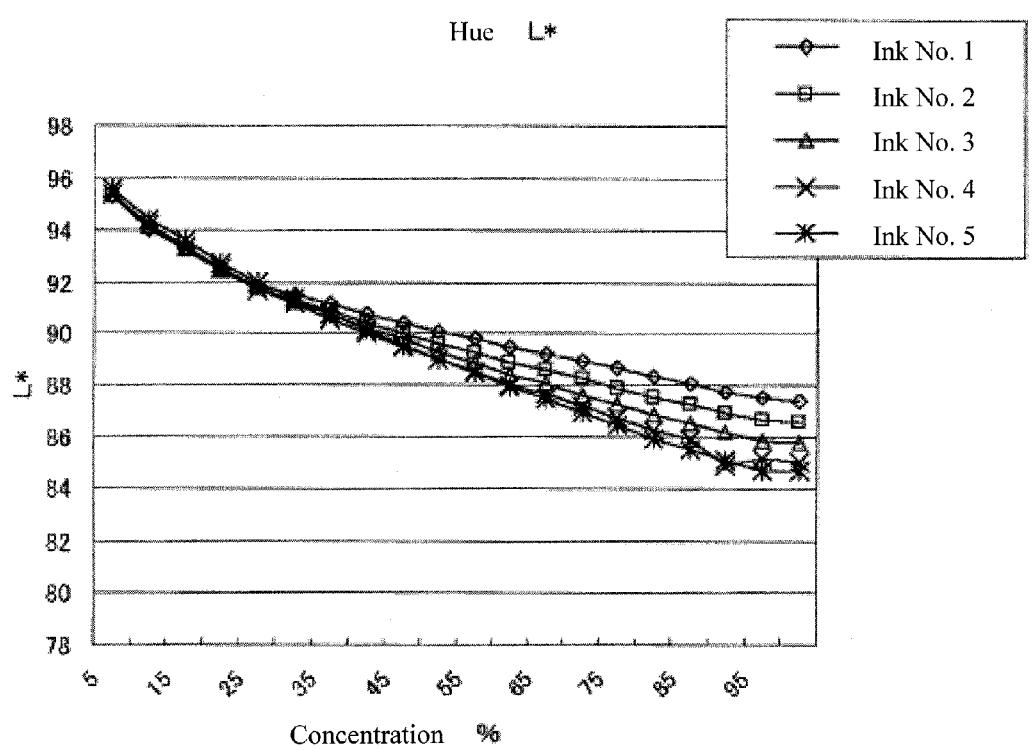
FIG. 3 is a diagram illustrating the relationship between L* calculated and concentration (%) with respect to Ink Nos. 1 to 5 in the Examples.
Figure 4:
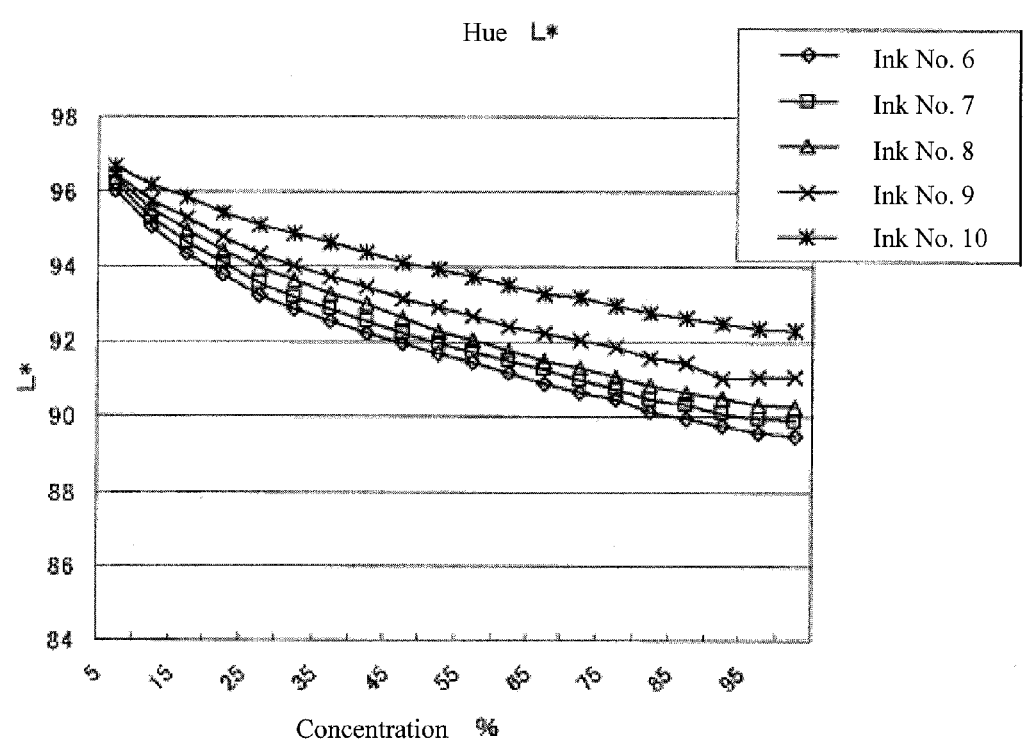
FIG. 4 is a diagram illustrating the relationship between L* calculated and concentration (%) with respect to Ink Nos. 6 to 10 in the Examples.
Figure 5:
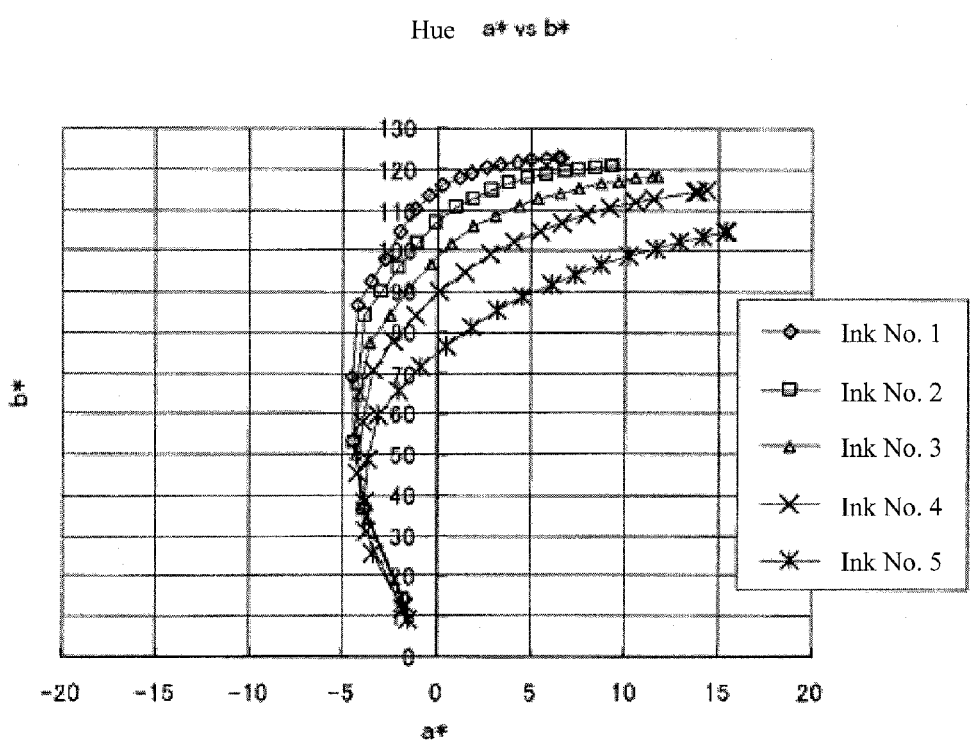
FIG. 5 is a diagram illustrating the relationship between a* and b*, which are calculated with respect to Ink Nos. 1 to 5 in the Examples.
Figure 6:
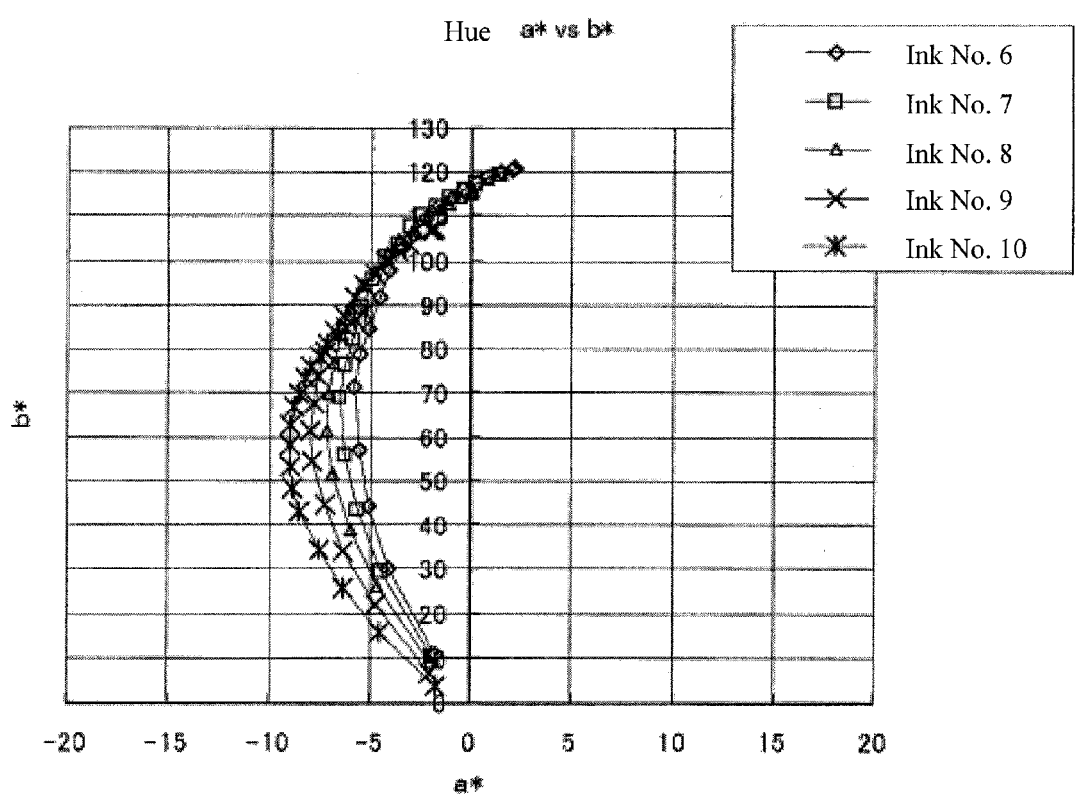
FIG. 6 is a diagram illustrating the relationship between a* and b*, which are calculated with respect to Ink Nos. 6 to 10 in the Examples.

(7) With respect to Ink Nos. 1 to 10, the printed part of the CRISPIA paper on which the image was recorded was color-measured using GRETAG SPM100-II (manufactured by GRETAG Co., Ltd.), and L*, a* and b* were calculated from the result based on the CIE (International Commission on Illumination) L*a*b* color-space system. The relationship between L* and concentration (%) was illustrated in FIGS. 3 and 4. Further, the relationship between a* and b* was illustrated in FIGS. 5 and 6.

The evaluation results are shown in the following Tables 9 and 10.

TABLE 9

| Ink No. | First color material | Second color material | Mass ratio First color material/ Second color material | Hue | Concentration (OD value) | Paper dependence | Water resistance | Light fastness | Ozone resistance | Remark |
|---|---|---|---|---|---|---|---|---|---|---|
| 1 | A-1 | — | — | B | B | A | A | A | A | C. Ex. |
| 2 | A-1 | B-1 | 3.0 | A | A | A | A | A | A | Ex. |
| 3 | A-1 | B-1 | 1.0 | A | A | A | A | A | A | Ex. |
| 4 | A-1 | B-1 | 0.3 | A | B | A | A | A | A | Ex. |
| 5 | — | B-1 | 0 | A | C | C | B | C | C | C. Ex. |
| 6 | A-1 | — | — | B | B | A | A | A | A | C. Ex. |
| 7 | A-1 | B-2 | 3.0 | A | A | A | A | A | A | Ex. |
| 8 | A-1 | B-2 | 1.0 | A | A | A | A | A | A | Ex. |
| 9 | A-1 | B-2 | 0.3 | A | B | A | A | A | A | Ex. |
| 10 | — | B-2 | 0 | C | C | B | C | C | C | C. Ex. |
| 11 | A-1 | — | — | B | B | A | A | A | A | C. Ex. |
| 12 | A-1 | B-3 | 3.0 | A | A | A | A | A | A | Ex. |
| 13 | A-1 | B-3 | 1.0 | A | A | A | A | A | A | Ex. |
| 14 | A-1 | B-3 | 0.3 | A | A | A | A | A | A | Ex. |
| 15 | — | B-3 | 0 | C | C | C | C | C | C | C. Ex. |
| 16 | A-1 | — | — | B | B | A | A | A | A | C. Ex. |
| 17 | A-1 | B-4 | 3.0 | A | A | A | A | A | A | Ex. |
| 18 | A-1 | B-4 | 1.0 | A | A | A | A | A | A | Ex. |
| 19 | A-1 | B-4 | 0.3 | B | A | A | A | B | A | Ex. |
| 20 | — | B-4 | 0 | C | B | C | C | B | C | C. Ex. |
| 21 | A-1 | — | — | B | B | A | A | A | A | C. Ex. |
| 22 | A-1 | B-5 | 3.0 | A | A | A | A | A | A | Ex. |
| 23 | A-1 | B-5 | 1.0 | A | A | A | A | A | A | Ex. |
| 24 | A-1 | B-5 | 0.3 | B | B | A | B | B | B | Ex. |
| 25 | — | B-5 | 0 | B | A | C | C | C | C | C. Ex. |
| 26 | A-1 | — | — | B | B | A | A | A | A | C. Ex. |
| 27 | A-1 | B-6 | 3.0 | A | A | A | A | A | A | Ex. |
| 28 | A-1 | B-6 | 1.0 | A | A | A | A | A | A | Ex. |
| 29 | A-1 | B-6 | 0.3 | B | B | A | A | B | A | Ex. |
| 30 | — | B-6 | 0 | C | C | C | C | C | B | C. Ex. |

TABLE 10

| Ink No. | First color material | Second color material | Mass ratio First color material/ Second color material | Hue | Concentration (OD value) | Paper dependence | Water resistance | Light fastness | Ozone resistance | Remark |
|---|---|---|---|---|---|---|---|---|---|---|
| 31 | A-1 | — | — | B | B | A | A | A | A | C. Ex. |
| 32 | A-1 | B-7 | 3.0 | A | B | A | A | A | A | Ex. |
| 33 | A-1 | B-7 | 1.0 | B | C | B | B | A | B | Ex. |
| 34 | A-1 | B-7 | 0.3 | C | C | C | C | B | C | Ex. |
| 35 | — | B-7 | 0 | C | C | C | C | B | C | C. Ex. |
| 36 | A-1 | — | — | B | B | A | A | A | A | C. Ex. |
| 37 | A-1 | B-8 | 3.0 | A | A | B | A | B | A | Ex. |
| 38 | A-1 | B-8 | 1.0 | A | B | B | B | B | B | Ex. |
| 39 | A-1 | B-8 | 0.3 | B | C | C | B | C | C | Ex. |
| 40 | — | B-8 | 0 | B | C | C | C | C | C | C. Ex. |
| 41 | A-1 | — | — | B | B | A | A | A | A | C. Ex. |
| 42 | A-1 | B-9 | 3.0 | A | A | A | A | A | A | Ex. |
| 43 | A-1 | B-9 | 1.0 | B | B | A | A | B | B | Ex. |
| 44 | A-1 | B-9 | 0.3 | B | B | B | B | B | C | Ex. |

TABLE 10-continued

| Ink No. | First color material | Second color material | Mass ratio First color material/ Second color material | Hue | Concentration (OD value) | Paper dependence | Water resistance | Light fastness | Ozone resistance | Remark |
|---|---|---|---|---|---|---|---|---|---|---|
| 45 | — | B-9 | 0 | C | C | B | C | C | C | C. Ex. |
| 46 | A-1 | — | — | B | B | A | A | A | A | C. Ex. |
| 47 | A-1 | B-10 | 3.0 | A | A | A | A | A | A | Ex. |
| 48 | A-1 | B-10 | 1.0 | A | A | A | A | A | A | Ex. |
| 49 | A-1 | B-10 | 0.3 | B | B | B | B | B | A | Ex. |
| 50 | — | B-10 | 0 | C | B | B | C | C | C | C. Ex. |
| 51 | A-1 | — | — | B | B | A | A | A | A | C. Ex. |
| 52 | A-1 | B-11 | 3.0 | B | A | A | A | B | A | Ex. |
| 53 | A-1 | B-11 | 1.0 | C | B | B | B | C | A | Ex. |
| 54 | A-1 | B-11 | 0.3 | C | B | C | C | C | B | Ex. |
| 55 | — | B-11 | 0 | B | C | C | C | C | B | C. Ex. |
| 56 | A-1 | — | — | B | B | A | A | A | A | C. Ex. |
| 57 | A-1 | B-12 | 3.0 | A | A | A | A | A | A | Ex. |
| 58 | A-1 | B-12 | 1.0 | A | A | A | A | A | A | Ex. |
| 59 | A-1 | B-12 | 0.3 | A | A | A | A | A | A | Ex. |
| 60 | — | B-12 | 0 | B | A | A | A | A | A | C. Ex. |

From the aforementioned results, in Ink Nos. 2 to 4, 7 to 9, 12 to 14, 17 to 19, 22 to 24, 27 to 29, 32 to 34, 37 to 39, 42 to 44, 47 to 49, 52 to 54, and 57 to 59, a first color material represented by Formula (A-I) was used in combination with a second color material selected from Formula (B-I) and Formula (B-V) to have better water resistance, light resistance, ozone resistance than the case where these color materials were used alone, and particularly, the hue was satisfactory, and thus a color at high concentration could be obtained.

Figure 2:
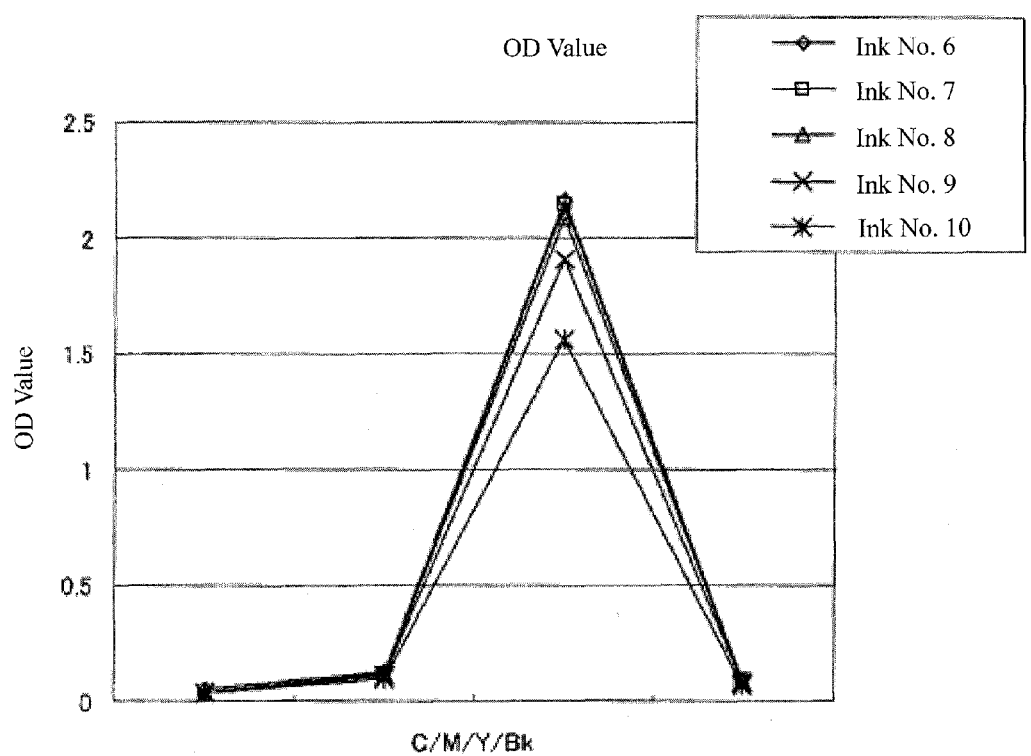
FIG. 2 is a diagram illustrating a value (OD value) of λmax (reflection spectrum) on a CRISPIA paper which records an image with respect to Ink Nos. 6 to 10 in the Examples.

From FIGS. 1 and 2, all of Ink Nos. 2 to 4 of the present invention could obtain high OD values compared to Ink No. 5 including only the second color material. In addition, from FIGS. 3 to 6, it could be seen that a desired hue could be obtained by changing the mixing ratio of the first color material and the second color material.

As in Stock Solution L, Stock Solutions L-1 to L-9 and L-11 to L-18 with the compositions shown in the following Tables 11 to 15 were prepared.

TABLE 11

| Type of additive | Additive | L | L-1 | L-2 | L-3 | L-4 |
|---|---|---|---|---|---|---|
| — | Ultrapure water | 2.50 | 14.50 | 14.50 | 14.50 | 2.80 |
| Water-soluble organic solvent | Glycerin | 12.00 | 0.00 | 18.00 | 18.00 | 12.00 |
| Water-soluble organic solvent | Triethylene glycol | 18.00 | 18.00 | 0.00 | 18.00 | 18.00 |
| Water-soluble organic solvent | Triethylene glycol monobutyl ether | 18.00 | 18.00 | 18.00 | 0.00 | 18.00 |
| Water-soluble organic solvent | AF101 | 0.30 | 0.30 | 0.30 | 0.30 | 0.00 |
| Urea-based compound | Triethanolamine | 0.20 | 0.20 | 0.20 | 0.20 | 0.20 |
| Preservative | PROXEL XL2 | 0.20 | 0.20 | 0.20 | 0.20 | 0.20 |
| Surfactant | Surfynol 465 | 4.00 | 4.00 | 4.00 | 4.00 | 4.00 |
| Metal chelator | | 0.00 | 0.00 | 0.00 | 0.00 | 0.00 |
| | Total (g) | 55.20 | 55.20 | 55.20 | 55.20 | 55.20 |

* Unit is g (gram)

TABLE 12

| Type of additive | Additive | L | L-5 | L-6 | L-7 | L-8 | L-9 |
|---|---|---|---|---|---|---|---|
| — | Ultrapure water | 2.50 | 2.70 | 2.50 | 2.50 | 2.50 | 2.50 |
| Water-soluble organic solvent | Glycerin | 12.00 | 12.00 | 12.00 | 12.00 | 12.00 | 12.00 |
| Water-soluble organic solvent | Triethylene glycol | 18.00 | 18.00 | 18.00 | 18.00 | 18.00 | 18.00 |
| Water-soluble organic solvent | Triethylene glycol monobutyl ether | 18.00 | 18.00 | 18.00 | 18.00 | 18.00 | 18.00 |
| Water-soluble organic solvent | AF101 | 0.30 | 0.30 | 0.30 | 0.30 | 0.30 | 0.30 |
| Urea-based compound | Triethanolamine | 0.20 | 0.00 | 0.00 | 0.00 | 0.00 | 0.00 |
| Urea-based compound | N,N-diethyl urea | 0.00 | 0.00 | 0.20 | 0.00 | 0.00 | 0.00 |
| Urea-based compound | Ethylene urea | 0.00 | 0.00 | 0.00 | 0.20 | 0.00 | 0.00 |
| Urea-based compound | N,N-dihydroxyethyl urea | 0.00 | 0.00 | 0.00 | 0.00 | 0.20 | 0.00 |
| Urea-based compound | Thiourea | 0.00 | 0.00 | 0.00 | 0.00 | 0.00 | 0.20 |
| Preservative | PROXEL XL2 | 0.20 | 0.20 | 0.20 | 0.20 | 0.20 | 0.20 |
| Surfactant | Surfynol 465 | 4.00 | 4.00 | 4.00 | 4.00 | 4.00 | 4.00 |
| Metal chelator | | 0.00 | 0.00 | 0.00 | 0.00 | 0.00 | 0.00 |
| | Total (g) | 55.20 | 55.20 | 55.20 | 55.20 | 55.20 | 55.20 |

* Unit is g (gram)

TABLE 13

| Type of additive | Additive | L | L-11 | L-12 | L-13 |
|---|---|---|---|---|---|
| — | Ultrapure water | 2.50 | 2.50 | 2.50 | 2.70 |
| Water-soluble organic solvent | Glycerin | 12.00 | 12.00 | 12.00 | 12.00 |
| Water-soluble organic solvent | Triethylene glycol | 18.00 | 18.00 | 18.00 | 18.00 |
| Water-soluble organic solvent | Triethylene glycol monobutyl ether | 18.00 | 18.00 | 18.00 | 18.00 |
| Water-soluble organic solvent | AF101 | 0.30 | 0.30 | 0.30 | 0.30 |
| Urea-based compound | Triethanolamine | 0.20 | 0.20 | 0.20 | 0.20 |
| Preservative | PROXEL XL2 | 0.20 | 0.00 | 0.00 | 0.00 |
| Preservative | Phenoxy ethanol | 0.00 | 0.20 | 0.00 | 0.00 |
| Preservative | Pentylene glycol | 0.00 | 0.00 | 0.20 | 0.00 |

TABLE 13-continued

| Type of additive | Additive | L | L-11 | L-12 | L-13 |
|---|---|---|---|---|---|
| Surfactant | Surfynol 465 | 4.00 | 4.00 | 4.00 | 4.00 |
| Metal chelator | | 0.00 | 0.00 | 0.00 | 0.00 |
| Total (g) | | 55.20 | 55.20 | 55.20 | 55.20 |

* Unit is g (gram)

TABLE 14

| Type of additive | Additive | L | L-14 | L-15 |
|---|---|---|---|---|
| — | Ultrapure water | 2.50 | 2.50 | 6.50 |
| Water-soluble organic solvent | Glycerin | 12.00 | 12.00 | 12.00 |
| Water-soluble organic solvent | Triethylene glycol | 18.00 | 18.00 | 18.00 |
| Water-soluble organic solvent | Triethylene glycol monobutyl ether | 18.00 | 18.00 | 18.00 |
| Water-soluble organic solvent | AF101 | 0.30 | 0.30 | 0.30 |
| Urea-based compound | Triethanolamine | 0.20 | 0.20 | 0.20 |
| Preservative | PROXEL XL2 | 0.20 | 0.20 | 0.20 |
| Surfactant | Surfynol 465 | 4.00 | 0.00 | 0.00 |
| Surfactant | OLFINE E1010 | 0.00 | 4.00 | 0.00 |
| Metal chelator | | 0.00 | 0.00 | 0.00 |
| Total (g) | | 55.20 | 55.20 | 55.20 |

* Unit is g (gram)

TABLE 15

| Type of additive | Additive | L | L-16 | L-17 | L-18 |
|---|---|---|---|---|---|
| — | Ultrapure water | 2.50 | 2.00 | 2.00 | 2.00 |
| Water-soluble organic solvent | Glycerin | 12.00 | 12.00 | 12.00 | 12.00 |
| Water-soluble organic solvent | Triethylene glycol | 18.00 | 18.00 | 18.00 | 18.00 |
| Water-soluble organic solvent | Triethylene glycol monobutyl ether | 18.00 | 18.00 | 18.00 | 18.00 |
| Water-soluble organic solvent | AF101 | 0.30 | 0.30 | 0.30 | 0.30 |
| Urea-based compound | Triethanolamine | 0.20 | 0.20 | 0.20 | 0.20 |
| Preservative | PROXEL XL2 | 0.20 | 0.20 | 0.20 | 0.20 |
| Surfactant | Surfynol 465 | 4.00 | 4.00 | 4.00 | 4.00 |
| Metal chelator | EDTA-4 sodium | 0.00 | 0.50 | 0.00 | 0.00 |
| Metal chelator | Sodium picolinate | 0.00 | 0.00 | 0.50 | 0.00 |
| Metal chelator | 1,10-phenanthroline | 0.00 | 0.00 | 0.00 | 0.50 |
| Total (g) | | 55.20 | 55.20 | 55.20 | 55.20 |

* Unit is g (gram)

Ink Nos. 61 to 64 were prepared in the same manner as in Ink No. 3, except that Stock Solution L was replaced with Stock Solutions L-1 to L-4.

Ink Nos. 71 to 74 were prepared in the same manner as in Ink No. 8, except that Stock Solution L was replaced with Stock Solutions L-1 to L-4.

Ink Nos. 81 to 84 were prepared in the same manner as in Ink No. 14, except that Stock Solution L was replaced with Stock Solutions L-1 to L-4.

Ink Nos. 91 to 94 were prepared in the same manner as in Ink No. 58, except that Stock Solution L was replaced with Stock Solutions L-1 to L-4.

Ink Nos. 101 to 105 were prepared in the same manner as in Ink No. 3, except that Stock Solution L was replaced with Stock Solutions L-5 to L-9.

Ink Nos. 111 to 115 were prepared in the same manner as in Ink No. 8, except that Stock Solution L was replaced with Stock Solutions L-5 to L-9.

Ink Nos. 121 to 125 were prepared in the same manner as in Ink No. 14, except that Stock Solution L was replaced with Stock Solutions L-5 to L-9.

Ink Nos. 131 to 135 were prepared in the same manner as in Ink No. 58, except that Stock Solution L was replaced with Stock Solutions L-5 to L-9.

Ink Nos. 141 to 143 were prepared in the same manner as in Ink No. 3, except that Stock Solution L was replaced with Stock Solutions L-11 to L-13.

Ink Nos. 151 to 153 were prepared in the same manner as in Ink No. 8, except that Stock Solution L was replaced with Stock Solutions L-11 to L-13.

Ink Nos. 161 to 163 were prepared in the same manner as in Ink No. 14, except that Stock Solution L was replaced with Stock Solutions L-11 to L-13.

Ink Nos. 171 to 173 were prepared in the same manner as in Ink No. 58, except that Stock Solution L was replaced with Stock Solutions L-11 to L-13.

Ink Nos. 181 and 182 were prepared in the same manner as in Ink No. 3, except that Stock Solution L was replaced with Stock Solutions L-14 and L-15.

Ink Nos. 191 and 192 were prepared in the same manner as in Ink No. 8, except that Stock Solution L was replaced with Stock Solutions L-14 and L-15.

Ink Nos. 201 and 202 were prepared in the same manner as in Ink No. 14, except that Stock Solution L was replaced with Stock Solutions L-14 and L-15.

Ink Nos. 211 and 212 were prepared in the same manner as in Ink No. 58, except that Stock Solution L was replaced with Stock Solutions L-14 and L-15.

Ink Nos. 221 to 223 were prepared in the same manner as in Ink No. 3, except that Stock Solution L was replaced with Stock Solutions L-16 to L-18.

Ink Nos. 231 to 233 were prepared in the same manner as in Ink No. 8, except that Stock Solution L was replaced with Stock Solutions L-16 to L-18.

Ink Nos. 241 to 243 were prepared in the same manner as in Ink No. 14, except that Stock Solution L was replaced with Stock Solutions L-16 to L-18.

Ink Nos. 251 to 253 were prepared in the same manner as in Ink No. 58, except that Stock Solution L was replaced with Stock Solutions L-16 to L-18.

(Evaluation of Clogging of Nozzle)

The ink prepared was evaluated by using an inkjet printer PM-700C (trade name, manufactured by SEIKO EPSON CORPORATION).

10 cartridges filled with each ink were each prepared. After it was confirmed that the cartridges may print the ink normally, the cartridges were left to stand in the environment of 23° C. and 50% RH for 2 months to confirm that the ink had been discharged from the 10 cartridges.

<Evaluation Criteria>

A: 8 to 10 cartridges are capable of discharging ink
B: 4 to 7 cartridges are capable of discharging ink
C: 1 to 3 cartridges are capable of discharging ink (Evaluation of Discharge Stability)

The ink prepared was evaluated by using an inkjet printer PM-700C (trade name, manufactured by SEIKO EPSON CORPORATION).

It was observed by a CCD camera how each ink was discharged.

<Evaluation Criteria>

A: Stable
B: Somewhat stable
C: Unstable

The results are shown in the following Tables 16 to 20.

TABLE 16

| Ink No. | First color material | Second color material | First color material/Second color material (Mass ratio) | Type of Stock Solution | Clogging of nozzle | Discharge stability | Remark |
|---|---|---|---|---|---|---|---|
| 3 | A-1 | B-1 | 50/50 | L | A | A | Example |
| 61 | A-1 | B-1 | 50/50 | L-1 | B | B | Example |
| 62 | A-1 | B-1 | 50/50 | L-2 | B | B | Example |
| 63 | A-1 | B-1 | 50/50 | L-3 | B | B | Example |
| 64 | A-1 | B-1 | 50/50 | L-4 | B | B | Example |
| 8 | A-1 | B-2 | 50/50 | L | A | A | Example |
| 71 | A-1 | B-2 | 50/50 | L-1 | B | C | Example |
| 72 | A-1 | B-2 | 50/50 | L-2 | B | B | Example |
| 73 | A-1 | B-2 | 50/50 | L-3 | C | C | Example |
| 74 | A-1 | B-2 | 50/50 | L-4 | C | B | Example |
| 13 | A-1 | B-3 | 50/50 | L | A | A | Example |
| 81 | A-1 | B-3 | 50/50 | L-1 | C | C | Example |
| 82 | A-1 | B-3 | 50/50 | L-2 | C | B | Example |
| 83 | A-1 | B-3 | 50/50 | L-3 | B | B | Example |
| 84 | A-1 | B-3 | 50/50 | L-4 | C | A | Example |
| 58 | A-1 | B-12 | 50/50 | L | A | C | Example |
| 91 | A-1 | B-12 | 50/50 | L-1 | B | B | Example |
| 92 | A-1 | B-12 | 50/50 | L-2 | B | B | Example |
| 93 | A-1 | B-12 | 50/50 | L-3 | B | B | Example |
| 94 | A-1 | B-12 | 50/50 | L-4 | B | B | Example |

TABLE 17

| Ink No. | First color material | Second color material | First color material/Second color material (Mass ratio) | Type of Stock Solution | Clogging of nozzle | Discharge stability | Remark |
|---|---|---|---|---|---|---|---|
| 3 | A-1 | B-1 | 50/50 | L | A | A | Example |
| 101 | A-1 | B-1 | 50/50 | L-5 | A | A | Example |
| 102 | A-1 | B-1 | 50/50 | L-6 | A | A | Example |
| 103 | A-1 | B-1 | 50/50 | L-7 | A | A | Example |
| 104 | A-1 | B-1 | 50/50 | L-8 | A | A | Example |
| 105 | A-1 | B-2 | 50/50 | L-9 | A | A | Example |
| 8 | A-1 | B-2 | 50/50 | L | A | A | Example |
| 111 | A-1 | B-2 | 50/50 | L-5 | A | A | Example |
| 112 | A-1 | B-2 | 50/50 | L-6 | B | A | Example |
| 113 | A-1 | B-2 | 50/50 | L-7 | A | A | Example |
| 114 | A-1 | B-3 | 50/50 | L-8 | B | B | Example |
| 115 | A-1 | B-3 | 50/50 | L-9 | A | B | Example |
| 13 | A-1 | B-3 | 50/50 | L | A | A | Example |
| 121 | A-1 | B-3 | 50/50 | L-5 | A | B | Example |
| 122 | A-1 | B-3 | 50/50 | L-6 | A | B | Example |
| 123 | A-1 | B-12 | 50/50 | L-7 | A | A | Example |
| 124 | A-1 | B-12 | 50/50 | L-8 | B | A | Example |
| 125 | A-1 | B-12 | 50/50 | L-9 | A | A | Example |
| 58 | A-1 | B-12 | 50/50 | L | A | A | Example |
| 131 | A-1 | B-12 | 50/50 | L-5 | A | A | Example |
| 132 | A-1 | B-12 | 50/50 | L-6 | A | A | Example |
| 133 | A-1 | B-12 | 50/50 | L-7 | A | B | Example |
| 134 | A-1 | B-12 | 50/50 | L-8 | A | A | Example |
| 135 | A-1 | B-12 | 50/50 | L-9 | A | A | Example |

TABLE 18

| Ink No. | First color material | Second color material | First color material/Second color material (Mass ratio) | Type of Stock Solution | Clogging of nozzle | Discharge stability | Remark |
|---|---|---|---|---|---|---|---|
| 3 | A-1 | B-1 | 50/50 | L | A | A | Example |
| 141 | A-1 | B-1 | 50/50 | L-11 | A | A | Example |
| 142 | A-1 | B-1 | 50/50 | L-12 | A | A | Example |
| 143 | A-1 | B-1 | 50/50 | L-13 | B | B | Example |
| 8 | A-1 | B-2 | 50/50 | L | A | A | Example |
| 151 | A-1 | B-2 | 50/50 | L-11 | B | A | Example |
| 152 | A-1 | B-2 | 50/50 | L-12 | B | A | Example |
| 153 | A-1 | B-2 | 50/50 | L-13 | B | C | Example |

TABLE 18-continued

| Ink No. | First color material | Second color material | First color material/Second color material (Mass ratio) | Type of Stock Solution | Clogging of nozzle | Discharge stability | Remark |
|---|---|---|---|---|---|---|---|
| 13 | A-1 | B-3 | 50/50 | L | A | A | Example |
| 161 | A-1 | B-3 | 50/50 | L-11 | B | B | Example |
| 162 | A-1 | B-3 | 50/50 | L-12 | B | B | Example |
| 163 | A-1 | B-3 | 50/50 | L-13 | B | C | Example |
| 58 | A-1 | B-12 | 50/50 | L | A | A | Example |
| 171 | A-1 | B-12 | 50/50 | L-11 | A | A | Example |
| 172 | A-1 | B-12 | 50/50 | L-12 | A | B | Example |
| 173 | A-1 | B-12 | 50/50 | L-13 | B | C | Example |

TABLE 19

| Ink No. | First color material | Second color material | First color material/Second color material (Mass ratio) | Type of Stock Solution | Clogging of nozzle | Discharge stability | Remark |
|---|---|---|---|---|---|---|---|
| 3 | A-1 | B-1 | 50/50 | L | A | A | Example |
| 181 | A-1 | B-1 | 50/50 | L-14 | A | A | Example |
| 182 | A-1 | B-1 | 50/50 | L-15 | A | B | Example |
| 8 | A-1 | B-2 | 50/50 | L | A | A | Example |
| 191 | A-1 | B-2 | 50/50 | L-14 | A | A | Example |
| 192 | A-1 | B-2 | 50/50 | L-15 | B | C | Example |
| 13 | A-1 | B-3 | 50/50 | L | A | A | Example |
| 201 | A-1 | B-3 | 50/50 | L-14 | A | B | Example |
| 202 | A-1 | B-3 | 50/50 | L-15 | B | C | Example |
| 58 | A-1 | B-12 | 50/50 | L | A | A | Example |
| 211 | A-1 | B-12 | 50/50 | L-14 | B | A | Example |
| 212 | A-1 | B-12 | 50/50 | L-15 | B | A | Example |

TABLE 20

| Ink No. | First color material | Second color material | First color material/Second color material (Mass ratio) | Type of Stock Solution | Clogging of nozzle | Discharge stability | Remark |
|---|---|---|---|---|---|---|---|
| 3 | A-1 | B-1 | 50/50 | L | A | A | Example |
| 221 | A-1 | B-1 | 50/50 | L-16 | A | A | Example |
| 222 | A-1 | B-1 | 50/50 | L-17 | A | A | Example |
| 223 | A-1 | B-1 | 50/50 | L-18 | A | A | Example |
| 8 | A-1 | B-2 | 50/50 | L | A | A | Example |
| 231 | A-1 | B-2 | 50/50 | L-16 | A | A | Example |
| 232 | A-1 | B-2 | 50/50 | L-17 | A | A | Example |
| 233 | A-1 | B-2 | 50/50 | L-18 | A | A | Example |
| 13 | A-1 | B-3 | 50/50 | L | A | A | Example |
| 241 | A-1 | B-3 | 50/50 | L-16 | A | A | Example |
| 242 | A-1 | B-3 | 50/50 | L-17 | A | A | Example |
| 243 | A-1 | B-3 | 50/50 | L-18 | A | A | Example |
| 58 | A-1 | B-12 | 50/50 | L | A | A | Example |
| 251 | A-1 | B-12 | 50/50 | L-16 | A | A | Example |
| 252 | A-1 | B-12 | 50/50 | L-17 | A | A | Example |
| 253 | A-1 | B-12 | 50/50 | L-18 | A | A | Example |

Meanwhile, for Ink Nos. 221, 232, 242 and 243, "clogging of nozzle" was "9 to 10 cartridges are capable of discharging ink". For Ink Nos. 222, 231, 233 and 241, "Discharge stability" was "More stable". For Ink Nos. 223, 251, 252 and 253, "Discharge stability" was "More stable" while "Clogging of nozzle" was "9 to 10 cartridges are capable of discharging ink".

INDUSTRIAL APPLICABILITY

According to the present invention, it is possible to provide an ink composition, which may form an image which is fast to light and ozone and also exhibit a desired hue, an inkjet recording ink using the ink composition, and an inkjet recording method.

Although the present invention has been described in detail with reference to specific aspects, it is obvious to those skilled in the art that various changes or modifications may be made without departing from the spirit and scope of the present invention.

The present application is based on Japanese Patent Application (Patent application No. 2012-109942) filed on May 11, 2012 and Japanese Patent Application (Patent application No. 2012-286363) filed on Dec. 27, 2012, the content of which is incorporated herein by reference.

What is claimed is:

1. An ink composition comprising a first color material and a second color material, wherein the first color material is a compound represented by the following Formula (A-I), and the second color material is a compound represented by the following Formula (B-V):

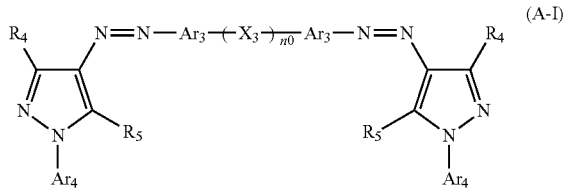

(A-I)

wherein, in Formula (A-I), $R_4$'s represent a substituent, $R_5$'s represent —$OR_6$ or —$NHR_7$, and $R_6$ and $R_7$ represent a hydrogen atom or a substituent, $X_3$ represents a divalent linking group, n0 is 0 or 1, $Ar_3$'s represent a divalent heterocyclic group, and $Ar_4$'s represent an alkyl group, an aryl group, or a triazine group:

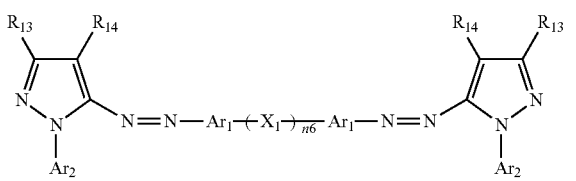

(B-V)

wherein, in Formula (B-V), $R_{13}$'s each independently represent a hydrogen atom or a substituent, $R_{14}$'s each independently represent —$OR_{16}$, —$NHR_{17}$ or a cyano group, and $R_{16}$ and $R_{17}$ represent a hydrogen atom or a substituent, $X_1$ represents a substituted or unsubstituted aryl group, or a substituted or unsubstituted triazine group, n6 is 0 or 1, $Ar_1$'s each independently represent a divalent heterocyclic group, and $Ar_2$'s each independently represent a substituted or unsubstituted alkyl group, a substituted or unsubstituted aryl group, or a triazine group, wherein the content of the first color material in the ink composition is 0.1 or more and 10.0 or less by mass ratio (mass of the first color material/mass of the second color material) relative to the content of the second color material.

2. The ink composition according to claim 1, wherein the compound represented by Formula (A-I) is a compound represented by the following Formula (A-II):

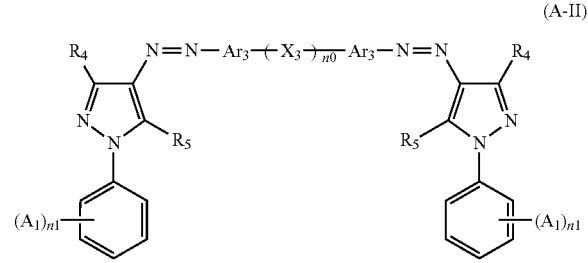

(A-II)

wherein, in Formula (A-II), $R_4$'s represents a substituent, $R_5$'s represent —$OR_6$ or —$NHR_7$, and $R_6$ and $R_7$ represent a hydrogen atom or a substituent, $X_3$ represents a divalent linking group, n0 is 0 or 1, $Ar_3$'s represent a divalent heterocyclic group, $A_1$'s represent an ionic hydrophilic group, and n1's represent 0 to 2.

3. The ink composition according to claim 1, wherein the compound represented by Formula (A-I) is a compound represented by the following Formula (A-III):

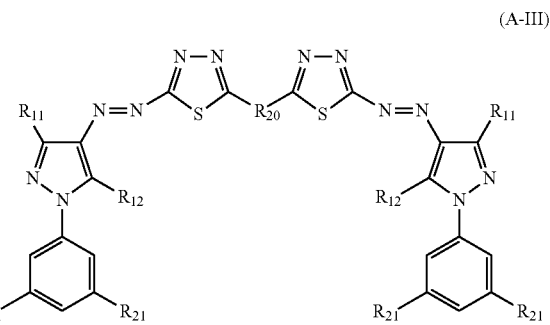

(A-III)

wherein, in Formula (A-III), $R_{20}$ represents an alkylene group, —S—, or a linking group formed by a combination thereof, $R_{21}$'s represent an ionic hydrophilic group, $R_{11}$'s represent an alkyl group, and $R_{12}$'s represent an amino group.

4. The ink composition according to claim 1, wherein the compound represented by Formula (B-V) is a compound represented by the following Formula (B-VI):

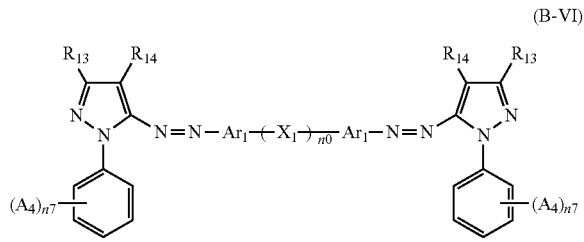

(B-VI)

wherein, in Formula (B-VI), $R_{13}$'s each independently represent a hydrogen atom or a substituent, $R_{14}$'s each independently represent —$OR_{16}$, —$NHR_{17}$ or a cyano group, and $R_{16}$ and $R_{17}$ represent a hydrogen atom or a substituent, $X_1$ represents a substituted or unsubstituted aryl group, or a substituted or unsubstituted triazine group, n0 is 0 or 1, $Ar_1$'s each independently represent a divalent heterocyclic group, $Ar_4$'s each independently represent an ionic hydrophilic group, and n7's represents 0 to 2.

5. The ink composition according to any one of claim 1, wherein the compound represented by Formula (B-V) is a compound represented by the following Formula (B-VII):

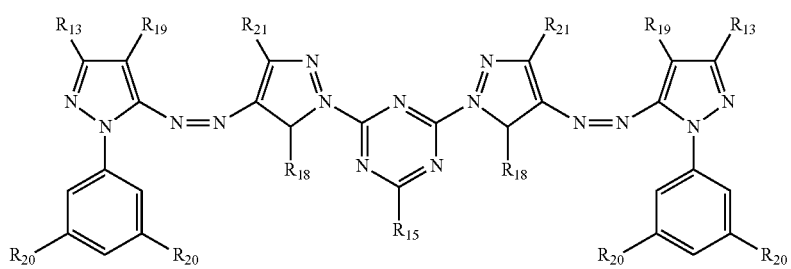

(B-VII)

wherein, in Formula (B-VII), $R_{15}$ represents —OM, $R_{20}$'s represent —$CO_2M$, and M represents a hydrogen atom or a monovalent counter cation, $R_{21}$'s represent a substituted or unsubstituted alkyl group, $R_{13}$'s each independently represent a hydrogen atom or a substituent, $R_{18}$'s represent a substituted or unsubstituted amino group, and $R_{19}$'s represent a cyano group.

6. The ink composition according to claim 1, wherein the content of the first color material is 0.1% by mass to 8% by mass based on the total mass of the ink composition.

7. The ink composition according to claim 1, wherein the content of the second color material is 0.1% by mass to 8% by mass based on the total mass of the ink composition.

8. The ink composition according to claim 1, further comprising:

at least one of a water-soluble organic solvent, a urea-based compound, a preservative, a nonionic surfactant and a metal chelator.

9. A cartridge ink for an inkjet printer, which fills a chamber in a cartridge for a printer, wherein the ink contains the ink composition according to claim 1.

10. An inkjet recording method using the cartridge ink for an inkjet printer according to claim 9.

11. An inkjet printer using the cartridge ink for a printer according to claim 9.

* * * * *